May 5, 1936.  A. F. PYM  2,039,448
MACHINE FOR SHAPING SHOE UPPERS
Filed July 28, 1934  25 Sheets-Sheet 1

May 5, 1936.  A. F. PYM  2,039,448
MACHINE FOR SHAPING SHOE UPPERS
Filed July 28, 1934   25 Sheets-Sheet 4

INVENTOR
Arthur F. Pym
By his Attorney
Harlow M. Davis

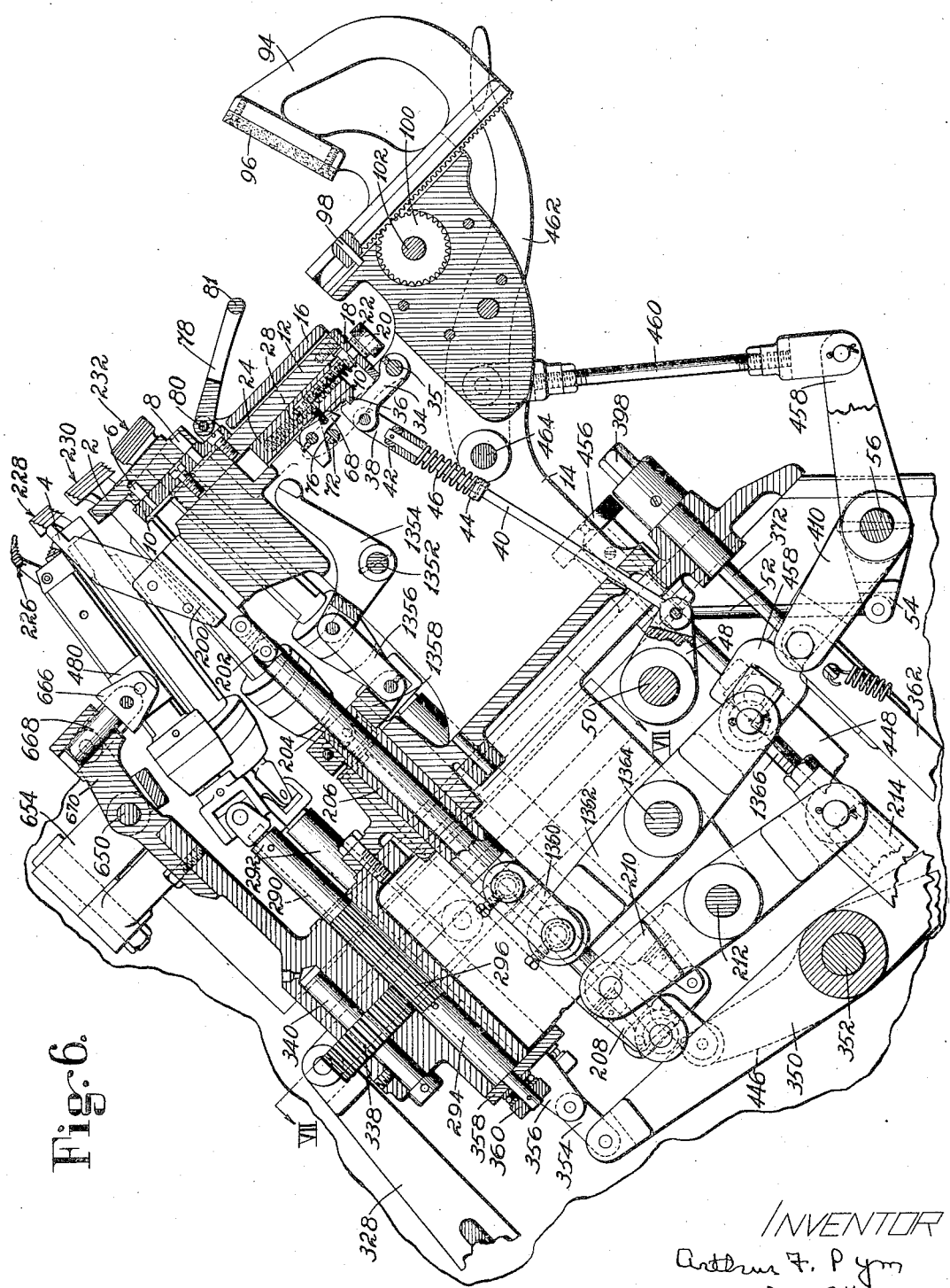

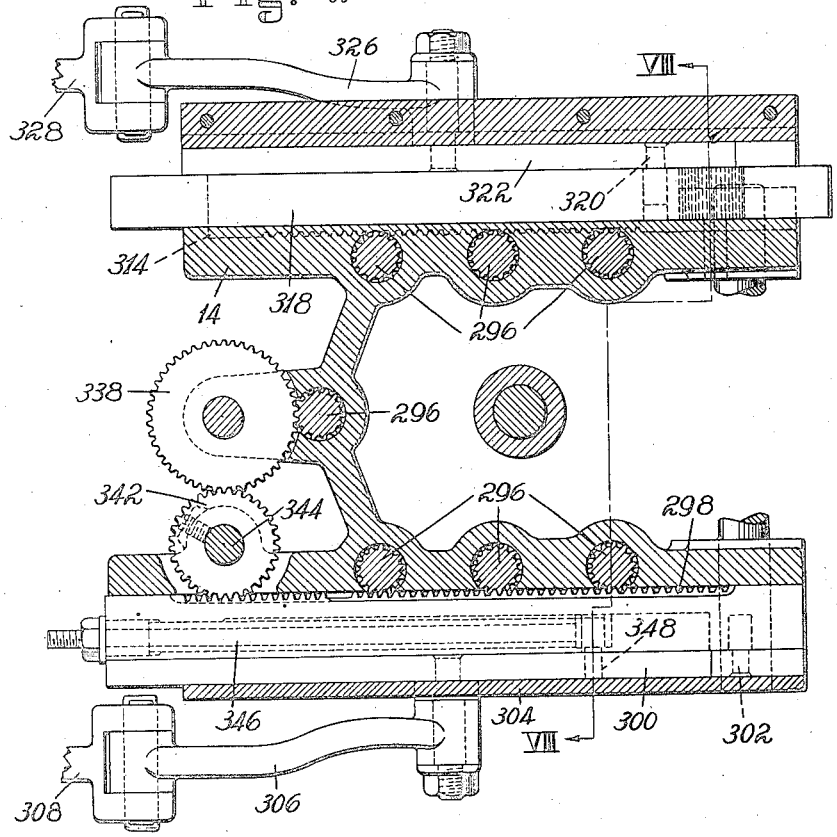
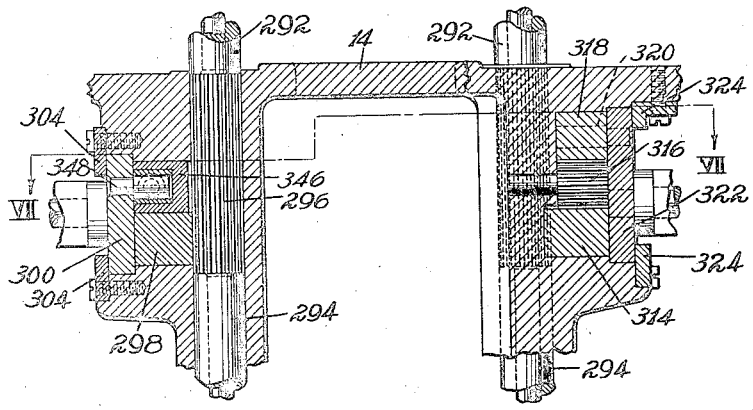

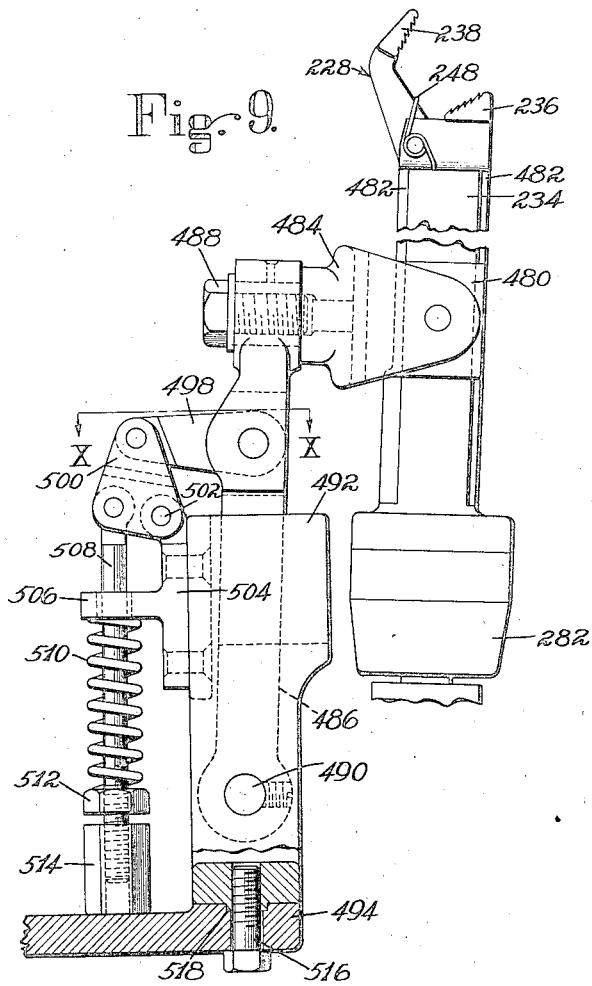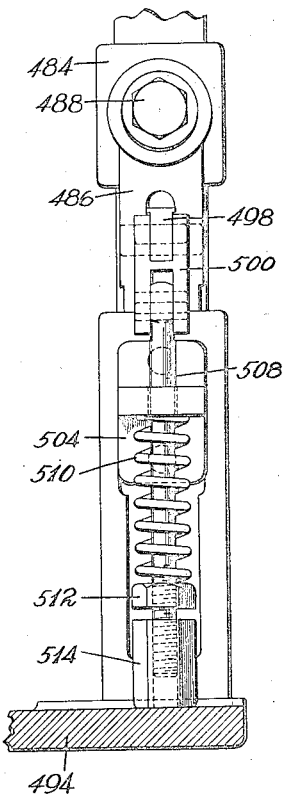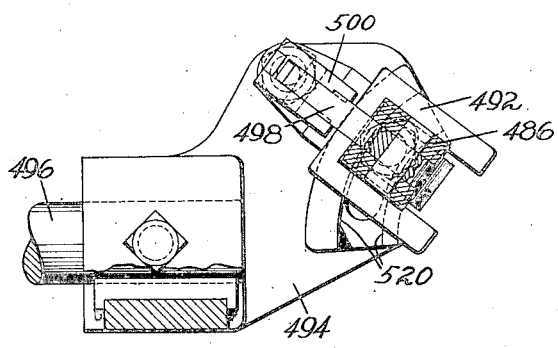

May 5, 1936. A. F. PYM 2,039,448
MACHINE FOR SHAPING SHOE UPPERS
Filed July 28, 1934 25 Sheets-Sheet 9
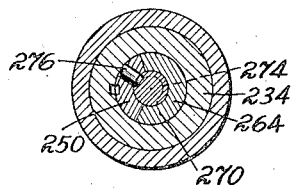
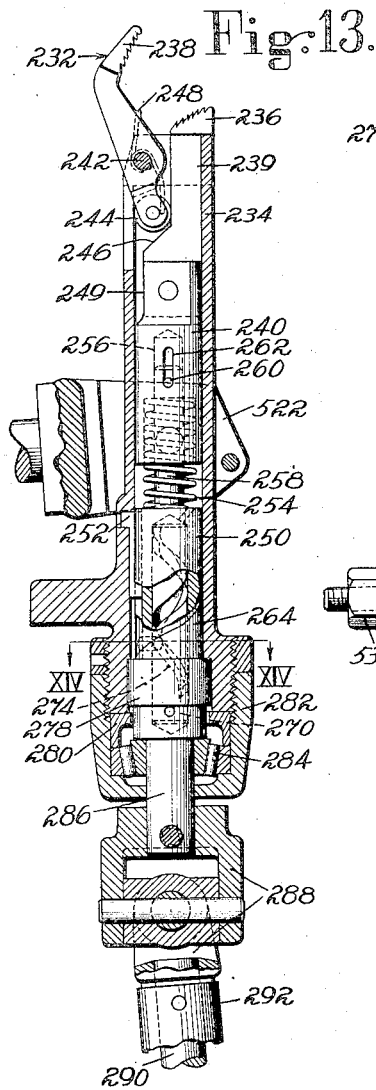
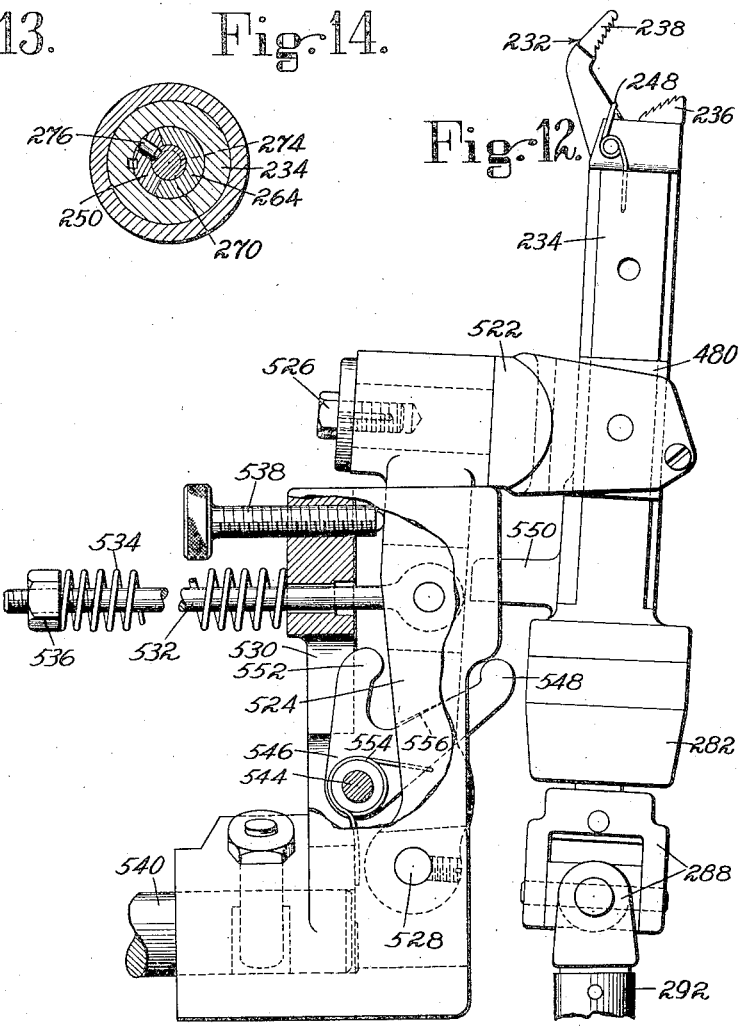
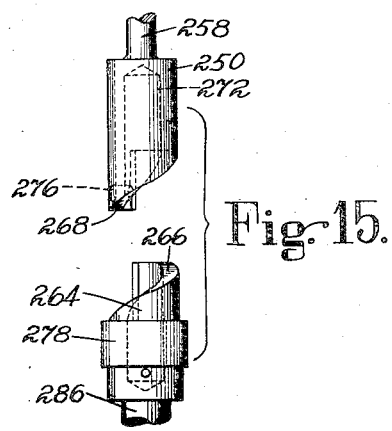

May 5, 1936. A. F. PYM 2,039,448
MACHINE FOR SHAPING SHOE UPPERS
Filed July 28, 1934 25 Sheets-Sheet 10

INVENTOR
Arthur F. Pym
By his Attorney
Harlow D. Davis

May 5, 1936.  A. F. PYM  2,039,448
MACHINE FOR SHAPING SHOE UPPERS
Filed July 28, 1934   25 Sheets-Sheet 11

INVENTOR
Arthur F. Pym
By his Attorney,
Harlow M. Davis

May 5, 1936.　　　　A. F. PYM　　　　2,039,448
MACHINE FOR SHAPING SHOE UPPERS
Filed July 28, 1934　　　　25 Sheets-Sheet 12

INVENTOR
Arthur F. Pym
By his Attorney
Harlow M. Davis

May 5, 1936. A. F. PYM 2,039,448
MACHINE FOR SHAPING SHOE UPPERS
Filed July 28, 1934 25 Sheets-Sheet 13
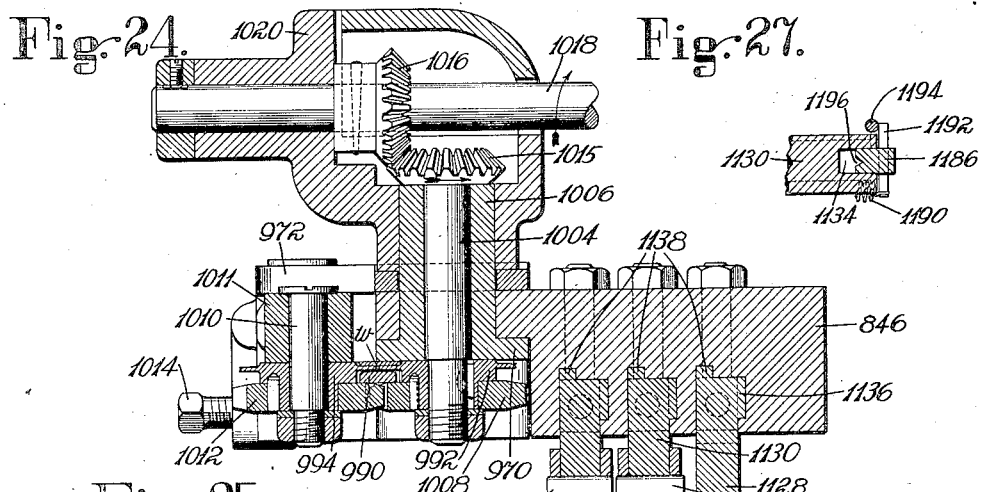
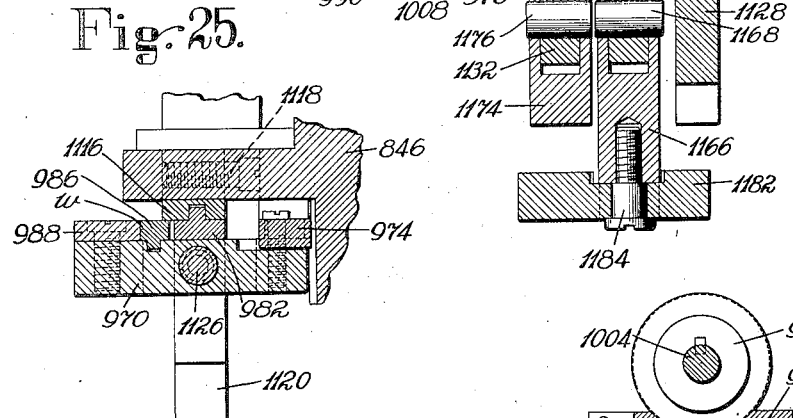
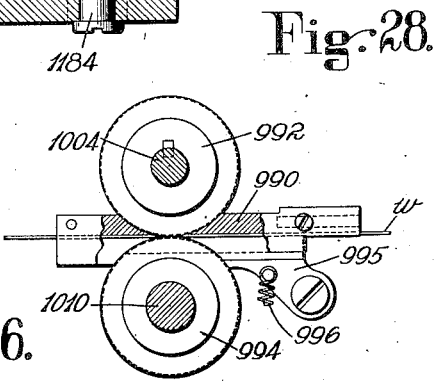
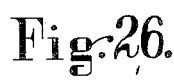
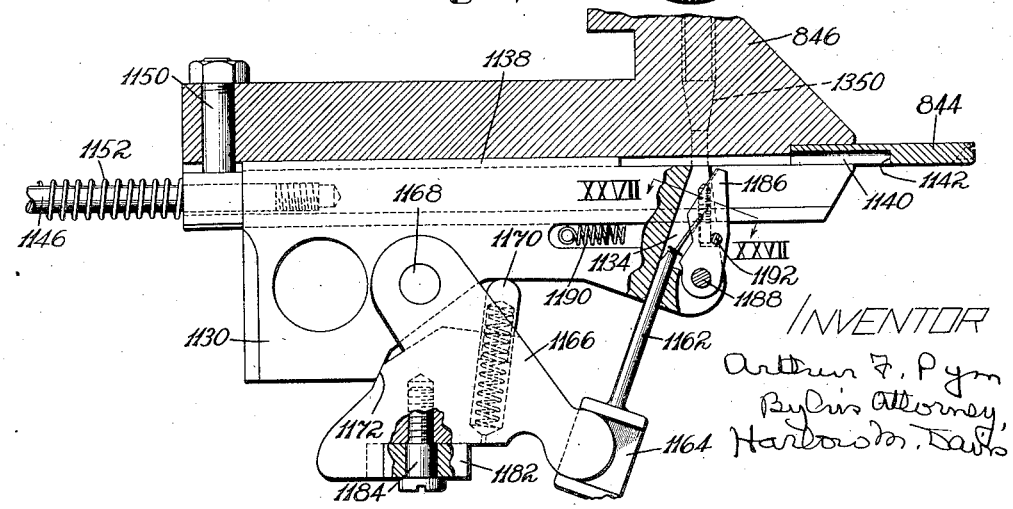
INVENTOR
Arthur F. Pym
By his Attorney
Harold M. Davis May 5, 1936. A. F. PYM 2,039,448
MACHINE FOR SHAPING SHOE UPPERS
Filed July 28, 1934 25 Sheets-Sheet 14
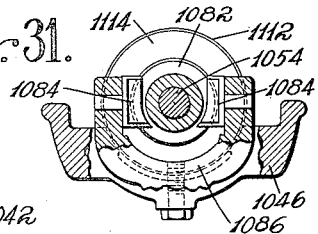
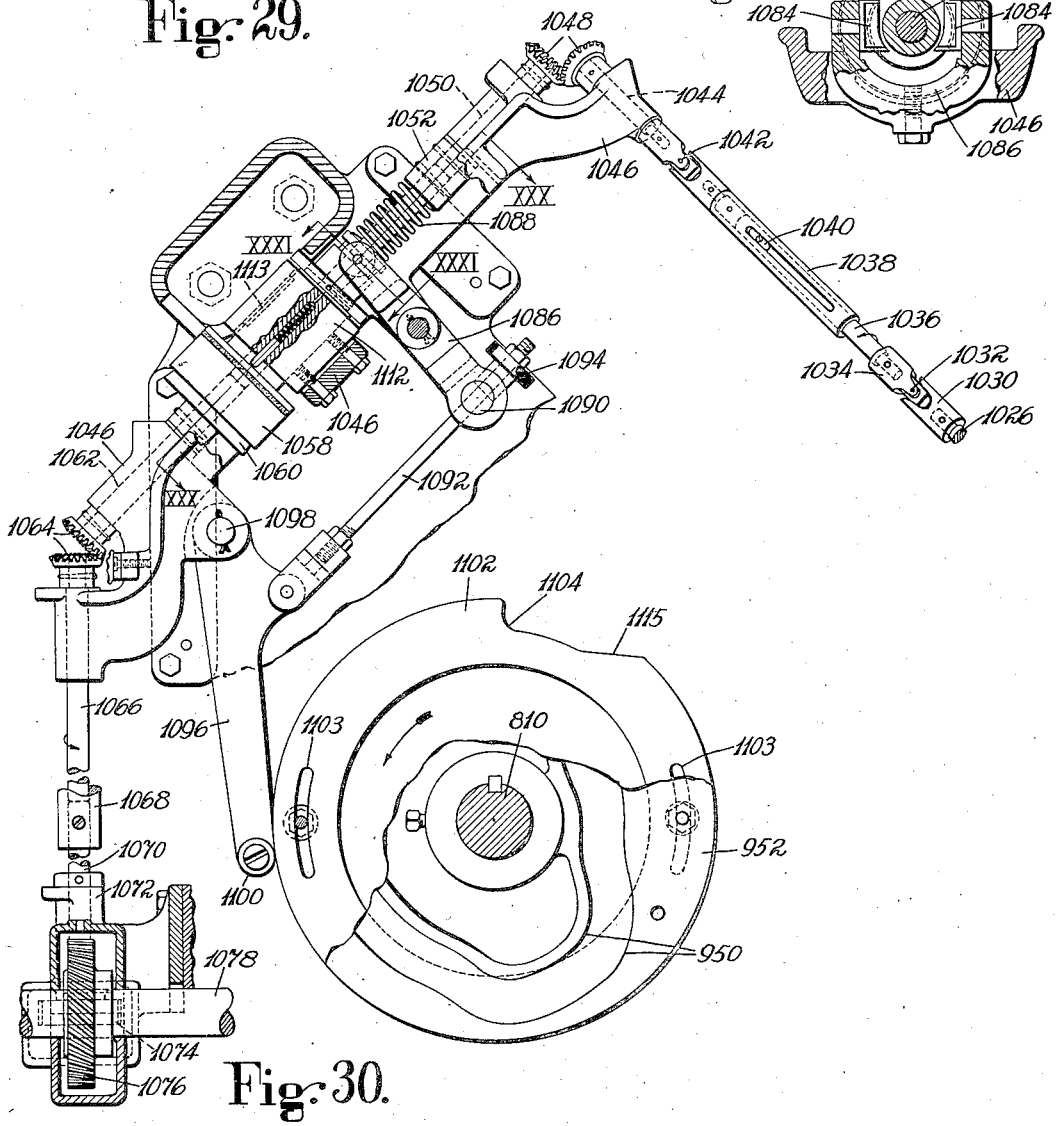
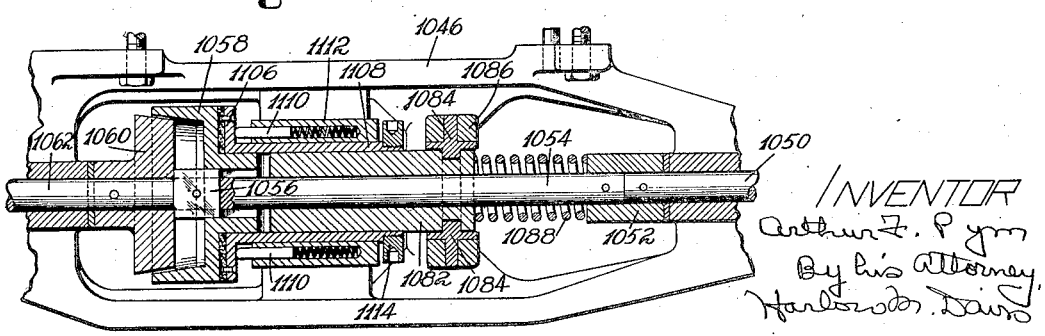

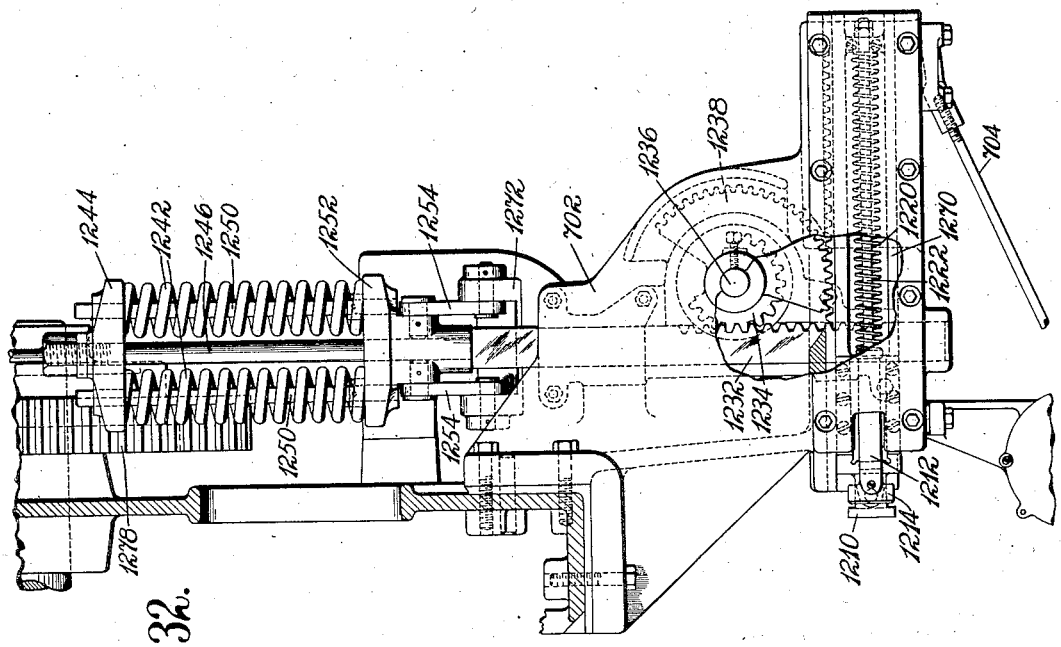
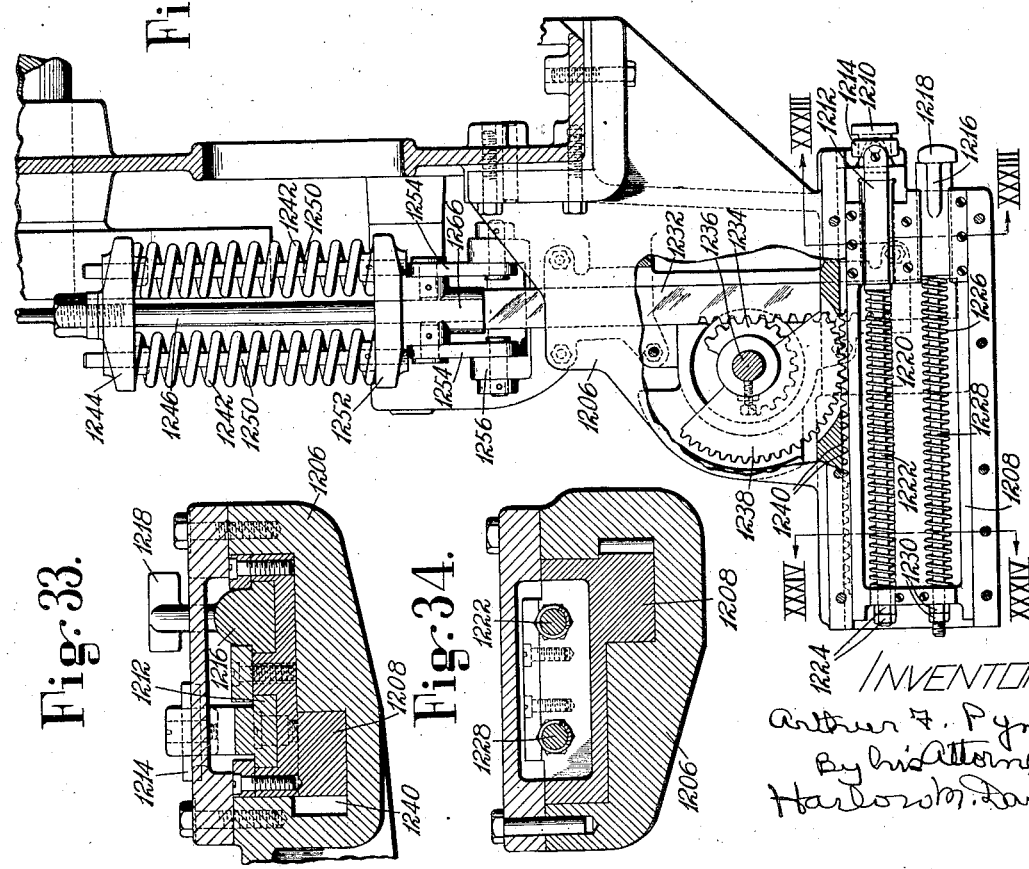

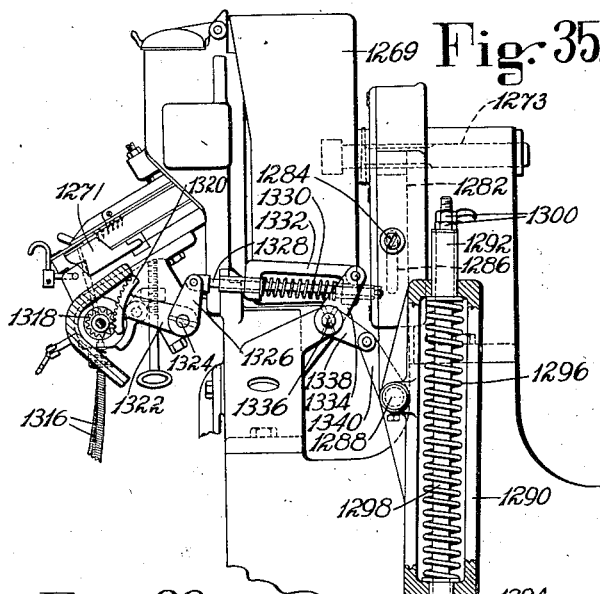
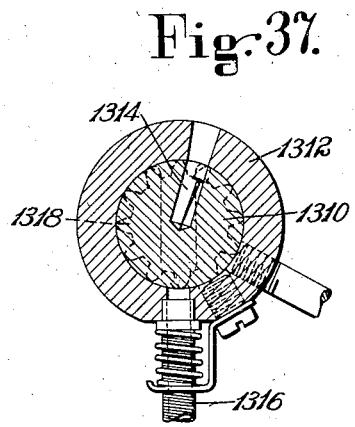
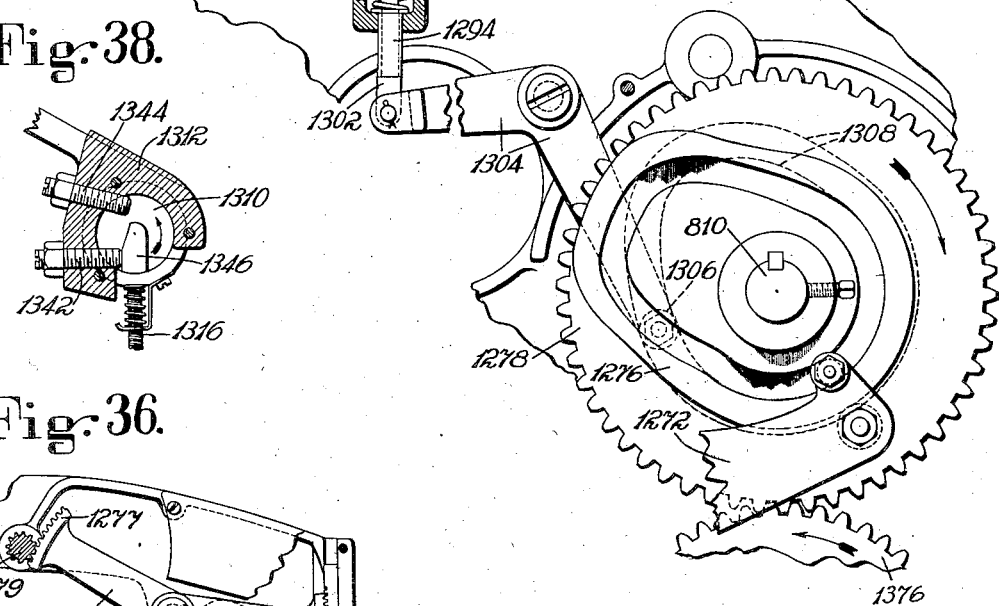
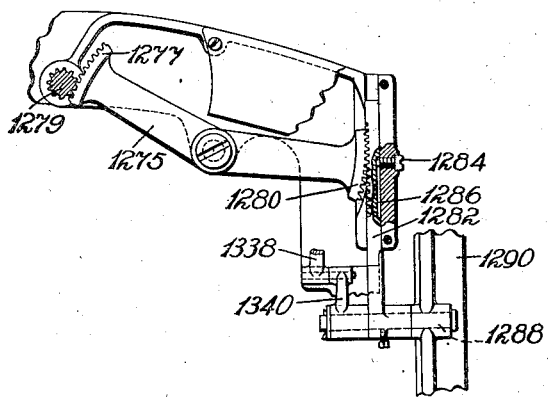

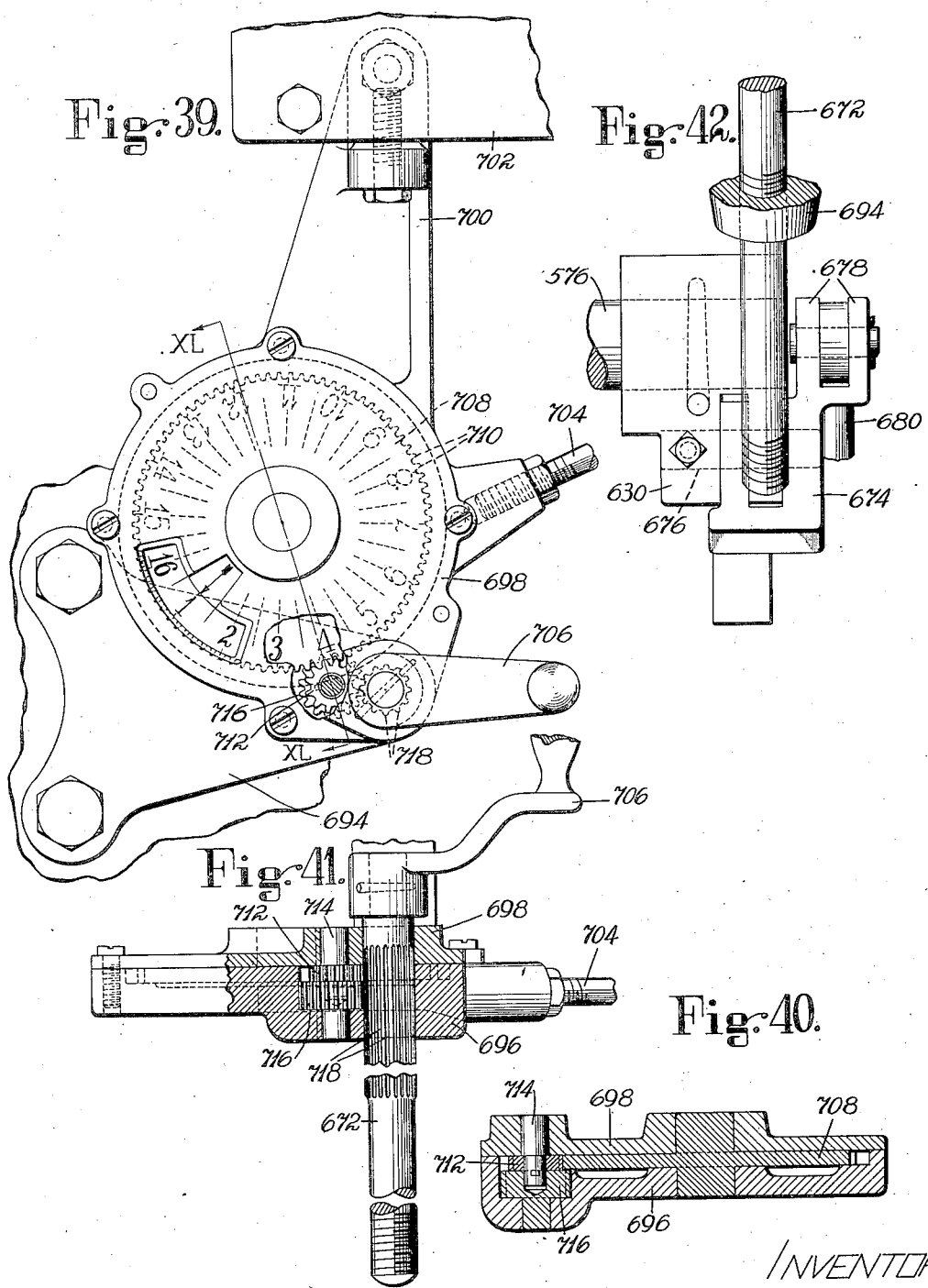

May 5, 1936.   A. F. PYM   2,039,448
MACHINE FOR SHAPING SHOE UPPERS
Filed July 28, 1934   25 Sheets-Sheet 18

INVENTOR
Arthur F. Pym
By his Attorney
Harlow M. Davis

May 5, 1936.  A. F. PYM  2,039,448
MACHINE FOR SHAPING SHOE UPPERS
Filed July 28, 1934   25 Sheets-Sheet 19
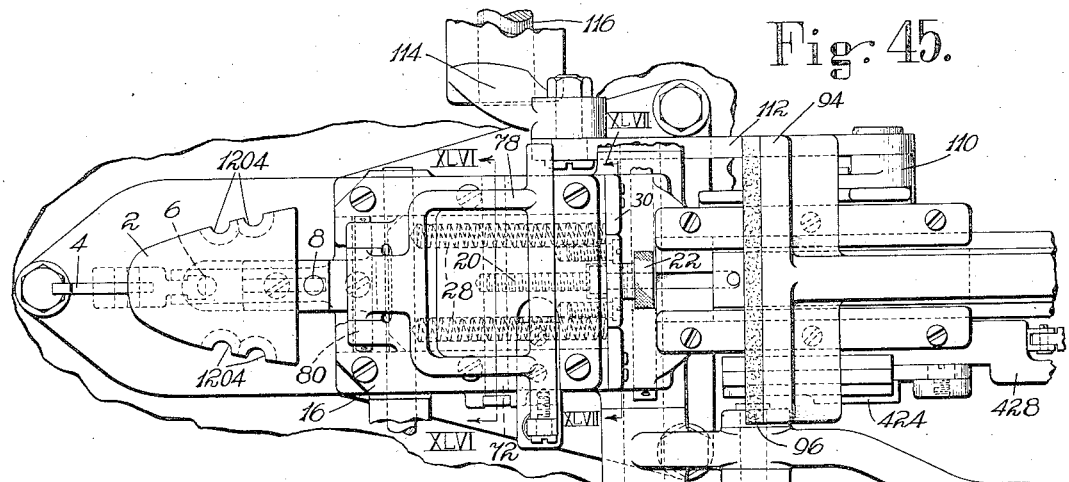
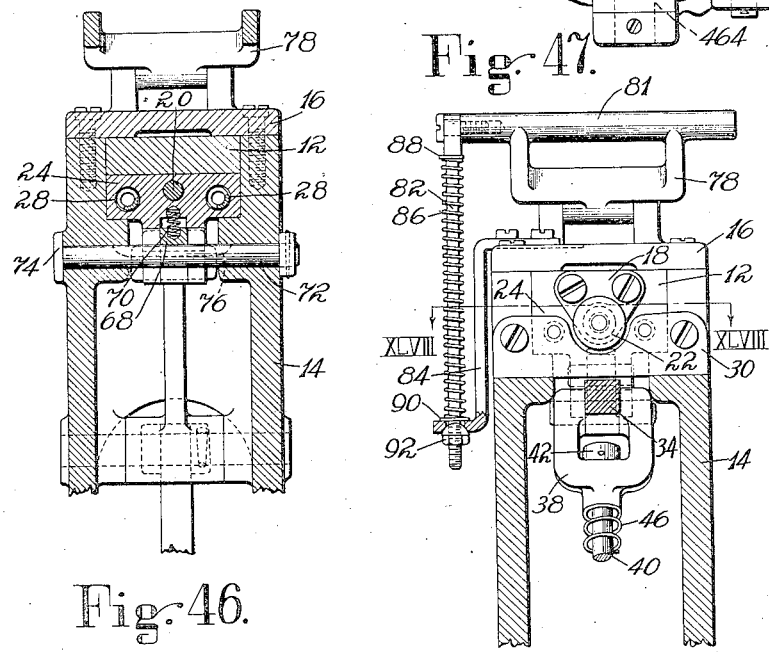
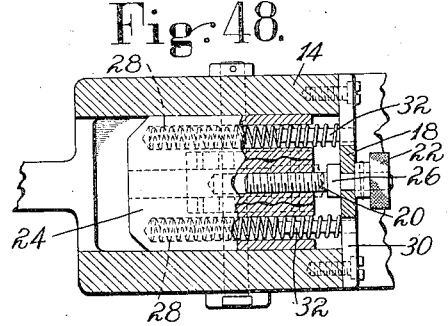

May 5, 1936.　　　　A. F. PYM　　　　2,039,448
MACHINE FOR SHAPING SHOE UPPERS
Filed July 28, 1934　　　　25 Sheets-Sheet 20
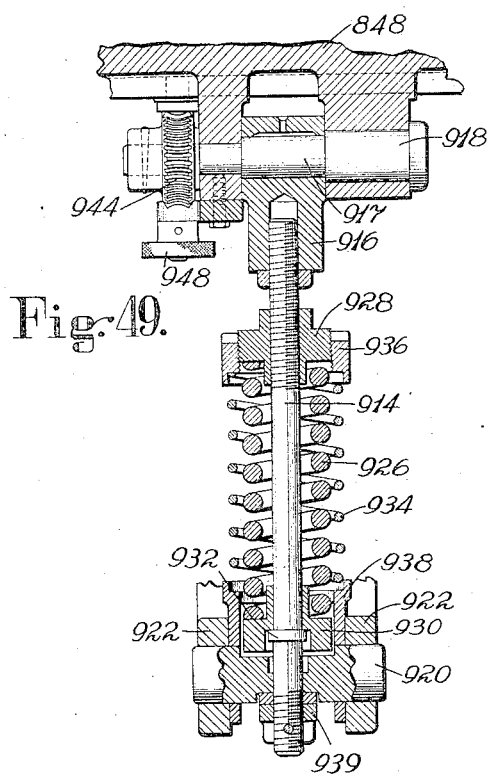
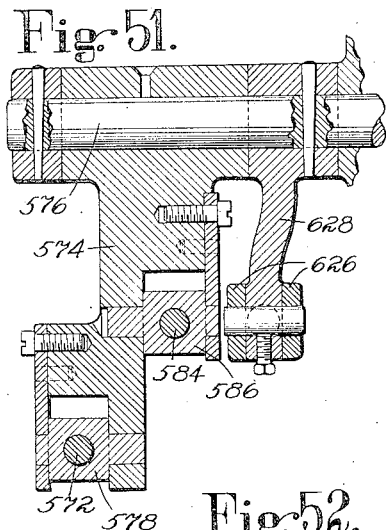
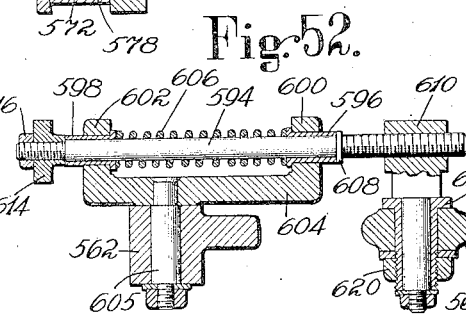
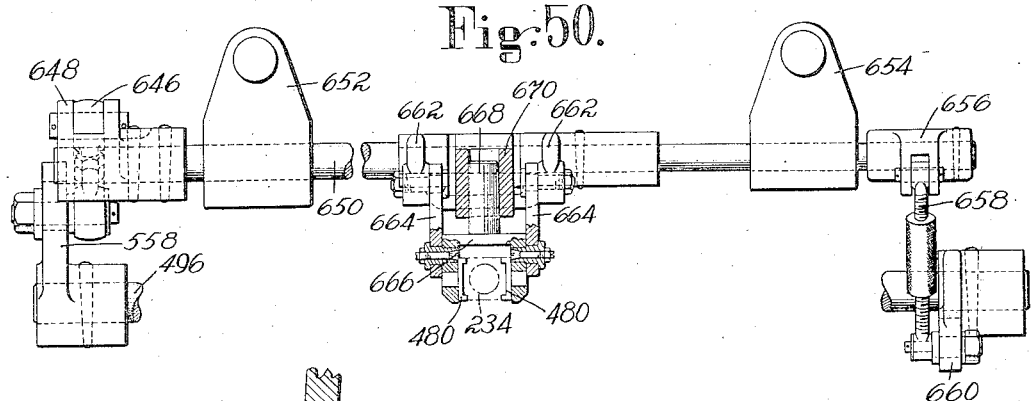
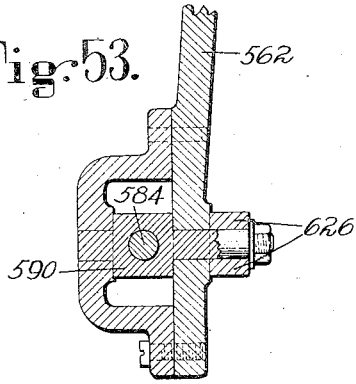
INVENTOR
Arthur F. Pym
By his Attorney
Harlow B. Davis May 5, 1936.  A. F. PYM  2,039,448
MACHINE FOR SHAPING SHOE UPPERS
Filed July 28, 1934  25 Sheets—Sheet 21
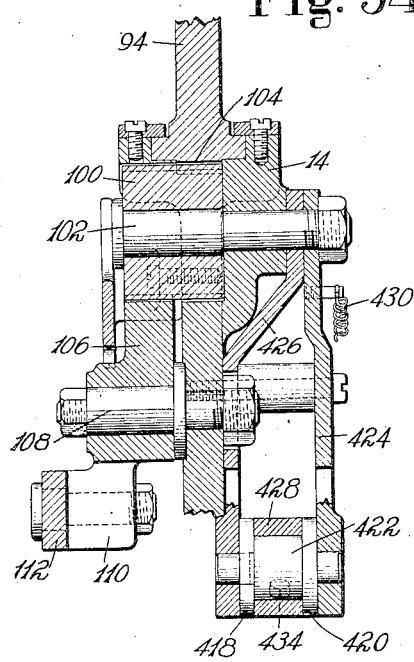
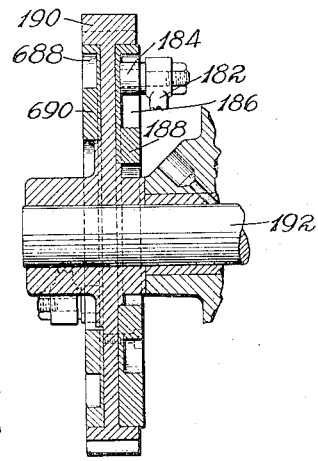
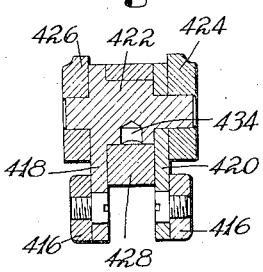
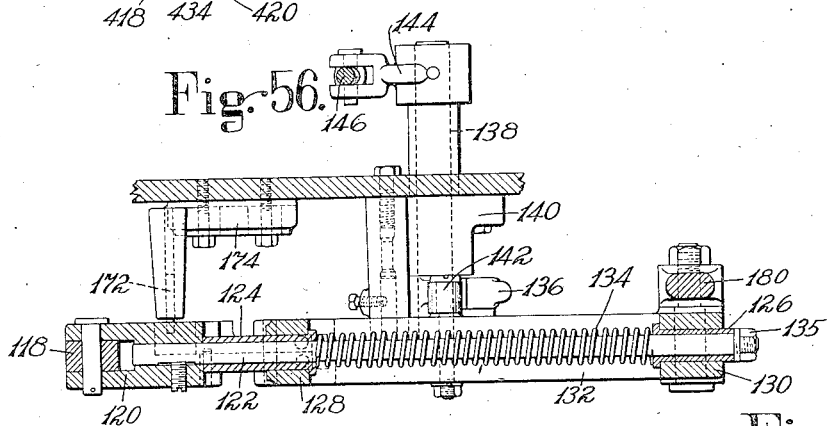
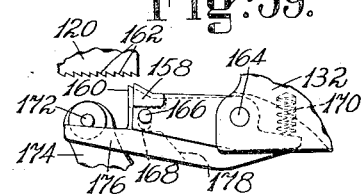
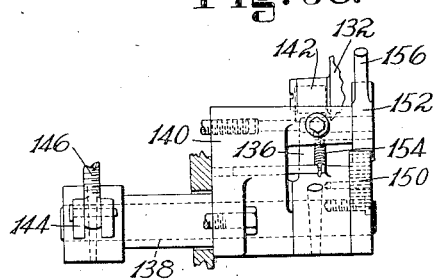
INVENTOR
Arthur F. Pym
By his Attorney
Harlow M. Davis May 5, 1936. A. F. PYM 2,039,448
MACHINE FOR SHAPING SHOE UPPERS
Filed July 28, 1934 25 Sheets-Sheet 22

INVENTOR
Arthur F. Pym
By his Attorney
Harlow M. Davis

May 5, 1936.  A. F. PYM  2,039,448
MACHINE FOR SHAPING SHOE UPPERS
Filed July 28, 1934   25 Sheets-Sheet 23

INVENTOR
Arthur F. Pym
By his Attorney
Harlow M. Davis

May 5, 1936.  A. F. PYM  2,039,448

MACHINE FOR SHAPING SHOE UPPERS

Filed July 28, 1934  25 Sheets—Sheet 24

INVENTOR
Arthur F. Pym
By his Attorney,
Harlow M. Davis

May 5, 1936.  A. F. PYM  2,039,448
MACHINE FOR SHAPING SHOE UPPERS
Filed July 28, 1934  25 Sheets-Sheet 25
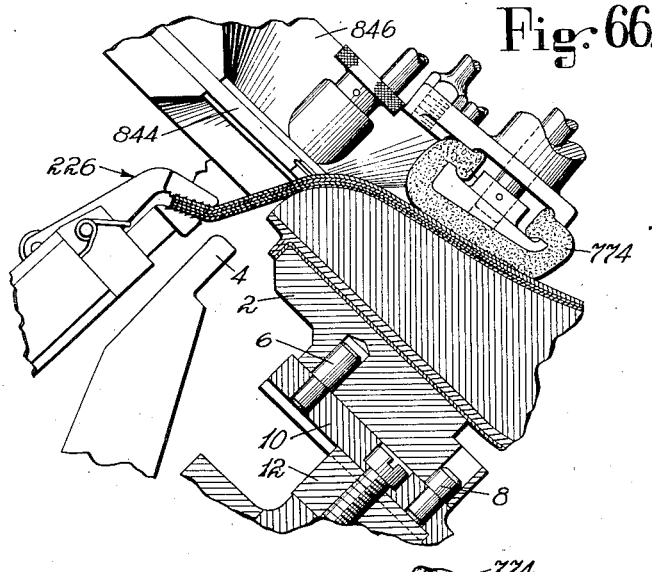
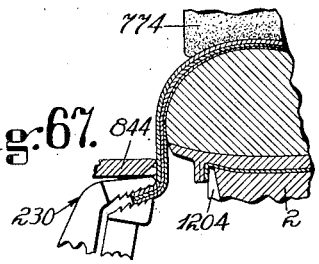
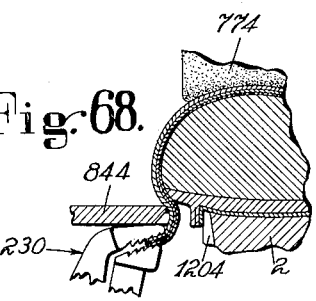
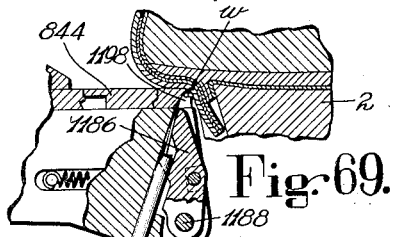
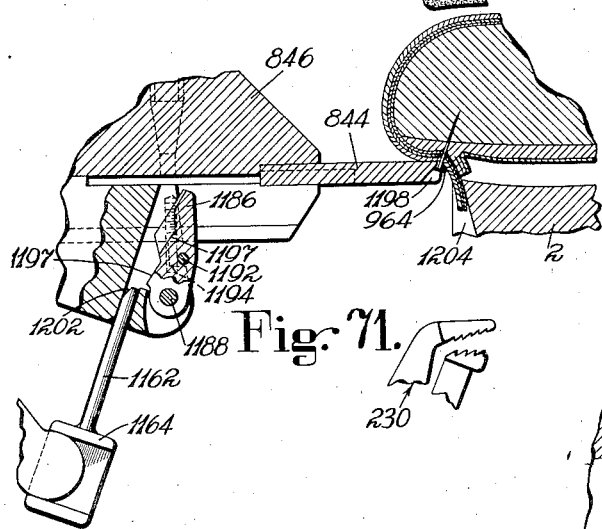
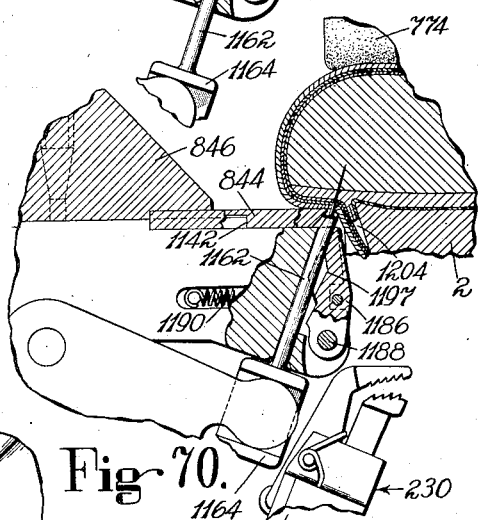
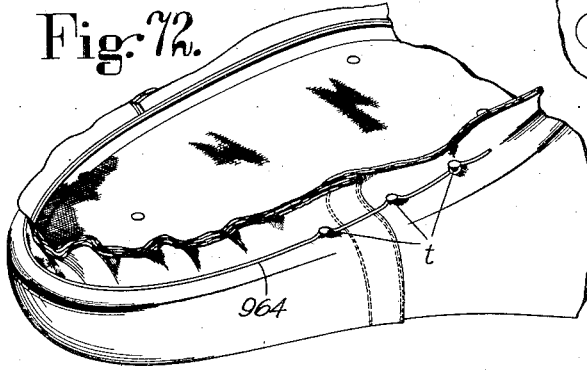

Patented May 5, 1936

2,039,448

UNITED STATES PATENT OFFICE 2,039,448

MACHINE FOR SHAPING SHOE UPPERS

Arthur F. Pym, Swampscott, Mass., assignor to United Shoe Machinery Corporation, Paterson, N. J., a corporation of New Jersey Application July 28, 1934, Serial No. 737,399

226 Claims. (Cl. 12—4)

This invention relates to machines for shaping shoe uppers, and is herein illustrated as embodied in a machine having means for pulling an upper over a last, means for working the marginal portion of the upper around the toe into lasted position, and means for fastening the upper in that position. It will be understood, however, that in various novel aspects the invention is not limited to machines for performing all those operations nor to machines for lasting the toe ends of shoes. The machine herein shown is in some respects particularly designed for operation on shoes of the welt type, and the invention is illustrated by reference to the manufacture of a shoe of that type having an upstanding lip on the insole against which the marginal portion of the upper is lasted, the term "lip" being used herein to include what is sometimes referred to as the rib. It will, however, be recognized that, with respect to some novel features, the invention is likewise applicable to the lasting of an upper against what is commonly known as a shoulder on an insole or other shoe bottom part. In various aspects the invention is not limited to the manufacture of shoes of any particular type, and accordingly the term "sole" is sometimes used hereinafter in a generic sense to refer to the shoe bottom part over which the upper is lasted.

Among its various features, the invention provides novel means for positioning the work in definitely predetermined relation to the upper-shaping means and for properly controlling it in the upper-shaping operation. As herein illustrated, the position of the last and shoe both heightwise and laterally is determined by a toe plate arranged to serve as a support for the forepart of the shoe presented bottom downward and to remain stationary throughout the upper-shaping operation, the plate engaging the inner face of the lip of the insole to determine the lateral position of the shoe and serving further by its engagement with the lip around the toe to support the lip against pressure directed inwardly against it in the lasting operation. Further to determine the position of the last lengthwise and to hold it against lengthwise movement in one direction during a portion of the upper-shaping operation, the machine is provided with an end gage arranged to act as a stop in contact with the toe-end face of the last. To facilitate presentation of the work by the operator, the toe plate in the construction shown is held retracted from the end gage until after the work has been placed upon it and is then released by a treadle to the action of springs which force it toward the end gage, the plate preferably carrying the work along with it to the position determined by the gage. The plate is then locked against retractive movement. Further to support the shoe against lengthwise movement, the machine shown includes a heel rest which is moved into contact with the shoe by the above-mentioned treadle, and has automatic means for forcing the heel rest more firmly against the shoe and for locking it against retractive movement in the course of power operation of the machine.

As a further feature, the invention provides improvements in upper-gripping means, herein shown as applied to each of a plurality of grippers for pulling the upper over the last. Objects of this part of the invention are to provide wide spaces between the gripper jaws when they are open and thus to facilitate presentation of the margin of the upper between the jaws, to provide nevertheless for a quick closing of the jaws without excessive movement of operating parts, and to insure prompt release of the upper by the grippers under all conditions. In the construction shown both jaws of each gripper are mounted for closing and opening movements, one jaw being mounted to swing and the other being movable rectilinearly and having a cam face thereon for imparting closing movement to the swinging jaw. The final gripping of the upper, however, is effected by movement of the rectilinearly movable jaw alone, as is also the release of the upper after the pull, an important advantage of this characteristic of the gripper construction being that prompt release of the upper by the grippers is insured in case the swinging jaws are engaged, as they may be at the time of such release of the upper, by toe wipers with which the machine is provided for wiping the marginal portion of the upper into lasted position. In the illustrative embodiment of the invention the closing and opening of the jaws of each gripper are effected by means rotatable in the gripper similarly to the jaw-controlling means disclosed in Letters Patent No. 1,980,435, granted on November 13, 1934 upon an application of Charles F. Pym and Arthur F. Pym, the present invention, however, providing certain improvements in such rotatable means.

Among its important features, the invention further provides novel means for pulling the upper in such manner as to position the tip seam substantially in the correct relation to the last, so that but little, if any, adjustment of the upper by the operator will be required after the pull to locate the tip seam properly. The machine herein shown includes opposite side grippers arranged to receive the margin of the upper with the ends of the tip seam presented in a definite relation to their jaws, and has means for imparting to these grippers automatically in the upper-pulling operation foredrawing movements to definitely determined positions lengthwise of the last so as to locate the ends of the tip seam at the correct distances from the toe-end face of the last without the necessity for any adjustment by the operator after the pull. The intermediate portion of the tip seam extending across the top of the forepart of the last is further positioned substantially in the correct relation to the last by a pull applied to the upper automatically at the toe end of the last, the machine herein shown including for this purpose a gripper which grips the upper at the end of the toe and other grippers which grip it at the corners of the toe. In the upper-pulling operation these toe grippers receive foredrawing movements and also pulling movements heightwise of the last to positions which are definitely or positively determined, so that substantial insurance is afforded that the portion of the tip seam extending over the top of the forepart of the last will be properly positioned by the pull applied to the upper. Provision is, however, afforded for manual movement of the toe grippers during a pause in the cycle of operations of the machine, in case the intermediate portion of the tip seam should not have been located in exactly the right position by the automatic pull.

After the upper has thus been pulled in such manner as to locate the tip seam in proper relation to the last, it is desirable to increase the force of the pull on the upper at the toe end of the last to assist the toe wipers, which receive wiping movements heightwise of the toe, in shaping the upper properly prior to their movements to wipe the margin of the upper into lasted relation to the insole. The end and corner toe grippers are accordingly further operated in time relation to the operation of the wipers to pull the upper yieldingly through a spring which is part of the operating means and is of such strength as not to yield during the earlier pull whereby the tip seam is properly positioned. Prior to such further operation of the toe grippers the upper at the top of the forepart is clamped firmly upon the last by a shoe holder which prevents any distortion of the tip seam by the further pull of the toe grippers.

Novel features of the invention also are to be recognized in means whereby foredrawing movements are imparted to the grippers. In the construction shown the toe and side grippers receive foredrawing movements independently of their movements heightwise of the last, such foredrawing movements being effected by a lever which is common to all the grippers. The foredrawing mechanism is further so constructed as to determine positively the positions lengthwise of the last of the side grippers at the ends of the tip seam relatively to the grippers at the toe end of the last, with provision for adjustment of these side grippers toward or from the toe grippers. Included in the machine herein shown are also grippers, hereinafter referred to as rear side grippers, which pull the upper in locations substantially at the ball of the last and to which foredrawing movements are imparted with the other grippers, the connections between these rear side grippers and the other grippers being yieldable to permit independent movements of the rear grippers, by means of hand levers provided for this purpose, for adjusting portions of the upper at the rear of the toe tip in proper relation to the last after the pull. The operative movement of the foredrawing mechanism is positively but variably limited by means which acts as a stop, so as to determined definitely the positions of the toe grippers and of the side grippers at the ends of the tip seam for the purpose above explained.

In order to counteract such tendency as the toe-lasting wipers may have to displace the ends of the tip seam lengthwise of the last in the toe-lasting operation, the machine herein shown is provided with means for imparting a short supplemental or secondary foredrawing movement to the grippers as the wipers wipe the upper inwardly and just prior to the release of the upper by the grippers. For this purpose a spring, which is subjected to stress when the main movement of the foredrawing mechanism is stopped as above described, is permitted to impart a further variably determined amount of foredrawing movement to the mechanism upon automatic relative displacement of parts which act to limit the main foredrawing movement.

To facilitate the proper positioning of the upper relatively to the jaws of the grippers, and especially the positioning of the ends of the tip seam in proper relation to the side grippers which control the tip seam, there is further provided means for bringing the machine automatically to a stop with the gripper jaws only partially closed, so that the operator may readily determined when the upper is in proper relation to the jaws. As illustrated, the machine is thus brought to a stop when the swinging gripper jaws have completed their closing movements, but before the upper is actually gripped, and after the machine is again started the rectilinearly movable jaws are further moved to grip the upper and the grippers are then operated to pull the upper.

After the pulling of the upper the side grippers are swung inwardly widthwise of the shoe by novel means provided for this purpose, so as to avoid interference with the means whereby the upper is fastened in lasted position. To this end, there is associated with each of the side grippers a device which swings the gripper inwardly in response to further movement of the gripper heightwise of the last after its release of the upper, this device, as shown, comprising a bell-crank lever engaged and operated by a lug on the gripper and acting against the resistance of a spring which tends to swing the gripper outwardly.

Still other important features of the invention are to be recognized in novel means for fastening the upper in lasted position. For this purpose the machine herein shown is provided with a novel organization of means for feeding binder wire for use in holding the upper around the toe against a lip or shoulder on a sole, means for severing from the wire a portion to serve as a toe binder, and means for driving fastenings to fasten the binder to the shoe. The feeding means, in accordance with one novel feature, is mounted to move laterally of the shoe with one of the toe wipers and for this purpose is supported on one of the wiper carriers. As herein shown, the feeding means is operated automatically to feed the binder wire along a groove provided at the wiping edges of the wipers after the wipers have been moved inwardly far enough to engage the upper in the toe-lasting operation, but it is to be understood that the invention is not limited to means for feeding the binder material at that particular time in the cycle of the machine. To fasten the binder to the shoe there are provided, in the construction shown, fastening-inserting devices supported on the wiper carriers and movable with the wipers laterally of the shoe, these devices being also movable relatively to the wipers into fastening-inserting positions determined by stop faces on the wipers. The fastenings are driven alongside of the end portions of the binder at the outer side thereof, and in accordance with one feature of the invention they are deflected laterally inward as they are driven, so as to press the binder inward toward the lip or shoulder of the sole and to bend abruptly inward the portions of the binder which they engage, for better insurance that the binder will be securely held by the fastenings. The fastenings utilized in the machine herein shown are tacks, and in accordance with a further feature the tacks are driven into positions to clamp the binder upon the shoe by their heads. If desired, however, one of the fastenings at each side of the shoe bottom may, as illustrated, be driven only part way into the shoe to permit the end of the binder to be bent around it by the operator after removing the shoe from the machine. As the machine herein shown is organized, the fastening-inserting devices are moved relatively to the wipers into their fastening-inserting positions and are then operated to drive the fastenings by devices which are supported independently of the wiper carriers and wipers and are moved laterally of the shoe relatively to the wipers. It will be recognized that, in addition to securing the binder, the fastenings serve directly to hold the upper at the opposite sides of the shoe bottom; and it will be evident that in some aspects the disclosed organization of upper-fastening means embodies novel features which are not dependent upon the use of a binder.

The above and other features of the invention, including also novel tip gage mechanism, novel means for controlling the shoe holder which acts on the top of the forepart of the shoe, novel wiper-operating and controlling means, and various novel details of construction and combinations of parts, will now be more particularly described by reference to the accompanying drawings and pointed out in the claims.

In the drawings,

Fig. 6 is a sectional view, on an enlarged scale, of a portion of the structure shown in Fig. 5;

Fig. 7 is a section on the line VII—VII of Figs. 6 and 8;

Fig. 8 is a section on the line VIII—VIII of Fig. 7;

Fig. 9 is a view substantially in front elevation of one of the corner grippers and parts associated therewith;

Fig. 10 is a section on the line X—X of Fig. 9;

Fig. 11 shows in elevation a portion of the structure of Fig. 9 as viewed from the left of that figure;

Fig. 12 is a view substantially in front elevation of one of the side grippers and parts associated therewith, with certain parts broken away.

Fig. 13 is a longitudinal section through the gripper shown in Fig. 12;

Fig. 14 is a section on the line XIV—XIV of Fig. 13;

Fig. 15 is a view of parts of the gripper-jaw-closing means shown in Fig. 13, in disassembled relation;

Fig. 24 is a section on the line XXIV—XXIV of Fig. 21;

Fig. 25 is a section on the line XXV—XXV of Fig. 21;

Fig. 26 is a section on the line XXVI—XXVI of Fig. 21;

Fig. 27 is a section on the line XXVII—XXVII of Fig. 26;

Fig. 28 is a plan view of a portion of the wire-feeding mechanism shown in Fig. 21, with parts broken away;

Fig. 29 is a view in left-hand side elevation, with parts broken away, showing the means for operating the wire-feeding mechanism shown in Fig. 21;

Fig. 30 is a section on the line XXX—XXX of Fig. 29;

Fig. 31 is a section on the line XXXI—XXXI of Fig. 29;

Fig. 32 is substantially a plan view of the means provided for positioning and operating the tacking mechanisms associated with the toe wipers and for also operating the wire-shearing mechanism, parts of the structure being broken away;

Fig. 33 is a section on the line XXXIII—XXXIII of Fig. 32, on an enlarged scale;

Fig. 34 is a section on the line XXXIV—XXXIV of Fig. 32, also on an enlarged scale;

Fig. 35 is a view in right-hand side elevation, with parts broken away, showing the means provided for separating, inverting and delivering the tacks;

Fig. 36 is a front view, with parts broken away, of a portion of the structure shown in Fig. 35;

Fig. 37 shows parts of the structure of Fig. 35 as viewed from the left-hand side of the machine, with the tack inverter shown in section in tack-receiving position;

Fig. 38 shows parts of the structure of Fig. 35 as viewed from the right-hand side of the machine, with certain parts in section;

Fig. 39 is substantially a plan view of mechanism provided for varying the amount and limit of the foredrawing movements of the grippers;

Fig. 40 is a section on the line XL—XL of Fig. 39;

Fig. 41 is a front view of portions of the structure shown in Fig. 39, with parts in section;

Fig. 42 is a front view also of a portion of the mechanism shown in Fig. 39 and of parts associated therewith;

Fig. 45 is a plan view of the work-supporting and positioning means;

Fig. 46 is a section on the line XLVI—XLVI of Fig. 45;

Fig. 47 is a section on the line XLVII—XLVII of Fig. 45;

Fig. 48 is a section on the line XLVIII—XLVIII of Fig. 47;

Fig. 49 is a section on the line XLIX—XLIX of Fig. 20;

Fig. 50 is a plan view of a portion of the mechanism for imparting foredrawing movements to the grippers, with parts broken away;

Fig. 51 is a section on the line LI—LI of Fig. 2;

Fig. 52 is a section on the line LII—LII of Fig. 2;

Fig. 53 is a section on the line LIII—LIII of Fig. 2;

Fig. 54 is a section on the line LIV—LIV of Fig. 3;

Fig. 55 is a section on the line LV—LV of Fig. 3;

Fig. 56 is a section on the line LVI—LVI of Fig. 3;

Fig. 57 is a section on the line LVII—LVII of Fig. 3;

Fig. 58 shows substantially in front elevation a portion of the mechanism shown in Fig. 3 for controlling the heel rest;

Fig. 59 shows in side elevation, on an enlarged scale, another portion of the heel-rest-controlling mechanism shown in Fig. 3;

Figs. 64, 65 and 66 are views partly in left-hand side elevation and partly in section longitudinally of the shoe, illustrating the positions of certain parts of the machine including the toe grippers at different times in the cycle;

Figs. 67, 68, 69, 70 and 71 are sectional views illustrating the positions of certain parts including the side grippers, the toe wipers and the tacking means at different times in the cycle; and Fig. 72 is a perspective view of the forepart of a shoe as it appears after having been operated upon by the machine.

Figure 3:
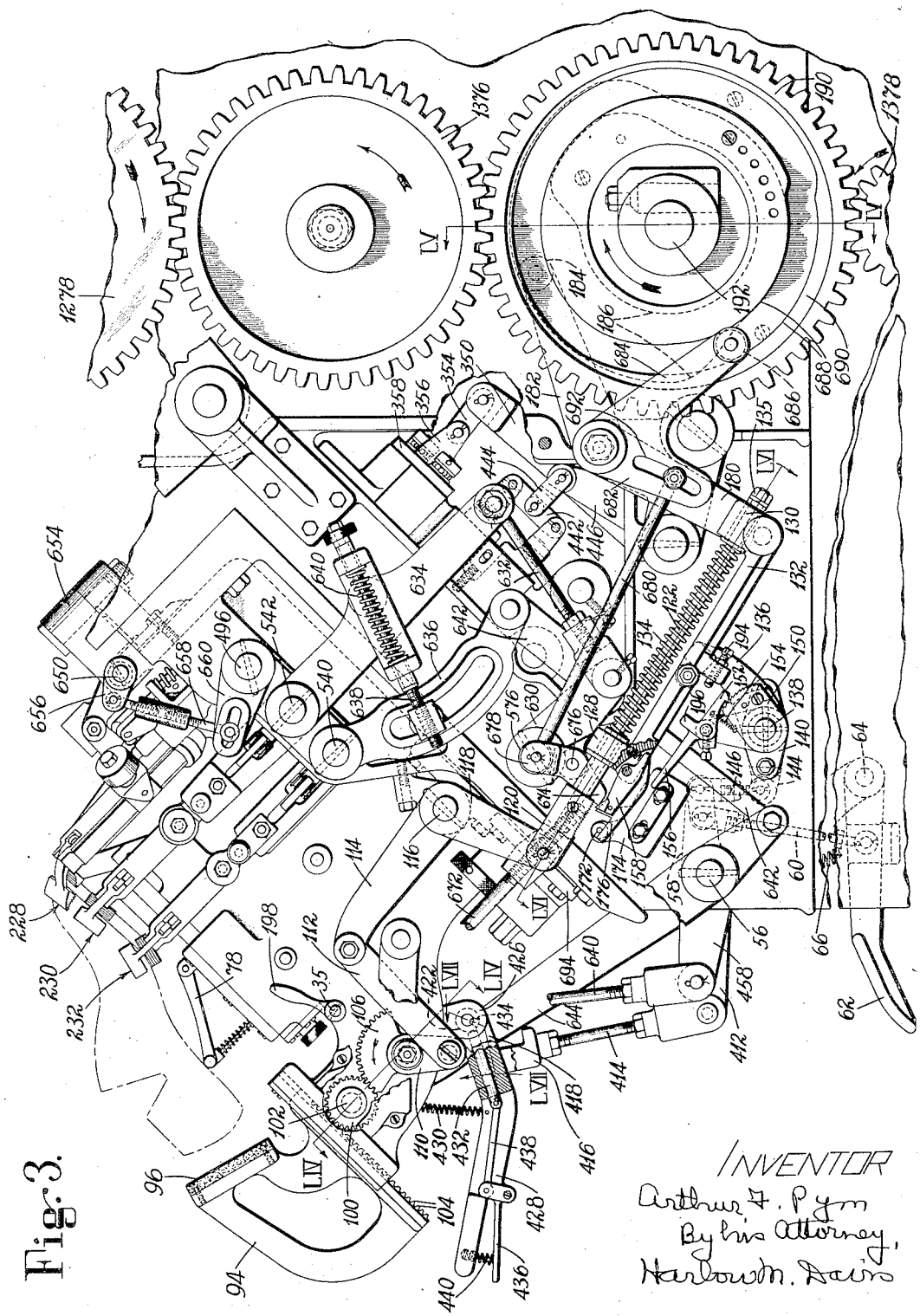
Fig. 3 is a view of a portion of the machine in right-hand side elevation, on an enlarged scale, with parts broken away.

The machine shown is provided with means for supporting each last and shoe bottom downward in an inclined position with the toe end of the shoe pointing upwardly and rearwardly, as illustrated by dotted lines in Fig. 3, so that the operator can conveniently view the top of the forepart of the upper in the upper-pulling operation. For operating upon welt shoes the work-supporting means comprises a toe plate 2 (Figs. 6 and 45) arranged to engage the bottom face of the insole inside of the welt-attaching lip and formed substantially to fit the inner face of the lip around the end and along the sides of the toe to position the forepart of the shoe laterally and to support the lip against the pressure of the toe wipers. The operator presents the work initially to the machine with the bottom face of the insole in engagement with the top face of this plate and preferably with the inner face of the insole lip against the end and side faces of the plate, after which the last and shoe are moved by the plate lengthwise to carry the toe-end face of the last into contact and an end gage or stop 4 which is controlled as hereinafter described and determines the lengthwise position of the last and shoe and holds the last against lengthwise displacement in the upper-pulling operation. For this purpose the plate 2 is detachably positioned by means of dowel pins 6 and 8 on another plate 10 which is fastened to a slide 12 movable in directions lengthwise of the shoe in a guideway formed in a casting 14 which is part of the frame of the machine, this slide extending underneath a cover plate 16 on the frame casting. Fastened on the forward end of the slide 12 is a plate 18 in which is swiveled a screw 20 having a knurled head 22 thereon for turning it, the screw being threaded in a slide 24 underlying the slide 12 and also movable along a guideway in the casting 14 (Fig. 46). Lengthwise movement of the screw 20 relatively to the plate 18 is prevented by the knurled head 22 at one side of the plate and by a collar 26 (Fig. 48) fast on the screw at the other side of the plate. Mounted in sockets in the slide 24 are two springs 28 which are seated at their forward ends against a plate 30 fast on the casting 14, this plate being provided with pins 32 which extend within the springs to assist in positioning them. It will thus be seen that the springs 28 tend to force the two connected slides 24 and 12 and the toe plate 2 carried thereby in a direction toward the end gage 4.

The toe plate 2 is held initially retracted from the end gage 4 by a latch 34 (Fig. 6) which is fast on a rock shaft 35 on the casting 14 and is arranged to engage a lug 36 on the slide 24. Pivotally connected to this latch is a yoke member 38 through an opening in which extends the upper end of a rod 40. Fast on the upper end of the rod 40 is a collar 42 through which downward movement is imparted by the rod to the yoke member to withdraw the latch 34 from operative position and thus permit the springs 28 to force the toe plate 2 toward the end gage 4. Between the lower end of the yoke member 38 and a collar 44 fast on the rod 40 is a spring 46 which serves a purpose hereinafter described. The rod 40 at its lower end is pivotally connected to an arm 48 mounted to turn on a rod 50 on the frame of the machine, and this arm is connected by a link 52 to an arm 54 fast on a rock shaft 56. Also fast on this rock shaft is an arm 58 (Fig. 3) extending in the same direction from the rock shaft as the arm 54 and connected by a link 60 to a treadle 62 which is pivoted at 64 on the frame, the treadle being normally elevated by a spring 66. It will thus be seen that when the treadle 62 is depressed the latch 34 is operated to release the slide 24 so that the toe plate 2 is moved by the springs 28 to carry the last into contact with the end gage 4.

The operator thus depresses the treadle after he has presented the shoe with the insole resting on the plate 2 and the lip in contact with the end and side faces of the plate, as above described. It will be understood that the operator holds the shoe pressed down on the toe plate as the plate and the shoe are moved toward the end gage 4.

After the toe plate 2 has thus been moved toward the end gage, it is desirable to lock it against reverse movement so that it will firmly support the insole lip at the end of the toe against the thrust of the toe wipers in the lasting operation. For this purpose the slide 24 has pivotally mounted thereon a latch 68 (Figs. 6 and 46) controlled by a spring 70 which tends to depress it and holds it against an underlying rod 72 mounted on the casting 14. This rod has a flattened end 74 (Fig. 5) which is engaged by lugs on the casting to prevent the rod from turning, and formed in the rod is a notch 76 into which the end of the latch 68 is forced by the spring 70 when the toe plate 2 arrives in position to press the end of the last against the end gage 4. It will be evident that the latch thus holds the plate positively against reverse movement. By turning the screw 20 the slide 12 and the plate 2 supported thereon may be initially adjusted relatively to the slide 24 which carries the latch 68 so that the plate will be in exactly the right position relatively to the end gage 4 when the latch snaps into the notch 76 in the rod 72.

Instead of positioning the work initially with the lip of the insole at the end of the toe in engagement with the end face of the toe plate 2, the operator may rest the bottom face of the insole on the toe plate with the toe-end face of the last in contact with the end gage 4. If the work is presented in that manner the toe plate, when released by the treadle, is moved by its springs relatively to the shoe along the insole until its end face engages the inner face of the lip at the end of the toe. When the plate arrives in this position it is locked by the pawl 68 against reverse movement in the same manner as above described.

To assist the operator in positioning the shoe in proper relation to the toe plate 2, there is provided a member 78 (Figs. 3, 6, 45 and 47) arranged to underlie and support the shoe at the rear of the forepart, i. e., nearer the heel end of the shoe than the plate 2. This member is pivoted at 80 on lugs on the cover 16 and has a shoe-engaging bar 81 formed to extend straight laterally of the shoe and beyond the shoe at both sides thereof, as will be evident by reference to Fig. 47. Pivotally connected at its upper end to the bar 81 is a rod 82 which extends downwardly through an opening in a bracket 84 fast on the cover 16. Mounted on the rod is a spring 86 which bears upwardly against a washer 88 seated on a shoulder on the rod and bears downwardly against a washer 90 seated on the bracket 84 and thus tends to swing the shoe support member 78 in an upward direction. Such upward movement of the member is adjustably limited by a nut 92 threaded on the rod 82 below the bracket 84. It will be understood that the member 78 will be adjusted by this means so that the bottom face of the toe-end portion of the insole will be seated evenly upon the toe plate 2 when the shoe is presented with the rear portion thereof resting on the member 78.

To assist in supporting the shoe against lengthwise movement in response to pressure of the toe wipers on the toe end thereof there is provided a heel rest 94 which is movable lengthwise of the shoe along guideways on the frame casting 14 and may be provided, as shown, with a layer 96 of felt or other suitable material for engaging the heel-end face of the shoe, the layer 96 and the face of the heel rest on which it is mounted extending straight laterally of the shoe for engaging any shoe regardless of the lateral position of its heel end. The initial position of the heel rest is determined by a pin 98 (Fig. 6) which is carried thereby and arranged to engage a shoulder on the casting 14. The heel rest is thus positioned initially at a distance from the heel end of the shoe, as illustrated in Fig. 3, to facilitate the presentation of the work, and it is moved into contact with the shoe by the same treadle 62 which releases the toe plate 2 as above described. For thus operating the heel rest there is provided a pinion 100 (Figs. 3 and 54) mounted to turn on a rod 102 on the casting 14 and engaging rack teeth 104 formed on the lower face of the heel rest. The pinion 100 is engaged by a gear sector 106 mounted to turn on a rod 108, and integral with this gear sector is an arm 110 connected by a link 112 to another arm 114 fast on a rock shaft 116. Also fast on this rock shaft is an arm 118 pivotally connected to a yoke member 120 in which is secured one end of a rod 122 (Figs. 3 and 56). This rod extends through sleeves 124 and 126 which are slidingly mounted thereon and are also slidingly mounted in bearings provided in lugs 128 and 130 formed on a bar 132. Enlarged heads on these sleeves engage the inner faces of the lugs 128 and 130, as illustrated in Fig. 56, and mounted on the rod 122 between these heads is a compression spring 134. The sleeve 126 is confined on the rod 122 by a nut 135, and one end of the sleeve 124 is seated against the yoke member 120. It will thus be evident that by lengthwise movement toward the left, as the parts are shown in Figs. 3 and 56, the bar 132 acts through the spring 134 to impart movement in the same direction to the yoke member 120 and thereby, through the connections described, to move the heel rest 94 into engagement with the shoe, and that continued movement of the bar after movement of the heel rest has been stopped by the shoe will result in compression of the spring 134 through the action of the lug 130 and the sleeve 126 on the spring, the other lug 128 sliding along the sleeve 124.

For imparting such movement to the bar 132 by the treadle 62 there is provided an arm 136 (Figs. 3 and 56) fast on a rock shaft 138 which is mounted to turn in a bearing in a bracket 140 fast on the frame of the machine, this arm being arranged to engage a roll 142 carried by the bar 132. Also fast on the rock shaft 138 is an arm 144 connected by a link 146 to the previously mentioned arm 58 which is operated by the treadle 62. Depression of this treadle, therefore, serves to operate the bar 132 as described substantially at the time when the latch 34 is moved by the treadle to release the toe plate 2. Whatever may be the length of the shoe, the heel rest 94 will be moved by the treadle into contact with its heel-end face, the spring 134 yielding more or less in response to such further movement of the bar 132 as may take place after the heel rest has been stopped by the shoe. In order to permit the operator to remove his foot from the treadle 62, as he will conveniently do prior to starting the power operation of the machine, without retractive movement of the heel rest from its shoe-engaging position, the rock shaft 138 has fast thereon a ratchet plate 150 the teeth of which are engaged by a pawl 152 pivotally mounted on an arm of the bracket 140 and controlled by a spring 154. By this means the arm 136 is retained in the position to which it is moved by the treadle and the treadle is retained in its depressed position. A tail 156 on the pawl 152 may be engaged by the operator to release the heel rest and permit it to return to its starting position if desired.

To insure further against any lengthwise displacement of the shoe in a heelward direction in the toe-lasting operation, the machine is provided with means for automatically pressing the heel rest more firmly against the shoe by further movement of the bar 132 and for thereafter holding it positively against any movement in response to pressure of the shoe thereon. As shown in Figs. 3 and 59, the bar 132 carries a pair of pawls 158 and 160 are arranged in staggered relation to each other for greater precision, and formed on the lower face of the yoke member 120 are ratchet teeth 162 with which the pawls cooperate. The two pawls are pivoted on a pin 164 on the bar 132, and the pawl 158 carries a pin 166 which extends into a slot 168 in the pawl 160. Tails on the pawls are engaged by springs 170 which tend to swing the pawls into engagement with the ratchet teeth 162. The two pawls are held initially out of engagement with the ratchet teeth by a pin 172 mounted on a bracket 174 adjustably secured to the frame of the machine, this pin engaging the upper face of a finger 176 on the pawl 160. By this means the pawls are held out of engagement with the ratchet teeth throughout the movement imparted to the bar 132 by the treadle. When the bar is thereafter further moved by power in the cycle of the machine, an inclined face 178 on the pawl 160 arrives in a position below the pin 172, so that the springs 170 are permitted to swing the pawls upwardly into locking position. One or the other of the pawls then serves as a positive connection between the bar 132 and the yoke member 120 which is connected positively to the heel rest as described. For imparting such further movement to the bar 132 there is pivotally connected to the rear end of the bar (Fig. 3) one arm 180 of a bell-crank lever pivotally mounted on the frame of the machine, the other arm 182 of this lever carrying a roll 184 arranged to be engaged by a path cam 186 formed in one side of a cam disk 188 (Fig. 55) secured to a gear wheel 190 which is fast on a shaft 192 driven as hereinafter described. The path cam 186 has an enlarged portion, as shown, in which the roll 184 initially lies to permit such swinging movement of the arm 182 as results from the depression of the treadle 62. Substantially at the time in the cycle when the toe wipers apply to the shoe substantial pressure such as might displace it lengthwise, the cam 186 becomes effective on the roll 184 to impart to the bar 132 a short further movement such as to increase the pressure of the heel rest on the shoe and to cause the pawls 158, 160 to engage the teeth 162, after which the cam acts through the bar 132 and one or the other of the pawls to hold the heel rest positively against reverse movement. As this short further movement is imparted by the cam to the bar 132, a screw 194 carried by the bar acts on a lug 196 of the pawl 152 to disengage the pawl from the ratchet plate 150 and thus to release the treadle 62 and the parts connected therewith to permit them to be returned to their starting positions by the treadle spring 66. Near the end of the cycle the cam 186 acts through the connections described to return the heel rest to its starting position.

If the operator should desire to release the toe plate 2 to the action of the springs 28 prior to the depression of the treadle 62 which operates the heel rest, he is enabled to do so by movement of a handle 198 (Fig. 3) fast on the rock shaft 35 on which the latch 34 (Fig. 6) is fastened. It will be understood that when the latch is thus operated manually the yoke member 38 connected to it slides along the rod 40 against the resistance of the spring 46.

Figure 60:
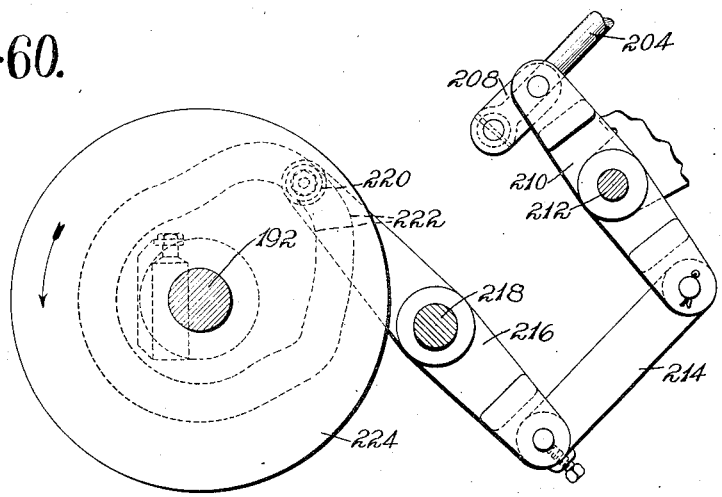
Fig. 60 shows in left-hand side elevation a portion of the mechanism provided for controlling the toe-end gage.

The toe end gage 4 is fast on a member 200 (Fig. 6) mounted for upward and downward movements along a guideway on the frame casting 14, and this member is connected by a link 202 to a rod 204 which is slidingly movable lengthwise in a sleeve 206 mounted in a bearing in the casting 14. At its lower end the rod 204 is connected by a link 208 to a lever 210 mounted to turn on a rod 212 on the frame, and this lever is connected by a link 214 (Fig. 60) to a lever 216 mounted to turn on a rod 218. The lever 216 carries a roll 220 engaged by a path cam 222 formed in one side of a cam wheel 224 fast on the cam shaft 192. By the action of this cam the end gage 4 is moved gradually downward in a direction substantially perpendicular to the plane of the forepart of the shoe bottom in the course of the upper-pulling operation, and is withdrawn from contact with the work in time to be out of the way of the toe wipers when they wipe the upper heightwise of the toe.

Figure 65:
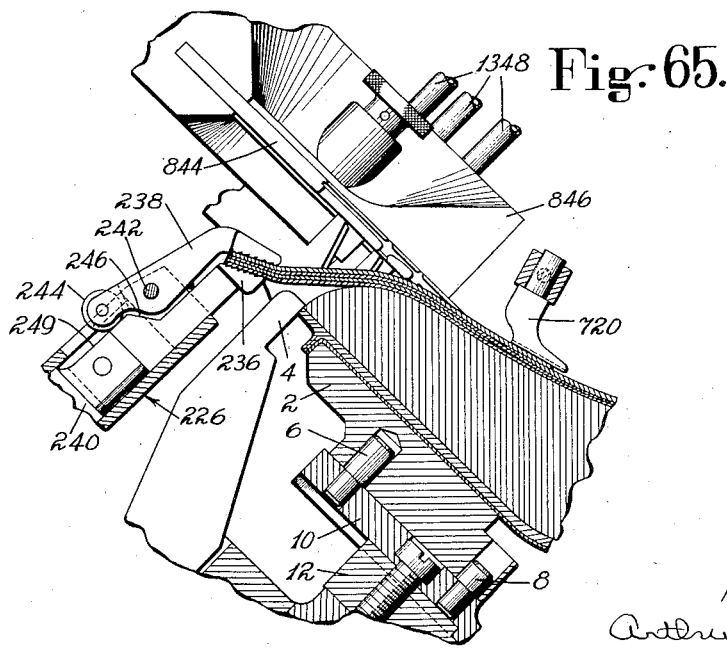

For pulling the upper over the last there are provided three toe grippers and two grippers for each side of the forepart at the rear of the toe grippers. The three toe grippers comprise a central or end gripper 226 (Fig. 6) for pulling the upper at the end of the toe and two grippers 228 with their jaws in angular relation to the central toe gripper jaws for pulling the upper at the corners of the toe. The two side grippers at each side comprise a front side gripper 230 for pulling the upper in a location substantially at the end of the tip stem, if the shoe is provided with a toe tip, and a rear side gripper 232 for pulling the upper in a location substantially at the ball of the shoe, as indicated in Fig. 3. The several grippers are all substantially alike in construction, each of them comprising a casing 234 (Fig. 13) having at the upper end thereof a pair of upper-gripping jaws 236 and 238. In order to provide a wide space between the gripper jaws to receive the margin of the upper materials, and yet to afford provision for a quick gripping of the upper materials by the jaws and a quick release thereof, both jaws 236 and 238 in the construction herein shown are mounted for closing and opening movements. The jaw 236, which may be termed the inner jaw, has a depending shank portion 239 the lower end of which is secured in a slot in the upper end of a slide 240 mounted in the casing 234 for rectilinear upward and downward movements with the jaw in directions substantially parallel to the direction of the downward pull of the gripper on the upper, the jaw 236 being arranged to abut against the upper end of the casing 234 when the jaws are open. The jaw 238, which may be termed the outer jaw, is mounted to swing on a pin 242 on the casing 234 and is provided at its lower end with a roll 244 arranged to be engaged by a cam face 246 on the shank portion 239 of the jaw 236 to swing the upper-gripping portion of the jaw 238 inwardly toward the last to a position over the jaw 236 and in line with the path of movement thereof, as well as somewhat downwardly, as the jaw 236 receives its upward movement. Such swinging movement of the jaw 238 is against the resistance of a torsion spring 248 which holds the jaw initially in open position as illustrated in Fig. 13 with the roll 244 against a straight upwardly extending face on the shank portion 239. The swinging of the jaw 238 is completed shortly before the completion of the upward movement of the jaw 236 and before the upper is actually gripped, the roll 244 then engaging a face 249 formed partly on the shank portion 239 of the jaw 236 and partly on the slide 240 parallel to the direction of movement of the slide, as the jaw 236 receives further upward movement to grip the upper. The positions of the parts when the jaws are fully closed are as illustrated in Fig. 65. It will be evident that the jaw 236 will start its opening movement and will release the upper before the jaw 238 begins to open. Furthermore, regardless of the timing of the movements of the jaws, the upper would in any case be released by movement of the jaw 236 alone if the jaw 238 should be prevented from opening by pressure of the toe wipers against it in a manner hereinafter described. Insurance is thus afforded under all conditions of a prompt release of the upper by the grippers at the required time in the operation of the toe wipers.

For imparting upward movement to the slide 240 which carries the jaw 236 there is provided a closing slide 250 movable upwardly and downwardly in the casing 234 and held from turning in the casing by a key 252. Mounted in a recess in the slide 240 is a spring 254 through which the slide 250 acts to impart closing movements yieldingly to the jaws. Extending upwardly from the slide 250 through the spring 254 and into a bore 256 in the slide 240 is a stem 258 which carries a pin 260 lying in a slot 262 in the slide 240. This pin prevents the slide 240 from turning and also serves to transmit downward movement to this slide from the slide 250 in the opening of the gripper jaws. The pin 260 and the slot 262 are further so arranged that the spring 254 is maintained initially under compression.

Upward jaw-closing movement is imparted to the slide 250 by a member 264 which for that purpose is rotatable in the casing 234 about an axis extending lengthwise of the gripper in substantially parallel relation to the direction of the downward pull of the gripper on the upper, in general similarity to jaw-closing means disclosed in the previously mentioned Letters Patent, this member in the construction herein shown being provided on its upper end with a spiral track 266 (Fig. 15) arranged to engage a complementally formed spiral track 268 on the lower end of the slide 250. It will thus be seen that the tracks 266 and 268 act as cooperating cam faces whereby the slide 250 is forced upward as the member 264 is turned in one direction. In order to impart downward movement to the slide 250 when the member 264 is turned in the other direction, there is secured in a recess in the member 264 a stem 270 (Fig. 13) which extends upwardly into a recess 272 (Fig. 15) in the slide 250, the stem being omitted from Fig. 15. The stem 270 has therein a spiral groove or cam slot 274 parallel to the spiral tracks 266 and 268, and into this groove extends a pin 276 carried by the slide 250. It will be understood that the groove 274 and the pin 276 assist in forcing the slide 250 upwardly to close the jaws and are effective to impart downward movement to the slide when the member 264 receives its reverse turning movement.

The member 264 has a diametrically enlarged portion 278 which lies in an enlarged bore in the casing 234 to hold the member against upward movement relatively to the casing, and below this enlarged portion is a washer 280 seated against the lower end of the casing 234 and confined by a cap 282 threaded on the lower end of the casing, this cap serving also to confine a roller bearing 284 for the member 264 and for a stem 286 extending from this member. The stem 286 is connected by a universal joint 288 to a shaft 290 which is rotatable to close and open the gripper jaws through the mechanism described, the universal joint connection permitting movements of the gripper in directions transverse to the direction of its downward movement, as more fully hereinafter explained.

Figure 4:
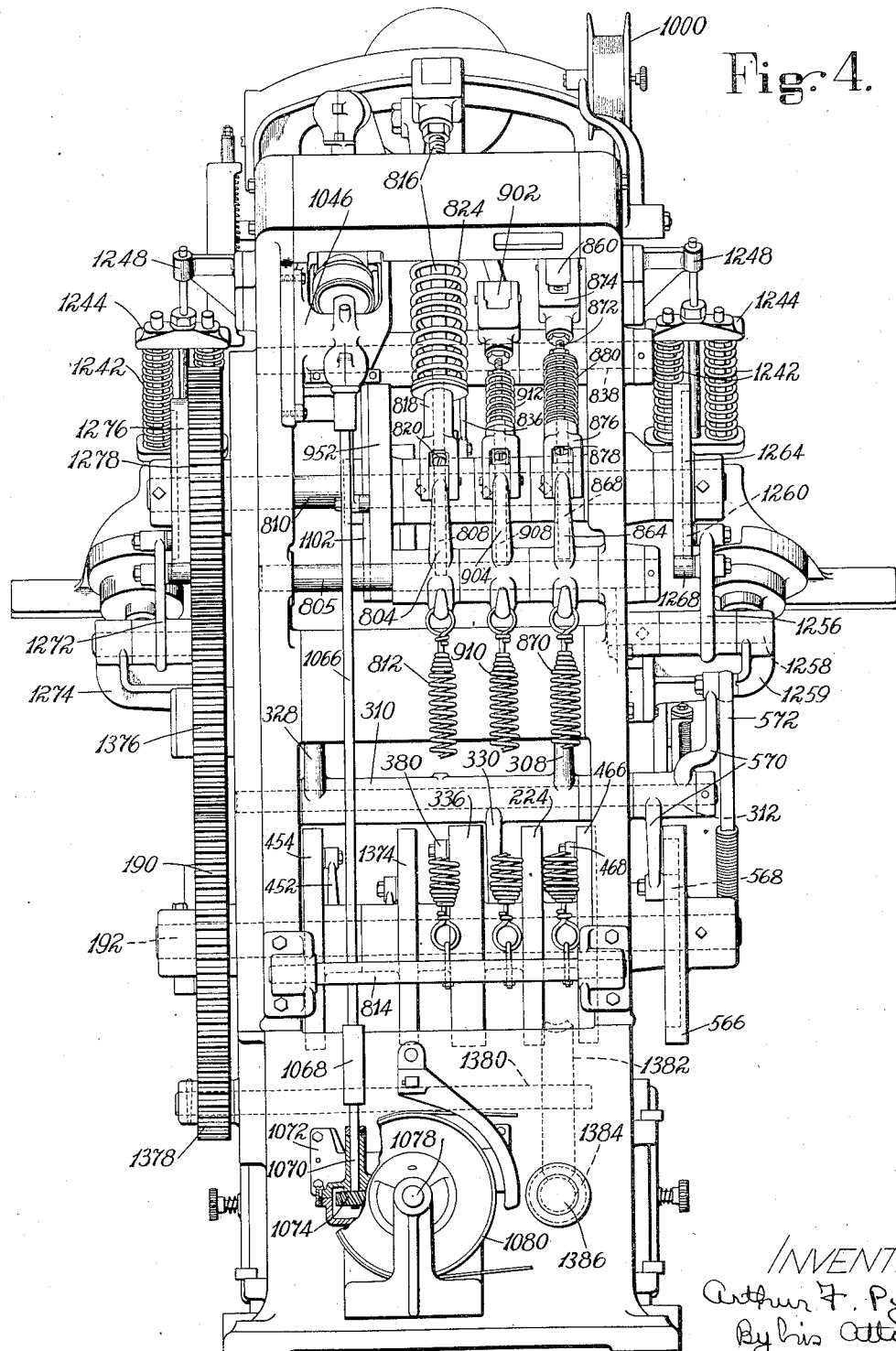
Fig. 4 shows the machine in rear elevation, with parts broken away.

The several gripper-jaw-closing shafts 290, of which there is one for each of the grippers, are arranged and operated substantially as disclosed in the previously mentioned Letters Patent. These shafts are parallel to one another and are extended downward (Fig. 6) through bearings in the frame casting 14 which are of greater diameter than the shafts, and mounted on each of the shafts are two sleeves 292 and 294 of the same diameter as the bearing in the casting, these sleeves being pinned to the shaft to turn therewith. Between these two sleeves each of the shafts 290 has formed thereon an elongated pinion 296 through which the shaft is turned to close and open the gripper jaws. The three pinions 296 on the shafts connected respectively to the front and rear side grippers and the corner toe gripper at the left-hand side of the machine (Figs. 7 and 8) are all engaged by a rack bar 298 mounted for sliding movement in the casting 14. Adjacent to the rack bar 298 is an operating slide 300 connected to the rack bar by a pin 302. The slide 300 is confined in guideways in the casting 14 by gibs 304 and is connected by a link 306 to a lever arm 308 (Figs. 4 and 61) formed on a sleeve 310 which is mounted for turning movement about a rod 312 on the frame. The three corresponding pinions 296 at the right-hand side of the machine are engaged by a rack bar 314 (Figs. 7 and 8). In order to turn these pinions simultaneously in the same directions as the other pinions, the rack bar 314 is connected by an idle pinion 316 to another rack bar 318 above it, this rack bar being connected by a pin 320 to an operating slide 322 confined by gibs 324 on guideways in the casting 14. The slide 322 is connected by a link 326 to a lever arm 328 formed on the sleeve 310 (Fig. 4). It will thus be seen that the three pinions at each side are all turned in the same directions as those at the other side by swinging movements of the arms 308 and 328 in one direction. For thus operating these arms there is integral with the sleeve 310 an arm 330 (Figs. 4, 5 and 61) which carries a roll 332 engaged and operated by a path cam 334 formed in one side of a cam wheel 336 fast on the cam shaft 192.

The pinion 296 on the jaw-closing shaft of the central toe gripper is engaged by a pinion 338 (Figs. 6 and 7) mounted to turn on a rod 340 fast on the casting 14, and the pinion 338 is engaged by a pinion 342 which turns on a rod 344. The pinion 342 is engaged and operated by a rack bar 346 (see also Fig. 8) which overlies the previously mentioned rack bar 298 and in the construction herein shown is connected by a pin 348 to the slide 300. It will thus be seen that the pinion 296 associated with the central toe gripper is turned in the same direction as the corresponding pinions associated with the other grippers to close the central toe gripper jaws simultaneously with the jaws of the other grippers.

Figure 61:
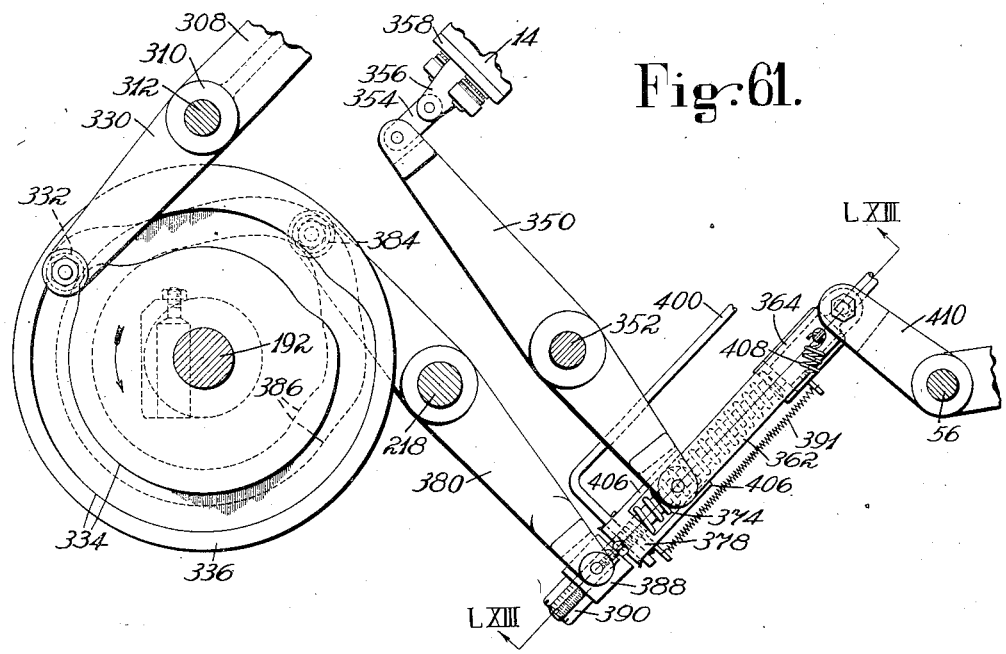
Fig. 61 is a view in left-hand side elevation of a portion of the toe-gripper-operating means.
Figure 63:
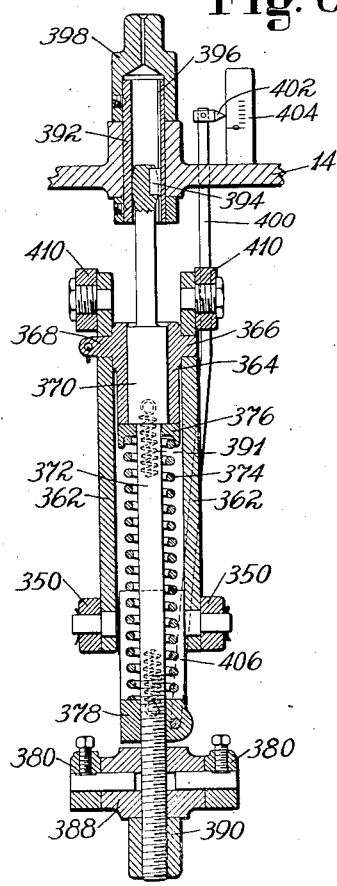
Fig. 63 is a section on the line LXIII—LXIII of Fig. 61.

The several grippers are operated to pull the upper heightwise of the last by downward movements of the shafts 290 and the sleeves 292 and 294 thereon in the bearings through which the shafts and the sleeves extend. The central toe gripper 226 and the two corner toe grippers 228 are thus operated simultaneously by a lever 350 (Figs. 5, 6 and 61) fulcrumed on a rod 352 on the frame. The lever 350 is connected by a link 354 to a lug 356 extending downwardly from a plate 358 through which all three toe gripper shafts 290 extend, this plate resting upon ball bearings supported by collars 360 which are fast on the ends of the shafts. The other end of the lever 350 is forked and is connected by links 362 (Fig. 63) to a sleeve 364 having projections 366 and 368 on which the links are mounted for turning movements. The sleeve 364 is slidingly mounted on a diametrically enlarged portion 370 of a rod 372, and on this rod is a spring 374 bearing at its upper end on a washer 376 which is seated against the lower end of the enlarged portion 370 of the rod and also engages the lower end of the sleeve 364. At its lower end the spring 374 bears on a member 378 which is threaded on the rod 372 and between which and the washer 376 the spring is maintained under compression. It will thus be seen that by upward movement with the rod 372 the member 378 acts through the spring 374 to raise the sleeve 364 and thus to impart upper-pulling movement to the lever 350. Such upward movement of the member 378 is effected by a lever 380 fulcrumed on the rod 218 and provided at its rear end with a roll 384 engaged by a path cam 386 formed in one side of the previously mentioned cam wheel 336. At its forward end the lever 380 is forked and is pivotally connected to a block 388 through which the rod 372 extends. The block 388 is not fast on the rod 372, but is movable relatively to the rod between limits determined by the member 378 and a nut 390 on the lower end of the rod. As the parts are initially positioned, there is a space between the block 388 and the lower end of the member 378, as illustrated in Figs. 61 and 63, the rod 372 being lifted as far as permitted by engagement of the washer 376 with the sleeve 364 by a spring 391 connected to the sleeve and to the member 378. This provides for some lost motion between the member 378 and the lever 380 which operates it, and the amount of this lost motion may be varied by adjusting the member 378 upwardly or downwardly along the rod 372 to vary the amount of upper-pulling movement imparted to the toe grippers. The member 378 is thus adjusted by turning the rod 372 on which the member is threaded, and for this purpose the rod is extended upwardly into a sleeve 392 rotatable in a bearing in the frame casting 14, the rod being connected to the sleeve by a key 394 carried by the rod and extending into a slot 396 in the sleeve along which the key is movable as the rod is carried upwardly in the upper-pulling operation.

Fast on the upper end of the sleeve 392 is a head 398 adapted to be engaged by a wrench to effect the adjustment. To afford the operator an indication of the condition of the parts with respect to adjustment there is connected to the member 378 a rod 400 which extends upwardly through an opening in the frame casting 14 and carries a pointer 402 located adjacent to a scale plate 404 fast on the casting. The member 378 has upwardly extending portions 406 at the front and rear of the spring 374 which serve by engagement with the links 362 to prevent any substantial turning movement of the member 378 when the rod 372 is turned.

It will be understood that the three toe grippers, by their pull on the upper heightwise of the last, draw forwardly on the last that portion of the tip seam which extends across the top of the forepart; and in order to position that portion of the tip seam with substantial accuracy at the proper distance from the toe-end face of the last by this heightwise pull on the upper, combined with a pull thereon lengthwise of the last through foredrawing movements of the grippers in a manner hereinafter described, the spring 374 is of such strength that it does not yield during the main pull of the toe grippers whereby the tip seam is thus properly positioned. Accordingly, this pull is actually a positive pull, the amount of movement which the toe grippers receive being varied as required by adjustment of the member 378.

In the return of the parts to starting positions the block 388 on the lever 380 is carried downwardly to permit the lowering of the rod 372, and the sleeve 364 is carried downwardly with the rod to effect the return of the toe grippers by a spring 408 connected at one end to the projection 368 on the sleeve and at the other end to the frame of the machine. The return movement of the toe grippers by the spring is limited by engagement of the plate 358 with the frame casting 14.

If the operator should observe, after the pull of the grippers on the upper, that the tip seam across the top of the forepart is not located at exactly the right distance from the toe-end face of the last, he is enabled to correct this condition by moving the toe grippers manually heightwise of the last either to increase or to decrease the force of their pull on the upper while the machine is at rest with the upper held under tension. For this purpose there is pivotally connected to the upper ends of the links 362 (Figs. 61 and 63) the forked rear arm 410 of a bell-crank lever mounted to turn on the previously mentioned rock shaft 56, this bell-crank lever having a forwardly extending arm 412 (Figs. 3 and 5) pivotally connected to the front end of which is an upwardly extending link 414. A yoke 416 on the upper end of this link is pivotally connected (Fig. 57) to arms 418 and 420 of a member 422 rotatably supported by bracket plates 424 and 426 (Fig. 54) which are fastened on the left-hand side of the frame casting 14. The arm 418 is integral with the member 422, and the arm 420 is secured to the member by means not shown. Mounted on the member 422 is a hand lever 428. This hand lever is normally disconnected from the member 422 so that this member may turn relatively to the hand lever as the toe grippers are operated by power to pull the upper, the hand lever being supported yieldingly at this time by a spring 430 (Fig. 3). This insures that the hand lever will not hit the operator in the power operation of the machine. To connect the hand lever 428 to the member 422 for turning the member to vary the force of the pull on the upper, there is slidingly mounted in the lever a pin 432 (Fig. 3) arranged to enter a recess 434 in the member 422 at the proper time. The pin is forced into the recess by the operator by use of a hand grip 436 pivoted on the lever 428 and connected by a link 438 to the pin. This hand grip is controlled by a spring 440 which normally holds the pin retracted. After the operator uses the lever 428 to vary as desired the force of the pull of the toe grippers, the pin 432 is retracted by the spring 440 to disconnect the lever from the member 422 and the lever is then returned to its normal position where it is supported by the spring 430. It will be understood that by depression of the hand lever 428 the links 362 (Figs. 61 and 63) are raised to move the toe grippers farther downward and thus to draw the tip seam nearer to the toe-end face of the last, and that by elevation of the hand lever the links are lowered against resistance of the spring 374 to raise the toe grippers and thus permit the elasticity of the upper to retract the tip seam somewhat away from the toe-end face of the last.

The two side grippers 230 and 232 at each side of the machine are operated and controlled by mechanisms of substantially the same construction as disclosed in the previously mentioned Letters Patent, and accordingly these mechanisms are not shown in complete detail and will be described only very briefly. The two grippers at the right-hand side of the machine are operated through a cross link 442 (Figs. 3 and 5) which is connected by a link 444 to a lever 446 mounted to turn on the rod 352. At its forward end this lever is connected through links 448 (only one of which is shown) and a spring 450 to a lever 452 mounted to turn on the rod 218, this lever being operated by a path cam formed in one side of a cam wheel 454 (Fig. 4) on the shaft 192. By means of a rotatable member 456 (Fig. 5) the amount of initial compression of the spring 450 may be varied. Connected to the lever 446 through the links 448 is a lever 458 (Fig. 6) mounted to turn on the rod 56 and connected by a link 460 to a hand lever 462 pivoted on a rod 464 on the frame casting 14. By use of the lever 462 the operator may move the two right-hand side grippers either to increase or to lessen the force of their pull on the upper. The two side grippers at the left-hand side of the machine are operated by a path cam formed in one side of a cam wheel 466 (Fig. 4) on the cam shaft 192 through a lever 468 corresponding in function to the previously mentioned lever 452 and connected to the grippers by means of the same character as above described for connecting the lever 452 to the grippers at the right-hand side of the machine, such means being more fully illustrated and described in the previously mentioned Letters Patent. The tension of the side-gripper-operating spring at the right-hand side of the machine is adjustable by a rotatable member 470 (Fig. 1) corresponding to the previously mentioned member 456, and the grippers at the left-hand side may be moved manually to increase or lessen the force of the pull by a hand lever 474 connected by a link 476 to a lever 478 corresponding in function to the previously mentioned lever 458. By use of the two hand levers 462 and 474 the operator may shift the forepart of the upper laterally to adjust it in proper relation to the last.

As the several grippers are moved heightwise of the last to pull the upper they are each guided by two plates 480 (Figs. 9 and 50) located at opposite sides of the gripper casing 234 and having flanges which lie in grooves 482 in the casing. The two plates 480 of each of the corner toe grippers 228 (Fig. 9) are pivotally connected to the forked end of a member 484 which is part of a gripper-controlling device positioned at the outer side of the gripper, i. e., the side farthest from the shoe, the member 484 being mounted to turn in a bearing in the upper end of a lever 486 arranged to extend heightwise of the last and being held in its bearing in the lever by a cap screw 488. The lever 486 is pivoted at 490 in a holder 492 supported by a plate 494 which is fast on a rock shaft 496 (Figs. 2, 3 and 10) extending laterally of the shoe and mounted in a bearing in the frame casting 14 for a purpose hereinafter described. Pivotally connected to the lever 486 is a link 498 which is also pivotally connected to a member 500 pivoted at 502 on a bracket 504 fast on the holder 492. Pivoted at its upper end to the member 500 and extending downwardly through an opening in a lug 506 on the bracket 504 is a rod 508 on which is a spring 510 under compression between the lug 506 and a nut 512 on the rod. It will thus be seen that the spring 510 tends to swing the gripper in a direction outwardly from the last. Cooperating with the spring 510 to determine adjustably the position of the gripper is a nut 514 which is threaded on the lower end of the rod 508 and rests on the plate 494. It will be understood that by turning the nut 514 the gripper may be adjusted inwardly toward or outwardly from the last. The holder 492 is secured to the plate 494 by a cap screw 516, and on its lower end the holder is provided with a curved rib 518 which lies in a correspondingly curved guideway 520 (Fig. 10) in the plate 494, the rib and guideway being curved about an axis coinciding substantially with the location of the gripper. This construction permits the gripper to be turned to adjust its jaws angularly in proper relation to the edge of the last bottom in operating on shoes of different styles and sizes. It will be understood that each of the two corner toe grippers is thus independently adjustable and is also independently adjustable by the nut 514 to position it properly in accordance with the size of the last.

Each of the front and rear side grippers 230 and 232 is adjustable inwardly or outwardly to position it properly for shoes of different sizes by means of the character shown in Fig. 12. The gripper-guiding plates 480 are pivotally connected to the forked end of a member 522 mounted to turn in the upper end of a lever 524 and held in position on the lever by a cap screw 526, the lever 524 being pivoted at 528 in a holder 530. Pivotally connected to the lever 524 and extending through an opening in the holder 530 is a rod 532 on which is a spring 534 under compression between the holder and a nut 536 on the rod, this spring tending to swing the gripper outwardly. Cooperating with the spring to determine adjustably the position of the gripper is a screw 538 threaded in the holder 530 and bearing at its inner end against the lever 524. The holder 530 associated with each of the rear side grippers 232 is fast on a rock shaft 540 (Figs. 2 and 3) mounted in a bearing in the frame casting 14 for a purpose hereinafter described. Similarly the holder 530 associated with each of the front side grippers 230 is fast on a rock shaft 542 on the frame casting.

When the side grippers 230 and 232 release the upper after having pulled it over the last it is desirable to swing them inwardly toward each other below the bottom of the last to avoid interference with means hereinafter described for fastening the upper at the sides of the forepart. For this purpose there is pivotally mounted on a rod 544 (Fig. 12) on the holder 530 associated with each of these grippers a bell-crank lever 546 having an upwardly and inwardly extending arm 548 in the path of downward movement of a lug 550 on the gripper casing 234, and an upwardly extending arm 552 arranged to engage the outer side of the lever 524 connected to the gripper. A torsion spring 554 tends to swing the bell-crank lever 546 outwardly and holds its arm 548 normally in contact with a shoulder 556 formed on the lever 524 in a recess in the lever through which the arm 548 extends. When the side grippers release the upper they are moved farther downwardly by their operating means, and in such downward movement of each of them its lug 550 by engagement with the arm 548 swings the bell-crank lever 546 in the direction to cause its arm 552 to swing the lever 524 inwardly against the resistance of the spring 534 and thus to carry the gripper jaws to an out-of-the-way position under the shoe.

Figure 2:
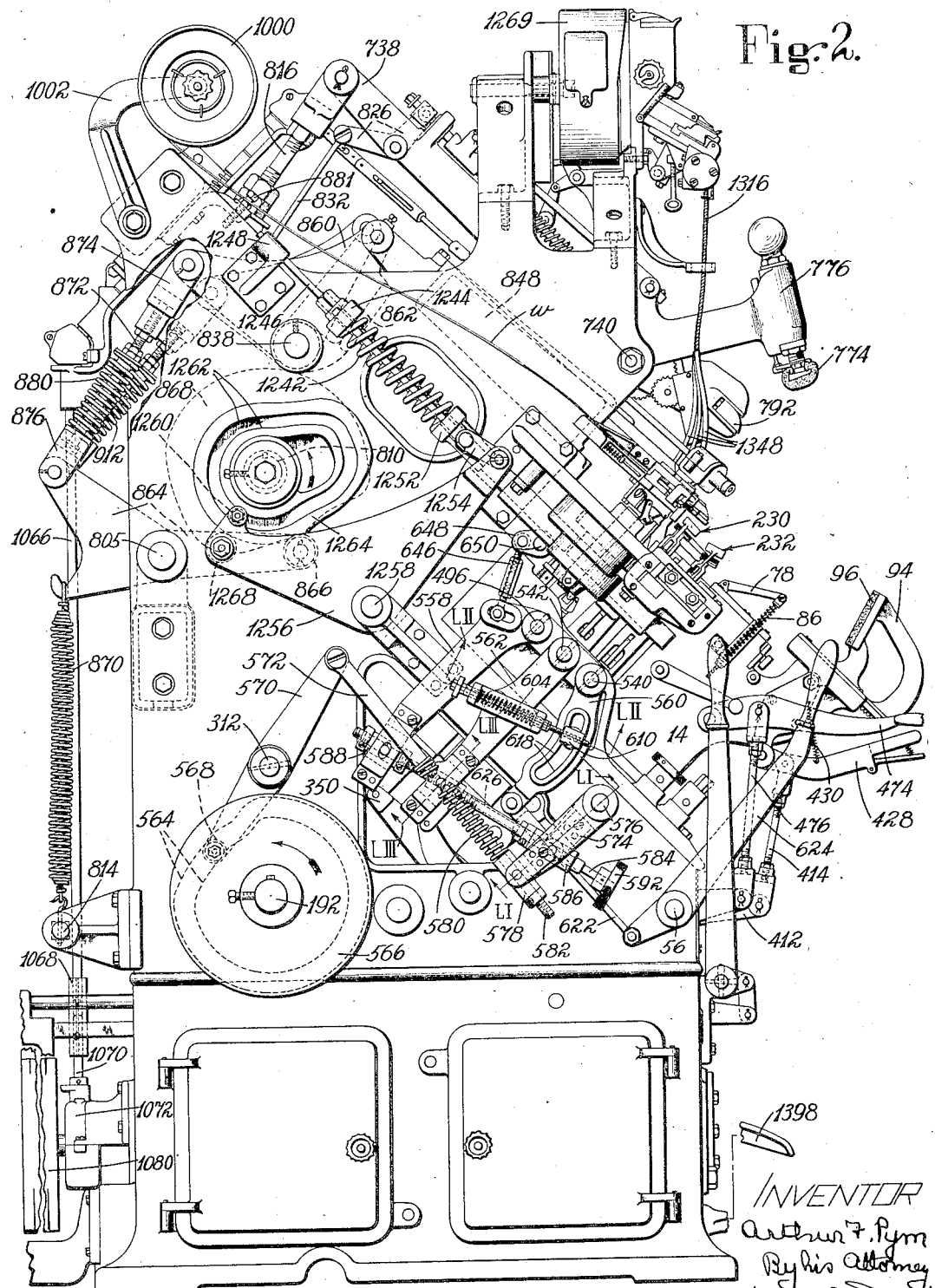
Fig. 2 is a view of the machine in left-hand side elevation.

The machine herein shown is provided with means for imparting to all the grippers foredrawing movements, i. e., movements lengthwise of the last to pull the upper forwardly toward the end of the toe, such movements occurring in the course of the upper-pulling movements of the grippers heightwise of the last. This assists in properly stretching the upper lengthwise and in locating the tip seam at the proper distance from the toe-end face of the last. The foredrawing movements are imparted to the corner toe grippers and the side grippers by turning the rock shafts 496, 540 and 542 on which the devices for controlling these grippers are mounted as above described. With reference first to the grippers at the left-hand side of the machine, there are fastened respectively to the rock shafts 496, 540 and 542 controlling these grippers depending lever arms 558, 560 and 562 (Fig. 2). These arms are operated by a path cam 564 formed in a cam wheel 566 (Figs. 2 and 4) fast on the cam shaft 192, this cam engaging a roll 568 carried by a lever 570 which is mounted to turn on the previously mentioned rod 312. The lever 570 is connected by a link 572 to a lever arm 574 (Figs. 2 and 51) which is mounted loosely on a rock shaft 576 supported in bearings in the frame. The link 572 extends through a trunnion block 578 which is pivotally supported on the arm 574, and between this trunnion block and a shoulder on the link is a compression spring 580. A nut 582 adjustably threaded on the link 572 and engaging the trunnion block 578 serves to maintain the spring 580 under compression. The arm 574 is connected to the lever arm 558 associated with the corner toe gripper by a rod 584 which is swiveled in a trunnion block 586 on the arm 574 and is held against lengthwise movement relatively to the trunnion block by collars fast on the rod at the opposite sides of the block. The rod 584 is also swiveled in a trunnion block 588 on the arm 558 and is held against lengthwise movement relatively to this trunnion block also by collars fast on the rod at the opposite sides of the block. The rod 584 also serves to connect the arm 574 to the lever arm 562 associated with the front side gripper 230, and for this purpose is threaded in a trunnion block 590 (Fig. 53) carried by this lever arm. It will thus be seen that when the arm 574 is swung in a counterclockwise direction by the lever 570 it serves to impart similar swinging movements to the two lever arms 558 and 562. It will further be evident that by turning the rod 584 the arm 562 may be adjusted to vary the position of the front side gripper lengthwise of the last. For this purpose there is fast on the rod a hand wheel 592.

Swinging movement is imparted to the lever arm 560 to impart foredrawing movement to the rear side gripper by connections between this arm and the arm 562. These connections (Fig. 52) comprise a rod 594 mounted in sleeves 596 and 598 which extend through bearings formed in lugs 600 and 602 on a bar 604 pivotally mounted on a pin 605 on the arm 562. These sleeves are provided with enlarged heads in engagement with the inner faces of the lugs, and mounted on the rod 594 between these heads is a compression spring 606. The sleeve 596 abuts against the flange 608 on the rod 594, and beyond this flange the rod is threaded in a block 610 which is swiveled in a sleeve 612 fast on the arm 560. Threaded on the other end of the rod 594 is a nut 614 which abuts against the sleeve 598 and against a shoulder on the rod and is held in place by a lock nut 616. It will thus be seen that relative movement in either direction is permitted between the bar 604 and the rod 594 against the resistance of the spring 606. The spring may or may not yield in the foredrawing operation, depending upon conditions. The amount of foredrawing movement imparted to the rear side gripper may be varied relatively to the movement of the front side gripper by adjusting the block 610 and the sleeve 612 along a slot 618 (Fig. 2) in the arm 560 to vary the effective length of the arm. The sleeve is secured in adjusted position by a nut 620 which is threaded thereon and serves to clamp the sleeve against the arm 560, as will be evident by reference to Fig. 52. By turning the rod 594 through use of the nut 614 fast thereon the arm 560 may be adjusted relatively to the arm 562 to vary the position of the rear side gripper relatively to the front side gripper. The lower end of the arm 560 is connected by a link 622 (Fig. 2) to a hand lever 624 mounted to turn on the shaft 56, and by use of this lever the operator may move the rear side gripper forwardly or rearwardly lengthwise of the last while the upper is held under tension to adjust the portion of the upper controlled by this gripper in proper relation to the last. It will be understood that such movement of the arm 560 in either direction is against the resistance of the spring 606 which yields to permit the movement of the arm.

Foredrawing movements are imparted to the two side grippers 230 and 232 at the right-hand side of the machine by connections with the lever arm 562 at the left-hand side of the machine. This arm is connected by a link 626 (Figs. 2, 51 and 53) to an arm 628 fast on the rock shaft 576 so that this shaft is turned as the arm 562 is swung in the foredrawing operation. The rock shaft 576 extends through to the right-hand side of the machine (Fig. 3) and has fast thereon at that side an arm 630 connected by a link 632 to the lower end of an arm 634 which is fast on the rock shaft 542 associated with the front side gripper 230. Fast on the rock shaft 540 associated with the right-hand rear side gripper 232 is an arm 636 which is operated by the arm 634 through connections of the same character as those above described between the arms 560 and 562 at the left-hand side of the machine, these connections comprising a rod 638 and a spring 640 corresponding respectively to the rod 594 and the spring 606 at the left-hand side. It will be understood that the operations and adjustments of these parts at the right-hand side of the machine are identical with those previously described at the left-hand side. The arm 636 is connected by a link 642 to a hand lever 644 mounted to turn on the shaft 56 and movable by the operator similarly to the lever 624 at the left-hand side to impart to the right-hand rear side gripper 232 movements lengthwise of the last relatively to the gripper 230 to adjust the upper in proper relation to the last. It will be understood that the operator will ordinarily manipulate both the levers 624 and 644 simultaneously to effect the proper adjustment of the upper when such adjustment is required.

Foredrawing movements are imparted to the central or end toe gripper 226 and to the corner toe gripper 228 at the right-hand side of the machine through connections with the lever arm 558 (Fig. 2) by which the foredrawing movement is imparted to the left-hand corner toe gripper. The arm 558 is connected by a link 646 (Figs. 2 and 50) to an arm 648 fast on a rock shaft 650 which extends across the machine and is mounted to turn in bearing members 652 and 654. At its right-hand end the shaft 650 carries an arm 656 (Figs. 3 and 50) which is connected by a link 658 to an arm 660 fast on the rock shaft 496 associated with the right-hand corner toe gripper. The connections between the rock-shaft 650 and the central toe gripper (Figs. 5, 6 and 50) comprise arms 662 which are fast on the shaft and are connected by links 664 to a yoke member 666 which is pivotally connected to the two plates 480 previously referred to as guiding the toe gripper in its downward and upward movements. The yoke member 666 has a stem 668 slidingly mounted in a bearing formed in a bracket 670 fast on the frame casting 14. It will thus be seen that foredrawing movements are imparted to the central toe gripper and to the right-hand corner toe gripper by the shaft 650 simultaneously with the foredrawing movements of the other grippers.

Reference has been made to the fact that by turning the rod 584 (Fig. 2) the arm 562 may be adjusted to vary preliminarily the position lengthwise of the last of the left-hand front side gripper. Through the connections described between the arm 562 and the arm 560 the left-hand rear side gripper also is adjusted lengthwise of the last in the same direction as the front side gripper by this means, and it will be further evident that through the connections between the arm 562 and the front and rear side grippers at the right-hand side of the machine, including the rock shaft 576, the right-hand front and rear side grippers likewise are adjusted lengthwise of the last in the same direction as those at the left-hand side by the turning of the rod 584.

In the machine herein shown the front side grippers 230 are depended upon to position the ends of the tip seam automatically at the proper distance from the toe-end face of the last by their foredrawing movements, and accordingly it is intended that the operator in presenting the work to the machine shall position the ends of the tip seam in definite relation to these grippers, preferably with the rear edge of the toe tip flush with the ends of the gripper jaws which are toward the operator. It will be evident that, for the purpose in view, it is necessary that the foredrawing movements of these grippers shall cease when they are in a definitely predetermined relation to the end face of the last and to the toe-end gage 4; and to insure that they will be moved each time to such predetermined positions, as well as for the sake of accuracy in the positioning of the portion of the tip seam which extends across the top of the forepart at the proper distance from the end face of the last by the foredrawing movements of the toe grippers combined with their positive movements heightwise of the last as hereinbefore described, the spring 580 previously referred to as mounted on the link 572 (Fig. 2) is of such strength as not to yield in the foredrawing movements of all the grippers, so that these movements are actually positive movements except for possible yield of the springs 606 and 640 in the connections for operating the rear side grippers. In order to stop the foredrawing movements of the grippers when the toe and front side grippers arrive in positions for accurately locating the tip seam, there is provided a rod 672 (Fig. 3) mounted as hereinafter described with its lower end in position to be engaged by one arm 674 of a bell-crank lever which is pivoted at 676 on the arm 630 through which the foredrawing movements are imparted to the right-hand side grippers. The other arm 678 of this bell-crank lever is connected by a link 680 to one arm 682 of another bell-crank lever pivotally mounted on the frame, the other arm 684 of this bell-crank lever carrying a roll 686 engaged by a path cam 688 formed in a cam disk 690 secured to one side of the previously mentioned gear wheel 190 (see Fig. 55). It will be understood that in the foredrawing operation the arm 630 swings in a clockwise direction and accordingly carries the bell-crank lever 674, 678 toward the lower end of the rod 672, the pivotal connection between the arm 678 and the link 680 being at this time substantially concentric with the rock shaft 576. When the arm 674 engages the end face of the rod 672 further movement of the arm 630 is stopped by the rod, and accordingly the foredrawing movements of all the grippers cease, the spring 580 (Fig. 2) then yielding in response to further movement imparted to the link 572. Later in the cycle of the machine, substantially at the time when the toe wipers begin to wipe the margin of the upper inwardly over the insole and before the grippers are opened to release the upper, the cam 688 imparts to the bell-crank lever 682, 684 a short movement in a clockwise direction (Fig. 3) and thereby swings the bell-crank 674, 678 about its pivot 676 in a counterclockwise direction. This permits the spring 580 (Fig. 2) to expand and thereby to impart to the grippers short further foredrawing movements likewise limited by the rod 672. In this manner the front side grippers serve to counteract any tendency of the toe wipers to distort the tip seam by crowding the upper lengthwise of the last at the sides of the toe, the portion of the tip seam which extends across the top of the forepart being unaffected by such further foredrawing movement of the toe grippers because it is clamped to the last at this time, as hereinafter explained. The amount of such secondary foredrawing movement which the grippers receive may be varied by adjusting the link 680 along a slot 682 in the arm 682.

The stop rod 672 is threaded at its lower end in a bracket 694 fast on the frame casting 14 so that by turning the rod it is adjusted upwardly or downwardly to vary the limit of the foredrawing movements imparted to the grippers as required by shoes of different sizes. The rod extends upwardly through a bearing in a bracket 696 (Figs. 39, 40 and 41) and in a cover plate 698 fast on the bracket, the bracket 696 having an arm 700 secured to a bracket 702 (Fig. 1) hereinafter referred to as fast on the frame and being further connected to this bracket by a tie rod 704. Fastened on the upper end of the rod 672 is a hand lever 706 for turning it. To afford the operator an indication of the adjusted position of the rod 672, there is rotatably mounted in a recess in the bracket 696 a disk 708 having thereon a series of graduations and of numerals arranged to register, through an opening in the cover plate 698, with an arrow on the cover plate, as shown in Fig. 39. On its periphery the disk 708 is provided with gear teeth 710 engaged by a pinion 712 mounted to turn on a stud 714 on the cover plate 698, and secured to this pinion is another pinion 716 in mesh with teeth 718 on the rod 672. It will thus be seen that when this rod is turned by the hand lever 706 the disk 708 also is turned and serves to indicate the condition of the rod with respect to adjustment. The numerals on the disk 708 do not indicate shoe sizes, since the limit of foredrawing movement required is not dependent solely upon the size of the shoe.

It will be evident that adjustment of the stop rod 672 to vary the limit of the foredrawing movements of the grippers has also the effect of varying the amount of such movements. That is, if the rod is adjusted, for example, in such manner as to shorten the distance between the tip seam and the toe-end face of the last as required by a shoe of smaller size, the grippers will receive greater foredrawing movements, if other conditions remain the same, because of the fact that the lever arm 674 has farther to go before it meets the end of the rod. By use of the rod 584 (Fig. 2), however, the side grippers will be adjusted lengthwise of the last as hereinbefore described for shoes of different sizes, so as to bring the front side grippers in the best locations to grip the upper in the required relation to the tip seam. This adjustment likewise varies the amount of the foredrawing movements of the grippers, since the turning of the rock shaft 576 effected by the adjustment varies the position of the lever arm 674 relatively to the stop rod 672. If the grippers are thus adjusted, for example, in the direction required for an upper of smaller size, the arm 674 is moved nearer the end of the rod 672, which substantially counteracts the tendency of the adjustment of the rod for an upper of that size to increase the amount of foredrawing movement.

Figure 43:
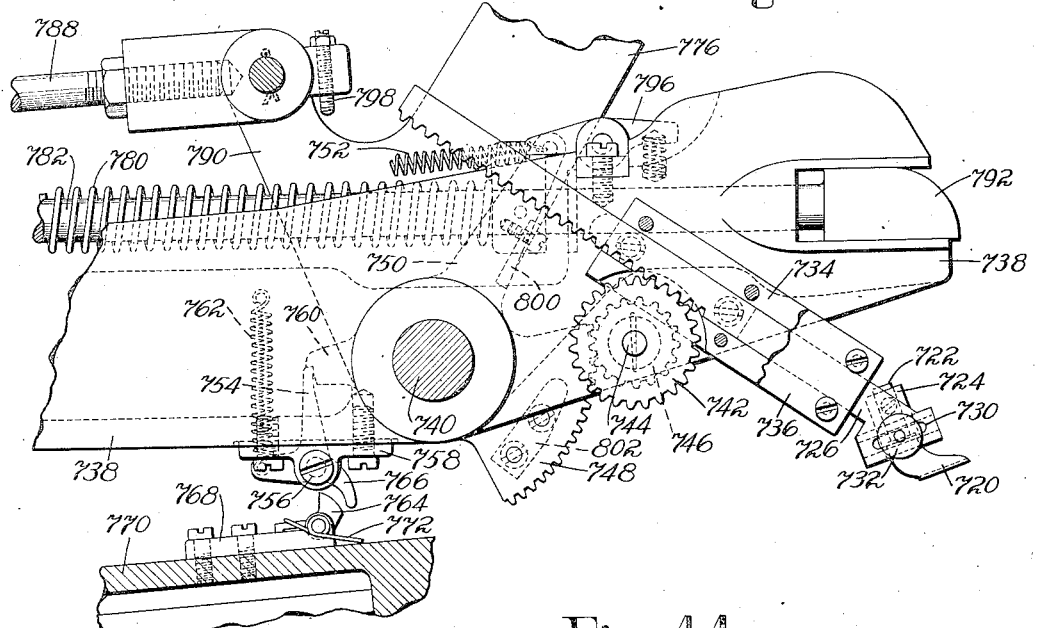
Fig. 43 is a view mainly in left-hand side elevation of the tip-gaging mechanism and other parts.

To indicate whether the upper has been pulled in such manner that the tip seam over the top of the forepart is located at the proper distance from the toe-end face of the last the machine is provided with a tip gage which is maintained in an out-of-the-way position until near the end of the upper-pulling operation, whereupon it is moved into engagement with the top of the forepart of the shoe. This gage comprises a plate 720 (Figs. 5, 43 and 44) having a series of graduations and numerals thereon, the plate being provided with a stem 722 which is fast in a holder 724 supported on the lower end of a forwardly and downwardly inclined slide 726. The holder 724 has a threaded stem 728 extending through a slot 730 in the slide 726 and is adjustable along this slot in directions lengthwise of the shoe, a nut 732 being provided on the stem to secure the holder in adjusted position. The slide 726 is movable in a guideway provided in a bracket 734 in which the slide is retained by a cover plate 736, the bracket 734 being secured on one side of a lever 738 which is fulcrumed on a rod 740 on the frame casting 14 for a purpose hereinafter described. The slide 726 has rack teeth thereon engaged by a pinion 742 fast on a shaft 744 which is rotatable in a bearing in the lever 738, and also fast on this shaft is a pinion 746 engaged by a gear sector 748 mounted to turn on the rod 740. Integral with the gear sector 748 is an arm 750 to which is a spring 752 which tends to swing the gear sector in the direction to move the slide 726 downwardly and thus to carry the gage plate 720 into engagement with the shoe. The gage plate is held in its initial retracted position by a latch 754 which is mounted to turn on a stud 756 supported by a bracket 758 on the arm 738, this latch engaging a lug 760 integral with the gear sector in a notch formed in the lug, as illustrated in Fig. 43. The latch is maintained in its operative position by a pull spring 762 connected to the arm 738. For swinging the latch 754 into position to release the lug 760 so that the gear sector 748 is operated by the spring 752 to move the gage into operative position there is provided a finger 764 (Fig. 43) arranged to engage a tail 766 on the latch to swing the latch when the finger is moved in a direction toward the front of the machine. For the purpose of such movement the finger is pivotally mounted on a block 768 which is fast on a plate 770 hereinafter more particularly referred to as a part of the means which carries the toe wipers forwardly toward the toe end of the shoe. Such forward movement of the plate occurs in part during that portion of the cycle of the machine in which the grippers are operated to pull the upper, and it is in this stage of the cycle that the latch 754 is operated by the finger 764. In order to permit the finger to pass the tail 766 of the latch in the return of the parts to starting positions, the finger is controlled by a torsion spring 772 against the resistance of which it is swung by the action of the tail 766 thereon. It will be understood that the gage plate 720 is located over the tip seam, and enables the operator to determine accurately whether that portion of the tip seam which extends across the top of the forepart is at the proper distance from the toe-end face of the last. If it is observed that adjustment of the upper is required the operator uses the hand lever 428 in the manner previously explained to increase or relax the force of the pull of the toe grippers on the upper until the tip seam is properly located. Thereafter the gage plate 720 is withdrawn from its operative position by means hereinafter described.

For supporting the shoe against pressure applied on its bottom face in wiping the toe end of the upper over the insole and fastening it to the insole there is provided means which is in many respects similar to the disclosure of the previously mentioned Letters Patent. This means comprises a shoe holder 774 (Fig. 5) arranged to engage the shoe at the top of the forepart over the tip seam and adjustable upwardly and downwardly in an arm 776 by a member 778 mounted to turn in the arm as disclosed in said Letters Patent. The arm 776 is mounted to swing on the previously mentioned rod 740 at one side of the lever 738 also previously referred to, and it is held initially in an upraised position by a spring 780 mounted on a rod 782 which is supported on the lever 738. This spring bears at one end on a collar 784 (Fig. 44) which is fast on the rod 782 and at its other end on a sleeve 786 slidingly movable on the rod and connected by a link 788 (Fig. 5) to an arm 790 which is integral with the arm 776. After the upper has been properly adjusted while the machine is at rest at the end of the upper-pulling stage of the cycle the operator swings the arm 776 downwardly by engagement with the member 778 to move the shoe holder 774 into contact with the shoe. During such movement of the arm the spring 780 is compressed by movement of the sleeve 786 along the rod 782. To hold the arm 776 against return movement the rod 782 is provided at its forward end with a latch 792 arranged to engage a plate 794 on the arm, the rod being movable lengthwise in bearings in the lever 738. In the construction herein shown the latch 792 is held retracted until the arm 776 has arrived substantially at the end of its downward movement relatively to the lever 738, the lever being provided for this purpose with a spring-controlled latch 796 (Figs. 43 and 44) arranged to engage the collar 784 on the rod 782 in a notch provided in the collar. When the arm 776 arrives substantially at the end of its movement a screw 798 carried by the arm 790 engages the latch 796 and withdraws it from contact with the collar 784, whereupon the spring 780 forces the rod 782 in a forward direction to cause its latch 792 to lock the arm 776 against return movement. The downward swinging movement of the arm 776 is further utilized to return the tip gage mechanism to its starting position where it is held by the latch 754. For this purpose the arm carries a plate 800 (Fig. 43) arranged to engage a member 802 fast on one side of the gear sector 748 and thus to swing the gear sector in the direction to retract the gage plate 720. The gage plate is thus withdrawn to make room for the shoe holder 774 to engage the shoe at the top of the forepart.

After the shoe holder 774 has been swung into engagement with the shoe and after its supporting arm 776 has been locked to the lever 738 by the latch 792, as above described, the holder is pressed more firmly against the shoe in the power operation of the machine by swinging movement of the lever 738. For this purpose the rear end of the lever 738 is connected to one arm 804 of a bell-crank lever (Fig. 4) mounted to turn on a rod 805 on the frame, the other arm 806 of which (Fig. 5) carries a roll 807 engaged by the periphery of a cam 808 fast on a cam shaft 810. A heavy spring 812 connected to a hook on the bell-crank lever 804, 806 and to a bar 814 on the frame of the machine holds the roll 807 at all times against the cam 808. The connections between the bell-crank lever 804, 806 and the lever 738 comprise a rod 816 slidingly mounted in a forked member 818 which is pivotally connected to the arm 804 of the bell-crank lever, the rod having a head 820 on its lower end which is engaged by the member 818 to return the lever 738 to starting position. Between the member 818 and nuts 822 on the rod 816 is a compression spring 824 through which the member 818 acts to force the shoe holder against the shoe, the member 818 sliding more or less along the rod 816 as the pressure is applied.

Figure 44:
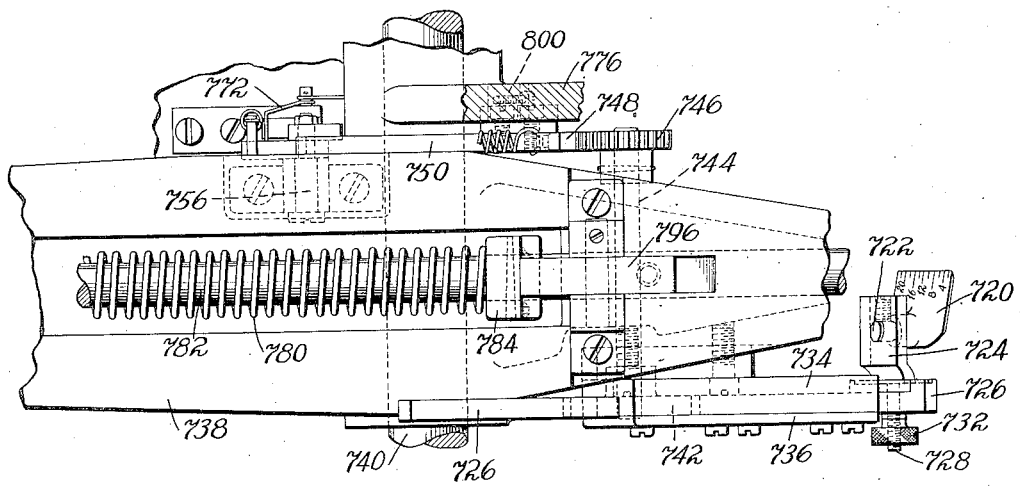
Fig. 44 is a plan view of the structure shown in Fig. 33.

Near the end of the cycle of the machine the latch 792 (Fig. 5) is retracted to release the arm 776 and permit the shoe holder 774 to be swung upwardly away from the shoe by the spring 780. For this purpose there is pivotally mounted on the lever 738 a bell-crank lever 826 having swiveled thereon a block 828 through which the rod 782 extends, the rod having thereon a nut 830 engaged by the block to withdraw the latch 792 from operative position. Connected to the bell-crank lever 826 is a rod 832 threaded at its lower end in a pin 834 which is swiveled in one arm of a bell-crank lever 836 mounted to turn on a rod 838 on the frame, the other arm of this bell-crank lever carrying a roll 840 in position to be engaged at the proper time in the cycle by a member 842 which is fast on one side of the cam 808. It will be understood that when the latch 792 is retracted it is again locked in retracted position by the latch 796 (Figs. 43 and 44).

Figure 16:
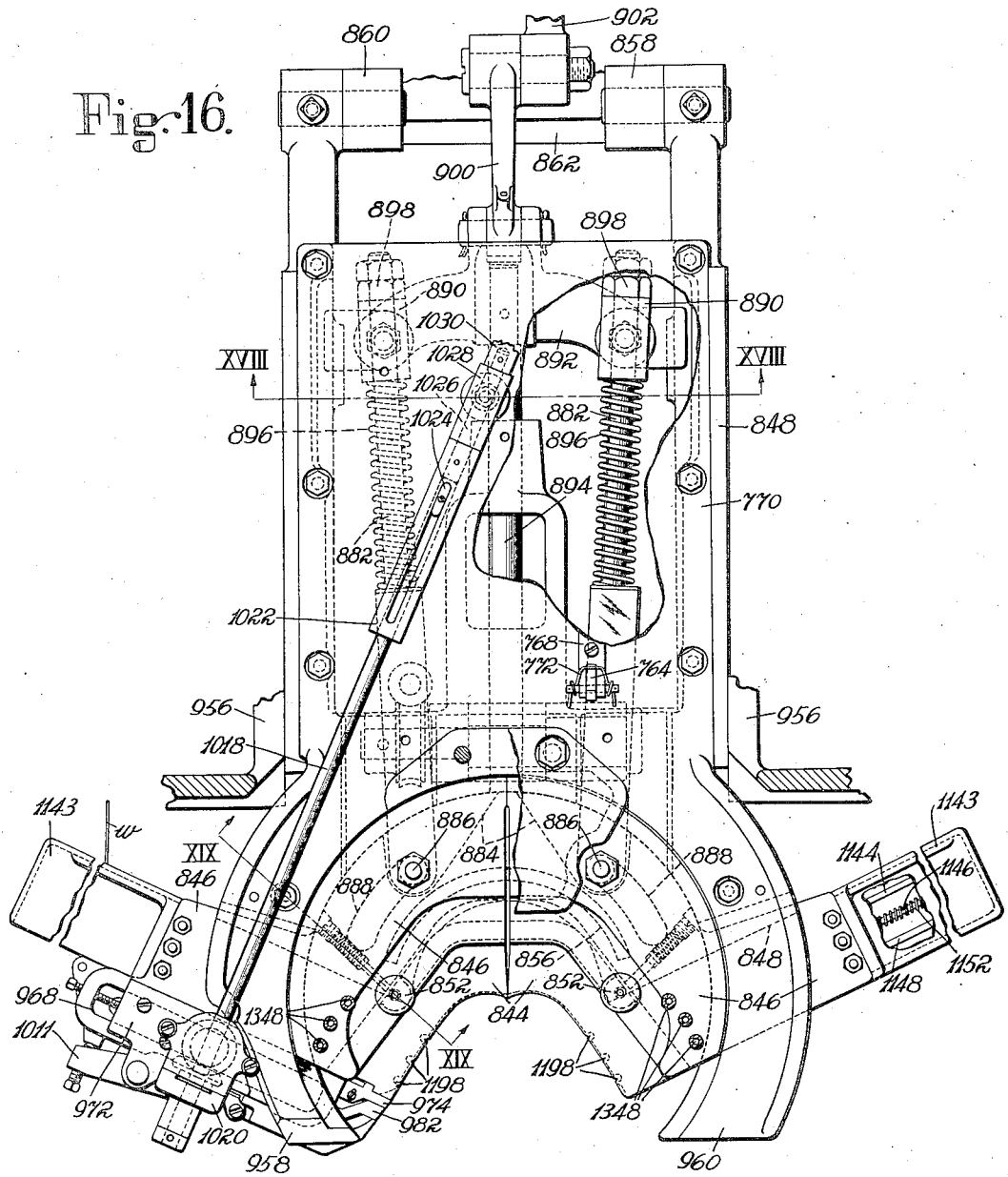
Fig. 16 is substantially a plan view of the toe wiper head and parts associated therewith, with certain parts broken away.
Figure 19:
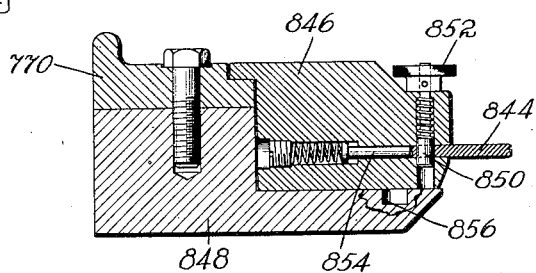
Fig. 19 is a section on the line XIX—XIX of Fig. 16.

The previously mentioned toe wipers for wiping the upper heightwise of the toe and for wiping the marginal portion of the upper inwardly over the feather and against the lip of the insole after the upper-pulling operation are shown at 844 (Fig. 16). These wipers are formed to embrace the toe and are detachably secured in slots in wiper carriers 846 mounted on a wiper head or wiper support 848 which is mounted for movements as hereinafter described and on which the previously mentioned plate 770 is secured. The wipers are secured to the carriers by spring-pressed pins 850, one of which is shown in Fig. 19, these pins being arranged to enter holes in the wipers when the wipers are in proper relation to the carriers. By means of knurled heads 852 on the pins 850 the operator may raise the pins to permit removal of the wipers when desired. Spring-pressed pins 854 are slidingly mounted in the carriers 846 and are arranged to engage the edges of the wipers near the pins 850, so that when the wipers are removed the pins 854 slide under the ends of the pins 850 and hold the latter upraised. It will be understood that when wipers are placed in the slots in the carriers the pins 854 are pushed inwardly by them to release the pins 850 and permit the latter to enter the holes in the wipers. The wiper carriers 846 are mounted in a curved guideway in the wiper head 848 for swinging movements about an axis extending heightwise of the shoe and located substantially at the meeting point of the wiping edges of the wipers and have tongue-and-slot connections 856 with the wiper head to assist in guiding them.

The wiper head 848 near its forward end is supported by means hereinafter described which permits its movements lengthwise of the shoe, and at its rear end it is pivotally supported on an arm 858 (Figs. 5 and 16) and a bell-crank lever 860 (Figs. 2 and 16), the arm and the bell-crank lever being pivotally mounted on the rod 838 and being rigidly connected by a web 862. For imparting movements lengthwise of the shoe to the wiper head the bell-crank lever 860 is connected to another bell-crank lever 864 mounted on the rod 805 and provided with a roll 866 engaged by the periphery of a cam 868 (Figs. 2 and 4) on the cam shaft 810. The roll is held at all times against the cam by a heavy spring 870 connected to a hook on the bell-crank lever 864 and to the rod 814. The connections between the two bell-crank levers 860 and 864 comprise a rod 872 the upper end of which is secured to a forked member 874 pivotally connected to the lever 860 and the lower end of which is slidingly mounted in a forked member 876 pivotally connected to the lever 864. On the lower end of the rod 872 is a head 878 (Fig. 4) through which the rod is operated by the member 876 to retract the wiper head from the shoe. Between the member 876 and nuts on the rod 872 is a compression spring 880 through which the rod is operated by the member 876 to move the wiper head forwardly toward the shoe. In order to insure against the application of excessive pressure to the upper and the insole lip by the wipers through compression of the comparatively heavy spring 880, movement of the bell-crank lever 860 is positively limited by engagement of the lever with a stop screw 881 (Fig. 2) adjustably mounted in a bracket on the frame.

Figure 18:
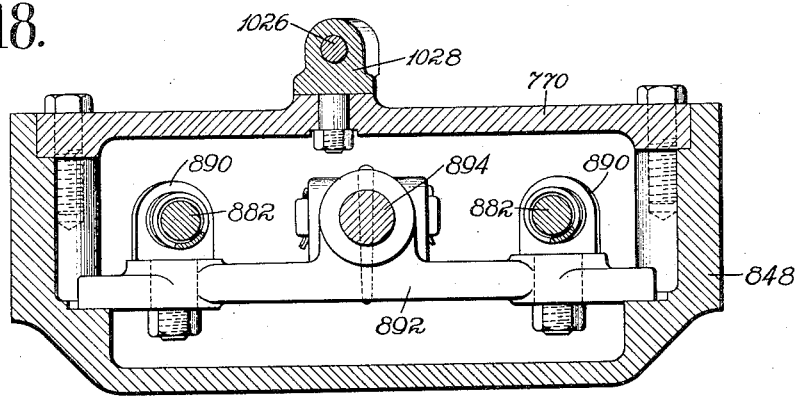
Fig. 18 is a section on the line XVIII—XVIII of Fig. 16.

It will be understood that the wipers 844 are closed inward laterally of the shoe by swinging movements of the wiper carriers 846 in their guideways in the wiper head 848. For thus operating the wiper carriers there are provided links 882 (Figs. 16 and 18) the forward end portions of which are flattened and extend into recesses 884 in the wiper carriers, these flattened portions being connected to bolts 886 on the carriers. The lower ends of the bolts 886 extend into curved slots 888 in the wiper head 848 to assist in guiding the wiper carriers. The flattened portions of the links 882 are engaged above by portions of the cover plate 770 to assist in preventing any upward yield of the wiper carriers relatively to the wiper head. At their rear ends the links 882 are slidingly mounted in blocks 890 which are swiveled on a cross-bar 892 fast on a rod 894 slidingly mounted in bearings in the wiper head 848. The ends of the cross-bar 892 rest on guideways on the wiper head, as shown in Figs. 16 and 18, to assist in supporting and guiding the cross-bar. Between the flattened portions of the links 882 and the swiveled blocks 890 are compression springs 896 through which movements are imparted yieldingly to the links and the wiper carriers by forward movement of the cross-bar 892, these springs permitting the different wipers to accommodate themselves better to the shoe and serving also to prevent any excessive inward pressure in the overwiping operation. On the rear ends of the links 882 are nuts 898 through which the wiper carriers are returned to starting positions by the cross-bar.

For operating the cross-bar 892 to close and open the wipers it is connected by a link 900 to a bell-crank lever 902 (Figs. 4, 5 and 16) mounted on the rod 838. This bell-crank lever is connected to another bell-crank lever 904 mounted on the rod 805 and provided with a roll 906 engaged by the periphery of a cam 908 on the cam shaft 810. A spring 910 connected to a hook on the bell-crank lever 904 and to the bar 814 holds the roll at all times against the cam and acts to return the cross-bar 892 to its starting position. The connections between the two bell-crank levers 902 and 904 are of substantially the same construction as the connections previously described between the bell-crank levers 860 and 864 for operating the wiper head and include a compression spring 912 through which the lever 902 is yieldingly operated.

Figure 20:
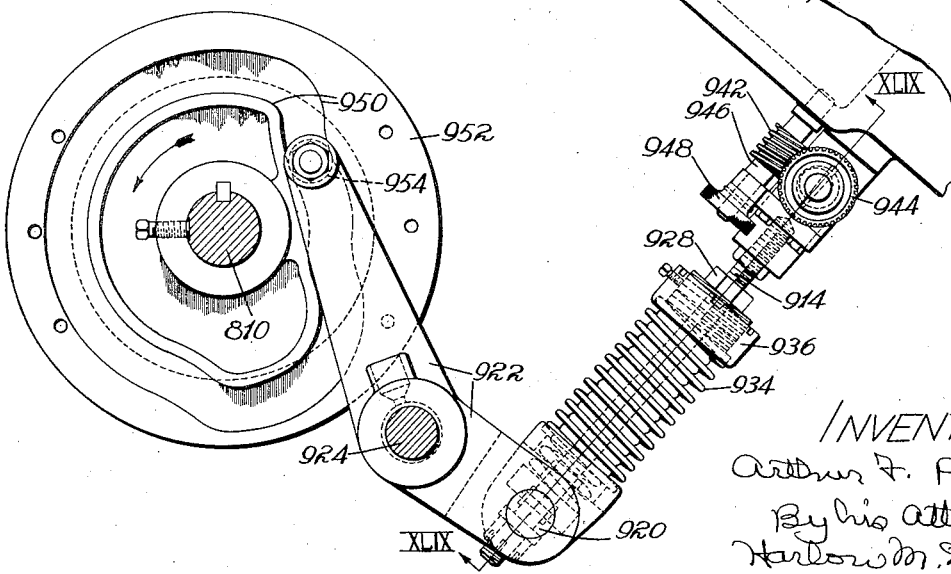
Fig. 20 shows in left-hand side elevation mechanism provided for moving the toe wipers heightwise of the shoe.

Near its forward end the wiper head 848 is supported by means (Figs. 5, 20 and 49) which not only permits its movements lengthwise of the shoe but also serves to swing it heightwise of the shoe about its pivotal connections with the arm 858 and the bell-crank lever 860 to cause the wipers to wipe the upper downwardly around the toe to the edge of the insole and later to press the upper upwardly against the feather of the insole. This means includes a rod 914 threaded at its upper end in a member 916 mounted to turn on an eccentric portion 917 of a rod 918 supported by lugs on the wiper head 848, the rod extending at its lower end through an opening in a pin 920 which is rotatably mounted in the forked end of one arm of a bell-crank lever 922 mounted on a rod 924 on the frame. Surrounding the rod 914 is a comparatively heavy spring 926 seated at its upper end against a nut 928 threaded on the rod and at its lower end against a member 930 slidingly mounted on the rod and engaged by a flange 932 on the rod. Also surrounding the rod 914 is a comparatively light spring 934 seated at its upper end against a ring 936 threaded on the nut 928 and at its lower end against a cylindrical member 938 mounted to turn on the pin 920. A nut 939 on the lower end of the rod 914 holds the rod and the pin 920 in assembled relation. As shown in Fig. 49, there is normally a space between the pin 920 and the member 930, so that when the forked arm of the bell-crank lever 922 is swung upwardly to press the wipers upon the upper it acts first on the wiper head 848 through the light spring 934. Such action occurs as the wipers are wiping the margin of the upper over the feather of the insole. Substantially at the end of this overwiping movement of the wipers the pin 920 engages the member 930 and thereafter acts through the heavy spring 926, as well as through the light spring, to increase the pressure of the wipers on the upper. The compression of the spring 926 may be varied by turning the nut 928 on the rod 914, and the compression of the spring 934 may be varied by turning the ring 936. The rod 918 is rotatable in the lugs of the wiper head 848 and its eccentric portion 917 is provided for adjusting the wiper head and the wipers heightwise of the shoe by the turning of the rod. Such turning of the rod 918 is effected by a worm 942 (Fig. 20) in engagement with a worm gear 944 fast on the rod, the worm 942 being mounted on a spindle 946 which is rotatable by means of a knurled hand wheel 948 thereon. The bell-crank lever 922 is operated by a path cam 950 formed in one side of a cam wheel 952 on the cam shaft 810, this cam engaging a roll 954 on the lever.

It will be evident that the above described connections between the wiper head 848 and the bell-crank lever 922 constitute, in effect, a link which swings as the wiper head is moved lengthwise of the shoe, and at the rear end of the wiper head the arm 858 and the upwardly extending arm of the bell-crank lever 860 constitute, in effect, swinging links parallel to the above-mentioned link, so that the wiper head is advanced and retracted lengthwise of the shoe by a parallel link motion. In such movements, and also in its swinging movements heightwise of the shoe, the wiper head is further guided and is confined against lateral movements by portions 956 (Fig. 16) of the frame casting 14.

Figure 21:
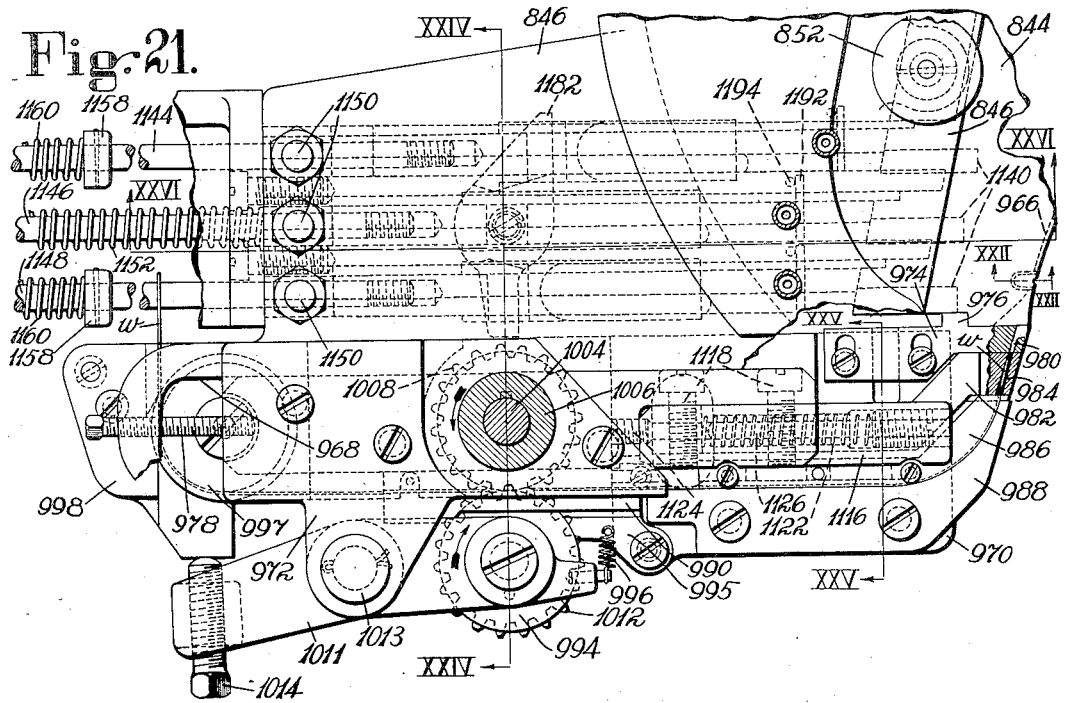
Fig. 21 is a plan view of the wire-feeding and shearing mechanisms and other parts associated with the left-hand toe wiper, with portions of the structure broken away.
Figures 22, 23:
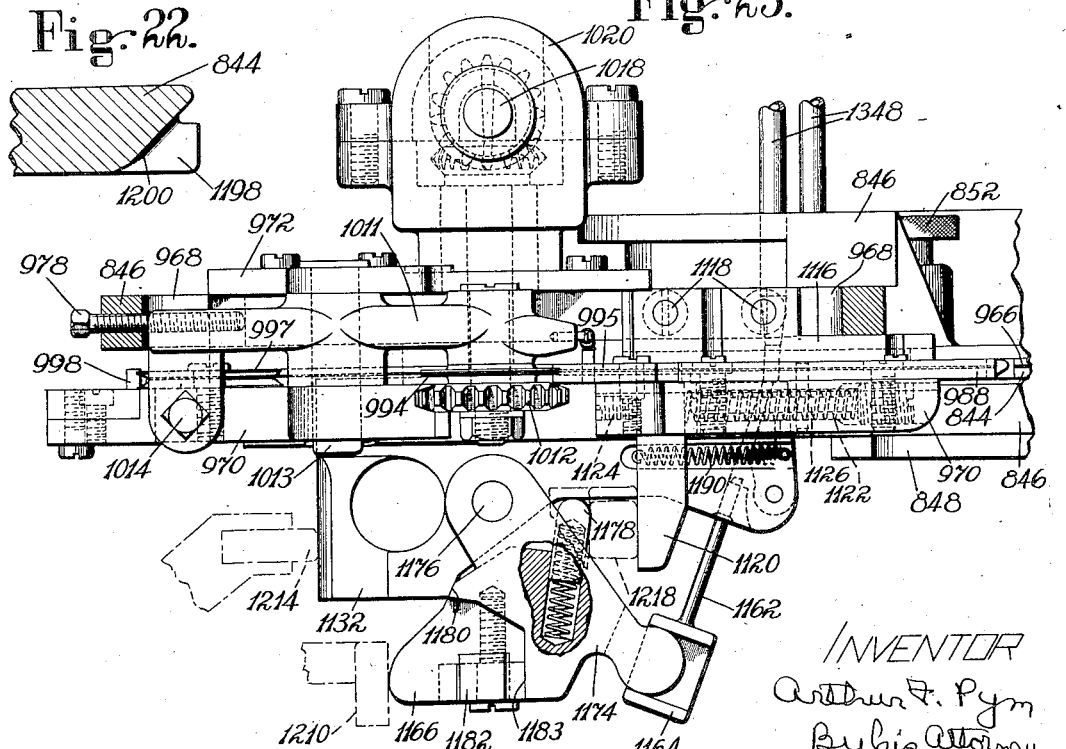
Fig. 22 is a section on the line XXII—XXII of Fig. 21, on an enlarged scale.
Fig. 23 is a view in front elevation of the structure shown in Fig. 21, with parts broken away.

The cover plate 770 on the wiper head 848 has curved arms 958 and 960 (Fig. 16) which extend forwardly beyond the wiper head and serve in part as guides for the wiper carriers 846. Each of these wiper carriers extends outwardly below the curved arm and serves to support means hereinafter described for driving tacks t (Fig. 72) to fasten to the shoe a wire toe binder 964 for holding the upper in lasted position. The left-hand wiper carrier also supports means for feeding binder wire w (Figs. 16 and 21) into a groove 966 formed in the wipers at their wiping edges nearer the top faces of the wipers than their lower faces and for advancing the wire in this groove around the toe end of the shoe at a predetermined time in the operation of the wipers. As shown in Figs. 21 and 23, the left-hand wiper carrier has an elongated slot 968 in which fits an upwardly extending portion of a bracket 970, and on this upwardly extending portion is fastened a plate 972 which overlaps the wiper carrier and thus serves to support the bracket on the carrier. The bracket 970 may be moved along the slot 968 in adjusting the parts, and to position it in proper relation to the adjacent wiper plate 844 it has fast thereon a plate 974 provided with a lug 976 arranged to engage a shoulder on the wiper plate as illustrated in Fig. 21. The lug 976 is forced against the shoulder in assembling the parts by a set screw 978 threaded in the wiper carrier and bearing against a portion of the bracket 970. The plate 974 has an opening 980 extending through it for guiding the wire into the groove 966 in the wipers and is arranged to serve as a shear member in cooperation with a movable shear member 982, supported and operated as hereinafter described, to sever from the wire that portion of it which is to serve as the toe binder after the wire has been fed around the toe. The shear member 982 has an enlarged opening 984 therein for the wire, into which the wire is advanced from a curved groove formed in a guide member 986 (Figs. 21 and 25) fast on the bracket 970, the wire being confined in the groove in this guide member by a plate 988 also fast on the bracket. The wire is fed into the groove in the member 986 from a groove in another guide member 990 (Figs. 21 and 24) fast on the bracket 970, this guide member having in its opposite sides curved slots into which project thin flanges formed on two feed wheels 992 and 994, as shown in Figs. 24 and 28, these flanges engaging the wire to feed it. Pivoted on the bracket 970 is a brake member 995 engaging the feed wheel 994 continuously to assist in controlling it and held against the feed wheel by a spring 996. Beyond the guide member 990 the wire passes over a guide wheel 997 (Figs. 21 and 23) rotatably mounted on the bracket 970, the wire being confined on the wheel by a guard 998 on the bracket, and thence the wire extends to a reel 1000 (Fig. 2) rotatably mounted on a bracket 1002 on the frame of the machine.

The feed wheel 992 is keyed to a shaft 1004 (Fig. 24) rotatably mounted in an upwardly extending sleeve portion 1006 of the bracket 970, and pinned to this feed wheel is a gear wheel 1008. The feed wheel 994 is rotatably mounted on a stud 1010 supported by a lever 1011 on the bracket 970, and pinned to this feed wheel is a gear wheel 1012 in mesh with the gear wheel 1008. The lever 1011 (Fig. 21) is mounted to swing on a stud 1013 on the bracket 970 and carries a set screw 1014 arranged to engage a portion of the bracket to position and hold the feed wheel 994 in proper relation to the wheel 992. The two gear wheels and feed wheels are driven through the shaft 1004 by beveled pinions 1015 and 1016 fastened respectively on the shaft 1004 and on another shaft 1018 which is mounted at one end in a bearing formed in a casing 1020 mounted on the sleeve 1006. The shaft 1018 (Fig. 16) extends into a sleeve 1022 relatively to which it is slidingly movable lengthwise, the shaft carrying a block 1024 which fits in a slot in the sleeve so that the shaft is turned by the turning of the sleeve. Pinned to the sleeve 1022 is a short shaft 1026 rotatable in a bearing formed in a block 1028 which is swiveled (Fig. 18) on the cover plate 770 of the wiper head so as to turn as required in the closing movements of the wipers. It will be understood that the above-described connections between the shaft 1018 and the sleeve 1022 permit such lengthwise movement of the shaft relatively to the sleeve as may also be required in the closing of the wipers.

Beyond the swiveled block 1028 the short shaft 1026 has fast thereon a sleeve 1030 (Fig. 29) connected by a universal joint 1032 to another sleeve 1034. This sleeve is fast on a shaft 1036 which extends into a sleeve 1038 and has a block 1040 lying in a slot in the sleeve so that the shaft is turned by the sleeve, the shaft 1036 being at the same time movable lengthwise relatively to the sleeve 1038 as required by the movements of the wiper head 848 lengthwise of the shoe. The sleeve 1038 is connected by a universal joint 1042 and other parts similar to those which connect the shafts 1026 and 1036 to a shaft 1044 rotatable in a bracket 1046 on the rear portion of the frame of the machine. Through bevel-gears 1048 the shaft 1044 is connected to another shaft 1050 rotatable in the bracket 1046, this shaft being connected by a coupling 1052 (Fig. 30) to a shaft 1054. This shaft is connected by a key plate 1056 to one member 1058 of a cone clutch, this connection permitting sliding movement of the member 1058 along the shaft. The other member 1060 of the clutch is fast on the end of a shaft 1062 which is mounted in a bearing in the bracket 1046 and is connected by bevel-gears 1064 (Fig. 29) to a vertical shaft 1066 also mounted in a bearing in the bracket. Near its lower end the shaft 1066 is connected by a coupling 1068 to a short shaft 1070 mounted in a bearing in a bracket 1072 on the frame and provided at its lower end with a worm gear 1074 (Figs. 4 and 29) driven by a cooperating worm gear 1076 which is fast on a continuously running shaft 1078. The shaft 1078 is the main drive shaft of the machine and as herein shown is arranged to be operated through a belt pulley 1080. It will thus be seen that the clutch member 1060 (Figs. 29 and 30) is continuously operated. The cooperating clutch member 1058 is movable along the shaft 1054 into and out of engagement with the member 1060, and for this purpose is provided with a sleeve portion 1082 having a groove therein to receive members 1084 carried by the forked end of a lever 1086 pivoted on the bracket 1046. A compression spring 1088 between the sleeve 1082 and the coupling 1052 tends to force the clutch member 1058 into engagement with the member 1060, and the member 1058 is retracted against the resistance of the spring by the lever 1086. Swiveled in the lower end of this lever is a pin 1090 through which extends a rod 1092 having threaded thereon a nut 1094 which bears on the pin, the rod being connected to a lever 1096 pivoted at 1098 on the bracket 1046. At its lower end the lever 1096 carries a roll 1100 engaged by the periphery of a cam disk 1102 having slots 1103 through which it is adjustably secured on the previously mentioned cam wheel 952. This cam disk has a depression 1104 therein which arrives in a position opposite the roll 1100 at that time in the cycle of the machine when the toe wipers are being operated to wipe the upper inwardly over the insole. The spring 1088 is thus permitted to force the clutch member 1058 into engagement with the member 1060, whereupon the previously described wire-feeding mechanism is operated through the clutch to feed the wire around the toe of the shoe from one side of the toe to the other side in the groove 966 in the toe wipers, the depth of the groove corresponding approximately to the diameter of the wire. As soon as the wire has been fed the proper distance the cam disk 1102 acts on the lever 1096 to disconnect the clutch and stop the operation of the wire-feeding mechanism. To insure further that the feeding of the wire will be stopped at the proper time, there is associated with the clutch member 1058 a friction brake 1106 which engages it, this brake having a sleeve portion 1108 mounted on the sleeve 1082 of the clutch member and being engaged by spring-pressed plungers 1110 which tend to force it against the clutch member. The plungers are mounted in a sleeve 1112 surrounding the sleeve 1108 and secured to the bracket 1046, the brake being held from turning by a key 1113 between the sleeves 1108 and 1112. Movement of the brake in a direction toward the clutch member 1060 is limited by engagement of a collar 1114 on the sleeve 1108 with the end of the sleeve 1112, so that the brake is ineffective at the time when the wire-feeding mechanism is in operation. The amount of wire fed around the toe may be varied as required for shoes of different sizes by adjusting the nut 1094. This varies the distance that the roll 1100 is carried into the depression 1104 in the cam disk 1102 and consequently the time when the roll is engaged by an inclined face 1115 on the cam disk to stop the wire feed.

The shear member 982 is slidingly mounted on the bracket 979, as shown in Fig. 25, and is guided in its operative movements by a block 1116 secured by screws 1118 (see also Figs. 21 and 23) to one side of that portion of the bracket 970 which extends upwardly into the slot 968 as hereinbefore described, the shear member having a tongue-and-slot connection with the block. Extending downwardly from the shear member 982 is an arm 1120, and mounted in a recess in the bracket 970 is a spring 1122 which bears at one end against this arm and holds the arm normally against a stop screw 1124 threaded in the bracket. The spring 1122 surrounds a rod 1126 adjustably threaded at one end in the bracket 970, the other end of the rod being arranged to act as a stop to limit the wire-shearing movement of the shear member. In this movement the shear member 982 cooperates with the member 974 to cut the wire, as previously explained, the opening 984 in the member 982 being large enough to permit the member to move relatively to that portion of the wire which is in the guide member 986. The short movement which the shear member 982 receives is imparted to it by means hereinafter described which is movable into position to engage and act on the depending arm 1120.

Figure 17:
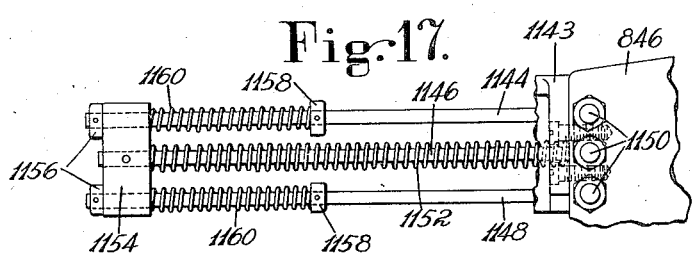
Fig. 17 is a plan view of a portion of the tacking mechanism associated with the left-hand toe wiper.

Mounted also on the left-hand wiper carrier 846 are fastening-inserting devices or tackers for driving three tacks to fasten the toe binder to the shoe in the manner illustrated in Fig. 72. These tackers comprise three slides 1128, 1130 and 1132 (Fig. 24) each provided at the end thereof nearest the shoe with a tack pocket 1134 (see Figs. 26 and 27) into which a tack is delivered head downward as hereinafter described. Each of the slides is supported on the wiper carrier by a lateral tongue 1136 on the slide which lies in a groove in the carrier, and each slide also has an upwardly extending tongue 1138 lying in a groove in the carrier and arranged also to enter a groove 1140 (Fig. 26) in the wiper plate 844 and to engage a shoulder 1142 at the end of this groove to limit the movement of the slide into tack-driving position. Extending outwardly from the three slides 1128, 1130 and 1132, under a shield 1143 on the wiper carrier, are rods 1144, 1146 and 1148 (Figs. 17 and 21), the rods being threaded in the slides and extending through openings in the heads of bolts 1150 (Fig. 26) mounted in the wiper carrier. The heads of these bolts serve to limit the outward movements of the slides, and associated with the central slide 1130 is a spring 1152 mounted on the rod 1146 with its inner end engaging the head of the bolt 1150 and its outer end engaging a cross-bar 1154 (Fig. 17) which is fast on the rod. It will thus be seen that the spring 1152 holds the central slide 1130 normally at the limit of its outward movement. The two rods 1144 and 1148 are slidable in the cross-bar 1154 and have collars 1156 fast thereon through which the cross-bar acts to maintain the other two slides 1128 and 1132 also at the limits of their outward movements. Mounted on the rods 1144 and 1148 between the cross-bar 1154 and collars 1158 fast on the rods are springs 1160 through which the cross-bar acts to impart inward movements to the slides 1128 and 1132 when the central slide 1130 is moved inwardly. Such inward movement is imparted to the central slide against the resistance of the return spring 1152 by means hereinafter described which is moved into engagement with it. Through the action of this means on the central slide all three slides are accordingly moved inward to the positions determined by engagement of their ribs 1138 with the shoulders 1142 on the wiper plate 844 preparatory to the tack-driving operation.

Movable in a driver passage in each of the above-mentioned slides and in the tack pocket 1134 in each slide is a tack driver 1162 (Figs. 23 and 26) having a head 1164 thereon. Swiveled in a guideway in the head 1164 of the central tack driver is the rounded end of a driver-operating arm 1166 (Fig. 26) pivoted at 1168 on the slide 1130, this arm having therein a spring-pressed plunger 1170 which by engagement with the slide holds the arm normally in a position determined by its contact with a shoulder 1172 on the slide. Each of the other two slides 1128 and 1132 has a driver-operating arm 1174 pivotally mounted on a pin 1176 thereon and having a rounded end engaging the head 1164 of the corresponding driver 1162, that arm which is on the slide 1132 being shown in full in Figs. 23 and 24. Carried by each of these arms is a spring-pressed plunger 1178 which by engagement with the corresponding slide holds the arm normally in a position determined by its engagement with a shoulder 1180 on the slide. The two arms 1174 are operated to drive the tacks by the tack-driving movement of the central arm 1166, the latter having for this purpose an equalizing lever 1182 (Figs. 21, 23 and 24) mounted for limited swinging movement about a stud 1184 on the arm and arranged to engage shoulders 1183 on the two other arms 1174 to operate them. Operative movement is imparted to the central arm 1166 by means hereinafter described which is moved into engagement with it.

The drivers 1162 which drive the two foremost tacks, i. e., the two tacks which are nearest the end of the toe, drive them far enough inwardly for their heads to clamp the binder firmly against the upper to hold the binder against slipping lengthwise by reason of the pressure of the upper at the end of the toe against it. Movement of the driver which drives the rearmost tack, however, is so limited by contact of its head 1164 with the slide 1132 that the head of the tack is left somewhat upstanding, as shown in Fig. 72, to permit the operator to twist the end portion of the binder around this tack, if desired, for greater insurance that the binder will be properly held, after he removes the shoe from the machine.

As will be evident by reference to Figs. 70, 71 and 72, each tack is so driven that its shank is at the outer side of the binder, i. e., the side of the binder which is farthest from the lip of the insole. For guiding the tack so that it will be driven in this manner each of the tacker slides is provided with a tack finger 1186 (Figs. 26 and 27) pivoted on a pin 1188 on the slide and controlled by a spring 1190 which tends to swing the finger into the tack pocket 1134 and holds it against the opposite wall of the pocket before the tack is driven, the spring being connected to the slide and to a pin 1192 on the tack-finger. In order to hold the tack fingers in positions to permit the tacks to enter the tack pockets when the tacker slides are in their initial positions, the pin 1192 on each tack finger is engaged by a pin 1194 (Figs. 21 and 27) on the wiper carrier 846. Each tack finger 1186 has a V-shaped notch 1196 (Fig. 27) therein to guide the shank of the tack, and below this notch the finger is recessed, as illustrated at 1197 in Figs. 70 and 71, to permit the passage of the head of the tack and of the tack driver without undue outward swinging movement of the finger in the early portion of the tack-driving operation such as might cause it to lose effective control of the tack. Each tack is driven in a notch 1198 (Fig. 22) in the wiper plate, this notch flaring downwardly and outwardly so as to provide an inclined wall 1200 against which the point of the tack is first driven (Fig. 69) as the tack is guided by the tack finger 1186. The wall 1200 then deflects the shank of the tack laterally in an inward direction toward the lip of the insole, so that the tack engages the outer side of the binder wire and crowds the latter inwardly toward the lip, bending inwardly the portion of the wire which it engages. This action of the tacks, together with the clamping effect of the heads of the two foremost tacks on the binder at the end of the tack-driving operation, affords substantial insurance that the binder will be clamped and held properly by the tacks. Each driver 1162 is beveled as shown at 1202 (Fig. 71) to afford sufficient clearance when it is in the notch 1198 in the wiper. In order to insure against any interference of that portion of the margin of the upper materials which extends heightwise of the shoe beyond the lip of the insole with the tack fingers 1186, the toe plate 2 on which the forepart of the insole rests as previously described has therein notches 1204 (Figs. 45 and 70) in locations opposite the tack fingers.

The right-hand wiper plate 844 has therein notches 1198 like those in the left-hand wiper plate, and in these notches three tacks are driven in the same relation to the binder at that side of the shoe bottom as at the other side of the shoe bottom by tackers carried by the right-hand wiper carrier 846. These tackers are of the same construction as those above described on the left-hand wiper carrier and operate in the same manner as the left-hand tackers. They are accordingly not shown in detail, although portions of the means for controlling the three right-hand tacker slides are shown in Fig. 16 and are identified by the same reference characters as those at the left-hand side. It will be understood, of course, that the wire-feeding and shearing means described as supported on the left-hand wiper carrier is omitted at the right-hand side.

The means for operating the tackers at both sides of the shoe and for operating the wire-shearing member 982 at the left-hand side is shown for the most part in Figs. 32, 33 and 34. With reference first to the parts for operating the left-hand tackers and the shearing member, there is fast on the frame of the machine (Fig. 1) a bracket 1206 similar to the bracket 702 previously referred to as mounted at the right-hand side. In the bracket 1206 there is mounted for movements laterally of the shoe a slide 1208 which has fast thereon a bumper 1210 arranged to engage and operate the tacker arm 1166 of the central tacker to drive the tack, as indicated by dotted lines in Fig. 23, the tacker arms 1174 of the other two tackers being operated by movement of this central arm, as previously described. Movable in a guideway in the slide 1208 is another slide 1212 which carries a bumper 1214 arranged to engage the central tacker slide 1130, as indicated by dotted lines in Fig. 23, and to move this slide to the position determined by the corresponding shoulder 1142 (Fig. 26) on the wiper plate, the other two tacker slides 1128 and 1132 being movable to positions similarly determined by shoulders on the wiper plate through the movement of the central slide, as previously described. Also movable in a guideway in the slide 1208 is another slide 1216 which carries a bumper 1218 arranged to engage the depending arm 1120 of the shearing member 982 to operate this member, as further indicated by dotted lines in Fig. 23. The slide 1212 is yieldingly controlled by a spring 1220 which bears at one end on this slide and at the other end on the slide 1208, this spring surrounding a rod 1222 connected at one end to the slide 1212 and extending at its other end through an opening in the slide 1208. Nuts 1224 on this rod serve by engagement with the slide 1208 to determine adjustably the normal position of the slide 1212. Similarly the slide 1216 is yieldingly controlled through a spring 1226 surrounding a rod 1228 which extends from this slide through an opening in the slide 1208 and has nuts 1230 thereon for determining adjustably the normal position of the slide 1216. It will be understood that the spring 1220 will yield to permit further movement of the slide 1208 to operate the tack drivers after the three tackers have arrived at the limits of their positioning movements determined by the shoulders 1142 on the wiper and that the spring 1226 similarly will yield after the wire-severing operation of the shear member 982. The parts are preferably so adjusted that the severing of the wire occurs after the tacks have been partially driven into the shoe and last so that their shanks press the wire inwardly toward the lip of the insole as hereinbefore described, and after the wire is severed the driving of the tacks is completed to cause the heads of the two foremost tacks to clamp the binder.

For operating the slide 1208 there is mounted in the bracket 1206 a rack bar 1232 engaging teeth on a gear sector 1234 fast on a rock shaft 1236 on the bracket, and integral with this gear sector is another gear sector 1238 in engagement with teeth 1240 on one side of the slide 1208. The rack bar 1232 is operated through two springs 1242 in engagement at one end with a cross-bar 1244 fast on an extension 1246 of the rack bar, this extension being supported and guided in a bearing formed in a member 1248 (Fig. 2) on the frame of the machine. Slidingly mounted in the cross-bar 1244 are two rods 1250 secured to another cross-bar 1252 slidingly mounted on the extension 1246 of the rack bar and against which the springs 1242 bear. It will thus be seen that movement of the cross-bar 1252 serves through the springs to operate the rack bar 1232, these springs being yieldable as required when the tack drivers have arrived at the limits of the driving movements imparted to them by the bumper 1210 fast on the slide 1208. The cross-bar 1252 is connected by links 1254 to the forked end of a lever 1256 (Figs. 2 and 4) mounted to turn on a rod 1258 supported by a bracket 1259 on the frame, this lever carrying a roll 1260 engaged by a path cam 1262 formed in a cam wheel 1264 fast on the cam shaft 810. The rack bar 1232 is returned to starting position by engagement of a sleeve 1266 (Fig. 32) on the cross-bar with a shoulder on the rack bar. To assist in imparting to the rack bar its operative movement there is a second roll 1268 on the lever 1256 engaged by the periphery of the cam wheel 1264, the periphery of the wheel being parallel to the path cam 1262.

The parts shown at the right-hand side of Fig. 32 for operating the tackers associated with the right-hand wiper are supported on the bracket 702 and are of substantially the same construction as those above described at the left-hand side, and they are identified by the same reference characters, except that instead of the slide 1208 at the left-hand side there is provided a slide 1270 which performs the same function as the slide 1208 in the operation of the tackers, but is made smaller as permitted by the fact that there is no means at the right-hand side for operating wire-shearing mechanism. The two links 1254 at the right-hand side are connected to the forked end of a lever 1272 corresponding to the lever 1256 at the left-hand side, the lever 1272 being mounted on a bracket 1274 on the frame as shown in Fig. 4 and being operated by a cam wheel 1276 on the side of a gear wheel 1278 fast on the shaft 810. The construction is such that the tacks at both sides of the shoe bottom are driven substantially simultaneously.

For delivering tacks to the several tackers the machine is provided with means generally similar in construction to what is disclosed in the previously mentioned Letters Patent, except that there is only one oscillatory tack hopper 1269 (Fig. 35) and one tack separator 1271. It will be understood that the tack hopper is oscillated to supply tacks to a plurality of raceways by movements of a rock shaft 1273 on which it is mounted, and that by movements of this rock shaft the separator 1271 is reciprocated to separate and deliver the required number of tacks point downward. For operating the rock shaft 1273 there is provided a lever 1275 (Fig. 36) on one end of which there is a curved rack 1277 in engagement with a pinion 1279 on the rock shaft, the other end of the lever having a curved rack 1280 thereon in engagement with a vertically movable rack bar 1282 the movements of which are limited by a screw 1284 projecting into a slot 1286 in one side of the rack bar. At its lower end the rack bar 1282 carries a rod 1288 on which is pivotally mounted a bar 1290 (Fig. 35) having at its opposite ends lugs in which are slidingly mounted sleeves 1292 and 1294 having enlarged heads seating against the inner faces of the lugs and engaged by the opposite ends of a compression spring 1296. A rod 1298 extends through the two sleeves and through the spring and has at its upper end nuts 1300 engaging the sleeve 1292 and at its lower end an enlarged head 1302 engaging the sleeve 1294. The head 1302 is connected to one arm of a bell-crank lever 1304 pivoted on the frame of the machine, the other arm of this lever carrying a roll 1306 engaged by a path cam 1308 formed in one side of the gear wheel 1278. It will be understood that as the bell-crank lever 1304 is operated it acts through the spring 1296 to impart movements yieldingly in both directions to the rack bar 1282.

The tacks are delivered by the separator 1271 to a rotary tack inverter 1310 (Fig. 37) of substantially the same construction as disclosed in the previously mentioned Letters Patent, this inverter being mounted in a casing 1312 under the separator and having therein a plurality of pockets 1314 to receive the tacks. When the inverter is turned it inverts the tacks and delivers them head downward into flexible tubes 1316 connected to the casing 1312. For turning the inverter there is provided at one end thereof a pinion 1318 (Fig. 35) engaged by a curved rack 1320 formed on one end of an arm 1322 fast on a rock shaft 1324, this rock shaft also having fast thereon an arm 1326 pivotally connected to a rod 1328. This rod is connected through a spring 1330 and a bar 1332 to an arm 1334 fast on a rock shaft 1336, these connections being of substantially the same construction as those between the rod 1298 and the rack bar 1282 so as to afford provision for yield in both directions. Fast on the rock shaft 1336 is an arm 1338 pivotally connected to a link 1340 which is pivotally mounted on the previously mentioned rod 1288 connected to the bar 1290. It will thus be seen that the inverter 1310 is operated by the movements of the bar 1290. The movements of the inverter in opposite directions are adjustably limited by stop screws 1342 and 1344 (Fig. 38) in the casing 1312, these screws being arranged to engage a lug 1346 on one end of the inverter. The flexible tubes 1316 into which the tacks are dropped head downward by the inverter lead to tubes 1348 (Figs. 1 and 16) supported by the wiper carriers 846 and communicating with openings 1350 (Fig. 26) in the wiper carriers which are arranged to aline with the tack pockets 1134 of the tackers when the latter are in their initial positions. The construction is such that the tacks are delivered into these tack pockets near the end of the cycle of operations of the machine for use in the next cycle of the machine, the inverter being turned into the position illustrated in Fig. 37 to receive the tacks dropped by the separator and then turned reversely to drop the tacks into the tubes 1316.

Figure 62:
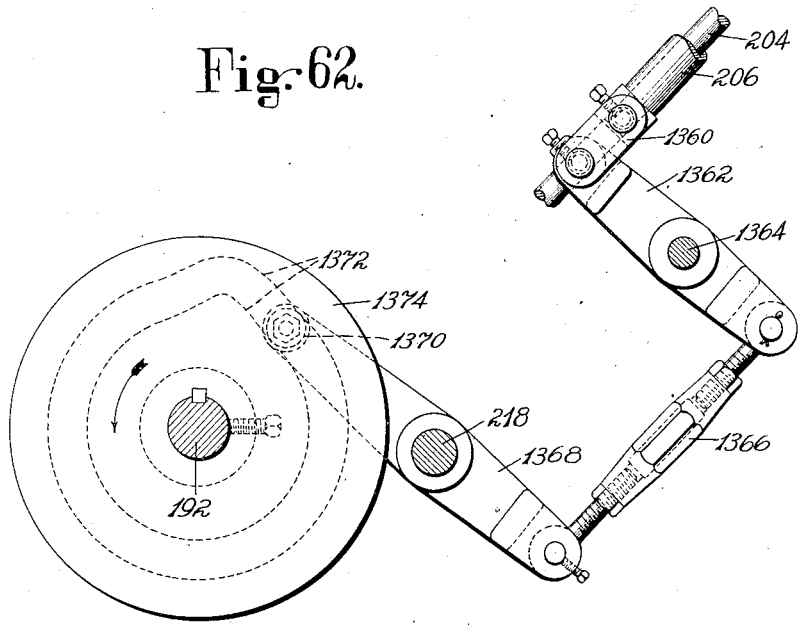
Fig. 62 is a view in left-hand side elevation of mechanism for controlling a part of the work support.

Near the end of the cycle of operations of the machine the toe plate 2 which supports the lip of the insole against the pressure of the wipers is returned to its starting position against the resistance of the springs 28. For this purpose there is mounted on a rock shaft 1352 (Fig. 6) on the frame casting 14 a bell-crank lever 1354 one arm of which is arranged to engage a tail on the latch 68 mounted on the slide 24 which carries the toe plate 2 as previously described. The other arm of the bell-crank lever is connected by a link 1356 to a collar 1358 fast on the previously mentioned sleeve 206. This sleeve is connected at its lower end by a link 1360 to a lever 1362 mounted on a rod 1364 on the frame, and the lever is connected by a link 1366 (Fig. 62) to a lever 1368 mounted on the previously mentioned rod 218. The lever 1368 carries a roll 1370 engaged by a path cam 1372 formed in one side of a cam wheel 1374 (Fig. 4) on the cam shaft 192. Near the end of the cycle this cam acts through the connections described to swing the bell-crank lever 1354 (Fig. 6) in the direction to cause it to engage and lift the latch 68 out of the notch 76 and then to act through the latch to return the slide 24 to its starting position where it is caught and held by the latch 34, the spring 46 yielding to permit the lug 36 to pass this latch.

The gear wheel 190 (Fig. 4) fast on the cam shaft 192 and the gear wheel 1278 fast on the cam shaft 810 are connected together by an idle gear 1376 so that both the cam shafts are turned in the same direction, and for operating them the gear wheel 190 is engaged by a pinion 1378 fast on a shaft 1380 which carries a worm gear 1382 driven by a worm 1384 on a clutch shaft 1386. Mounted to turn with this clutch shaft is one member 1388 (Fig. 5) of a friction clutch arranged to be engaged and driven by a cooperating clutch member 1390 which is fast on a sleeve 1392 rotatably mounted on the shaft 1386, this sleeve being driven continuously as hereinafter described. The clutch member 1388 is movable by a spring 1394 along the shaft 1386 into engagement with the clutch member 1390, and is movable reversely against the resistance of the spring out of engagement with the member 1390 and into engagement with a stationary brake member 1396. The clutch member 1388 is released to the action of the spring 1394 to start the machine by depression of a treadle 1398, and it is moved reversely to stop the machine by a lever 1400 operated by the previously mentioned cam wheel 466. The mechanism provided for releasing the clutch member 1388 by the depression of the treadle and for moving it reversely by the action of the lever 1400 is of the same construction as disclosed in the previously mentioned Letters Patent and accordingly need not be described in detail. The cam wheel 466 is provided on its periphery with a projection or cam 1402 for bringing the machine to a stop automatically at the end of the cycle, and with two other projections or cams 1404 and 1406 arranged somewhat differently from the disclosure of the above-mentioned Letters Patent for bringing the machine to a stop automatically twice in the course of the cycle, as will be explained in the description of operation of the machine.

Figure 1:
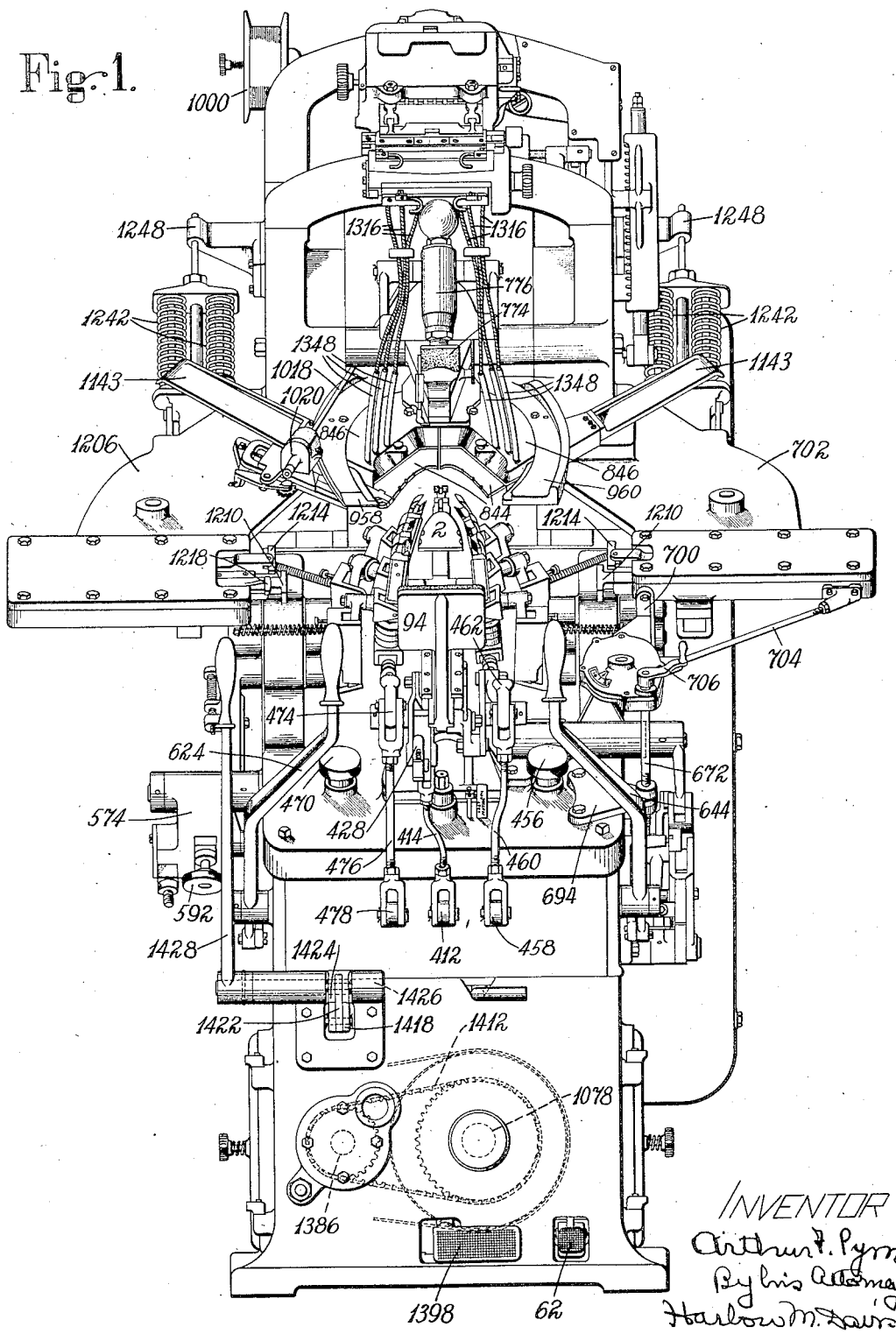
Fig. 1 is a view in front elevation of a machine in which the invention is embodied.

The means provided for rotating the clutch member 1390 differs from the construction disclosed in the above-mentioned Letters Patent in that the means there disclosed for reversing the machine at the will of the operator is omitted and in that there is provided means whereby the operator may, at will, bring the machine to a stop at any point in the cycle. For the purpose in view the sleeve 1392 on which the clutch member 1390 is mounted is driven through another clutch member 1408 which turns with the sleeve and which is operated by a cooperating clutch member 1410. The member 1410 may turn at times on the sleeve 1392 and is operated continuously by a chain 1412 and sprocket wheels from the driving shaft 1078 (Fig. 1). The clutch member 1408 is held normally in engagement with the member 1410 by spring-pressed plungers 1414 mounted in the member 1408 and engaging a flange 1416 on the sleeve 1392. It will thus be seen that normally the clutch member 1390 is driven continuously through the clutch 1408, 1410. The machine may be stopped at any point in the cycle by moving the clutch member 1408 out of engagement with the member 1410, and for this purpose there is provided a bell-crank lever 1418 pivoted at 1420 on the frame and having one of its arms connected to a hub of the clutch member 1408, its other arm being connected by a link 1422 to an arm 1424 fast on a rock shaft 1426 mounted on a bracket on the front of the frame, this rock shaft having fast thereon a hand lever 1428. It will thus be seen that by pulling the hand lever 1428 forwardly the operator may disconnect the main clutch 1388, 1390 from the source of power and stop the machine. Movement of the clutch member 1408 away from the member 1410 is limited by a stop member 1430 mounted on the sleeve 1392 and arranged to be engaged by a flange 1432 on the hub of the clutch member 1408 to stop the movement of the latter lengthwise of the sleeve 1392.

Figure 5:
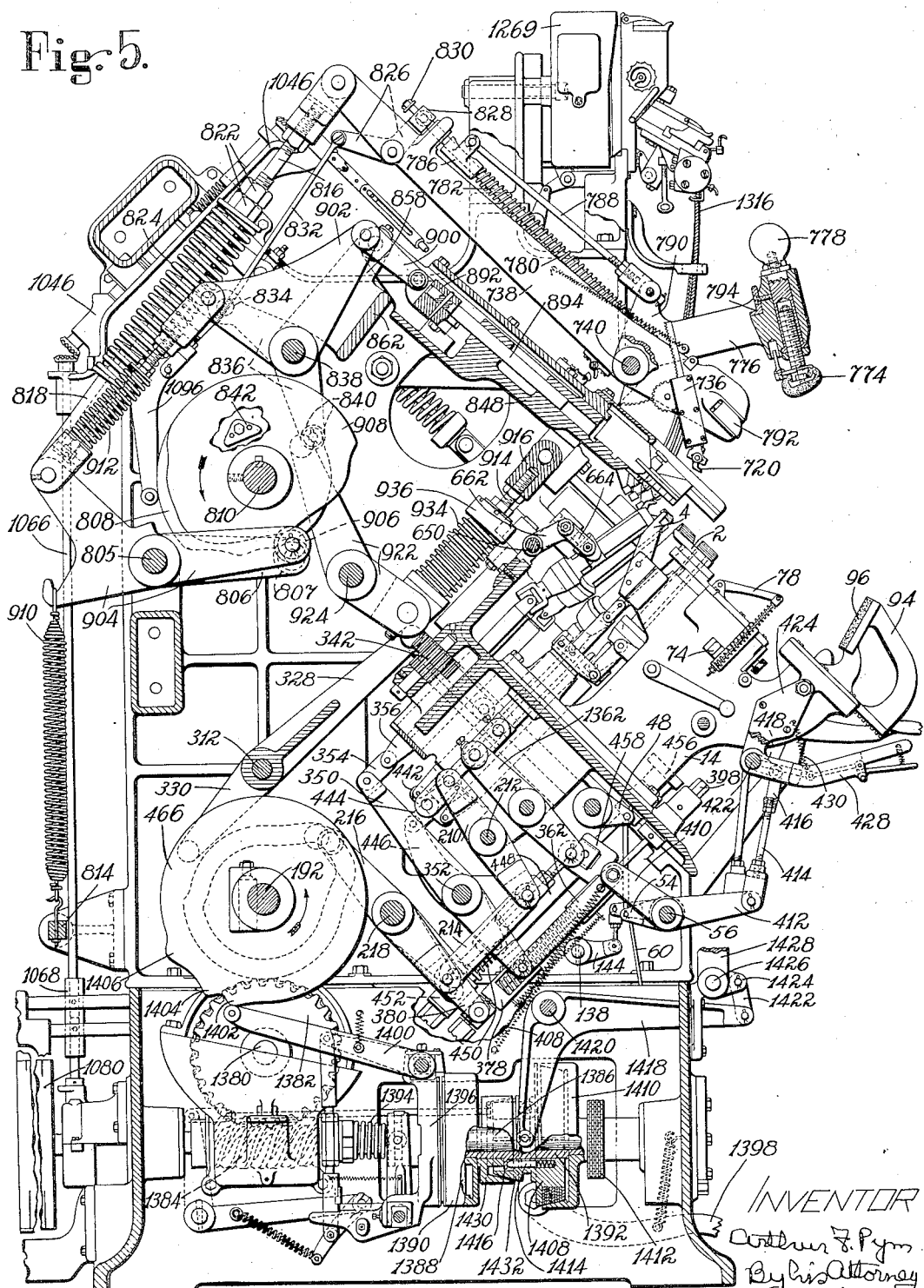
Fig. 5 is a view of the machine partly in left-hand side elevation and partly in section.
Figure 64:
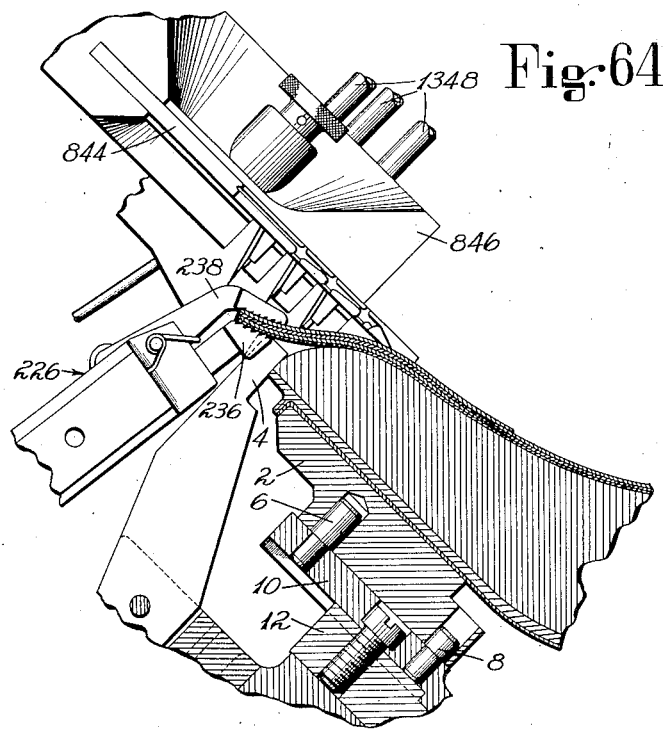

In the operation of the machine, briefly summarized the operator positions the last and shoe on the shoe support with the forepart of the insole resting on the toe plate 2 and preferably with the inner face of the insole lip engaging both the end and side faces of the toe plate, the rear portion of the last and shoe being supported on the member 78. By depression of the treadle 62 the operator then releases the toe plate 2 to the action of its springs, so that it is advanced to carry the shoe lengthwise until the toe-end face of the last engages the end gage or stop 4, the toe plate being locked then against reverse movement. By further depression of the treadle 62 the heel rest 94 is forced yieldingly against the heel end of the shoe, the treadle being locked against reverse movement so as to maintain the heel rest in operative position. After ascertaining that the margin of the upper materials is within the open toe and side gripper jaws, the operator starts the machine by depression of the starting treadle 1398. In the first stage of the cycle of the machine the toe and side gripper jaws are closed only far enough to bring the outer jaws 238 into close relation to the upper, without any substantial grip on the upper, whereupon the machine is brought to a stop automatically by the stop cam 1404 (Fig. 5). With the machine then at rest and the parts positioned as illustrated in Fig. 64, the operator adjusts the upper as may be required, so as to position it with the rear edge of the toe tip substantially flush with the rear end faces of the jaws of the front side grippers 230, i. e., those end faces of the jaws which are toward the operator. With the upper thus positioned, these grippers are depended upon thereafter, without the necessity for any further attention on the part of the operator, to locate the ends of the tip line at the proper distance from the toe-end face of the last in the upper-pulling operation.

After having adjusted the upper relatively to the grippers as above described the operator starts the machine again, whereupon the toe and side grippers are further closed to grip the upper firmly and are operated to pull the upper heightwise of the last, the toe grippers being operated positively and the side grippers yieldingly. In the course of this upper pulling operation foredrawing movements lengthwise of the last are imparted to all the grippers. These movements are positive, except for possible yield of the springs controlling the rear side grippers 232, and the positions to which the toe grippers and the front side grippers are thus moved are determined by the stop rod 672. In this stage of the cycle also the toe-end gage 4 is partially withdrawn from operative position and the toe wiper head is advanced somewhat to carry the toe wipers toward the end of the toe, the wipers partially closing during this advancing movement. By such movement of the wiper head the tip gage 720 is released so that it is moved down into contact with the upper at the top of the forepart. The machine is then brought to a stop by the stop cam 1406 with the parts in the positions illustrated in Fig. 65.

While the machine is at rest at the end of the second stage of the cycle the operator observes by reference to the tip gage 720 whether the tip seam over the top of the forepart has been so pulled by the toe grippers that it is at the proper distance from the toe-end face of the last, and if not he brings it into the correct position by movements of the toe grippers to increase or relax the force of their pull on the upper through the operation of the hand lever 428. By use of the hand levers 462 and 474 also the operator may move the side grippers in directions to increase or relax the force of their pull on the upper and may thereby shift the portions of the upper pulled by these grippers transversely of the last to adjust the upper further in proper relation to the last. By use of the hand levers 624 and 644, moreover, the operator may move the rear side grippers 232 relatively to the other grippers lengthwise of the last further to adjust the portions of the upper at the rear of the tip line in proper relation to the last. After the upper has thus been properly adjusted the operator swings the shoe holder 774 down into engagement with the top of the forepart of the upper, including the portion of the upper where the tip seam is located, the tip gage 720 being withdrawn from operative position by such downward movement of the holder. Also in response to such downward movement of the shoe holder the latch 792 which locks the holder to the lever 738 is released to render it operative.

After performing the manual operations above described the operator again starts the machine to cause it to operate through the final stage of its cycle. As the machine begins this stage of its cycle the shoe holder 774 is pressed firmly down upon the upper by movement of the lever 738. The toe grippers are then further operated to increase somewhat the force of their pull heightwise of the last and thus prepare the upper better for the wiping operation. At this time the spring 374 (Fig. 63) through which the pull is applied may yield, the tip seam across the top of the forepart being, in any case, held against movement by the pressure of the shoe holder 774 on the upper. At substantially the same time the toe wipers are further advanced and closed and are swung downwardly to wipe the upper heightwise of the toe with the edges of the wipers in close relation to the end and side faces of the last, the toe-end gage 4 being fully withdrawn from operative position to make way for the wipers. The positions of the parts substantially at the beginning of the downward wiping movement of the wipers are illustrated in Fig. 66, and the positions of the wipers at the end of this movement are illustrated in Fig. 67. It will be observed that the wipers are thus carried to a position a little below the edge of the insole so as to insure against displacing the edge of the insole when they wipe the upper inwardly, and the wipers may under some conditions engage the grippers, as shown, and press them somewhat farther downwardly. Near the end of the downward movement of the wipers, or shortly thereafter, the heel rest is forced more firmly against the shoe and is locked against reverse movement, the treadle 62 being released to permit it to return to starting position.

After the parts have arrived in the positions illustrated in Fig. 67 the toe wipers are further advanced and closed to wipe the marginal portion of the upper inwardly over the feather and against the lip of the insole. Substantially at the time when the wipers begin to wipe the upper inwardly, as illustrated in Fig. 68, a short secondary foredrawing movement is imparted to all the grippers in the manner previously described, to insure against any objectionable displacement of the ends of the tip seam lengthwise of the last by the action of the toe wipers on the upper. Shortly thereafter all the grippers are opened to release the upper and the side grippers are swung inwardly out of the way beneath the bottom of the last. As the toe wipers are wiping the upper inwardly they are pressed upwardly through the light spring 934 (Fig. 49) to press the upper toward the feather of the insole, and substantially at the end of their inward wiping movements they are pressed more firmly up against the upper through the heavy spring 926. Before the completion of the inward wiping movements of the wipers the wire-feeding means begins to force the toe binder wire around the toe along the groove 966 in the wipers, and after the end of the wipe the tacks are driven to fasten the binder, the wire being severed when the tacks have been partially driven. As hereinbefore explained, the tacks as they are driven are so deflected that they force the portions of the binder which they engage inwardly toward the lip of the insole and bend these portions inwardly, and the heads of the two foremost tacks at each side at the end of the drive force the wire toward the bottom face of the last and thus clamp it firmly against the upper. As also explained, in the construction herein shown the rearmost tack at each side is left somewhat upstanding so that the operator may twist the end of the binder around it, if he so desires, after removing the shoe from the machine. After the tacking operation has been completed the wipers and tackers are returned to their starting positions, and after the tackers have arrived at the limits of their outward movements relatively to the wipers, tacks are delivered to them in the manner described for use in the next cycle of the machine. In the return of the parts of the machine to starting positions the shoe holder 774 releases its pressure on the shoe and is lifted somewhat before the toe wipers begin their retractive movements, as illustrated in Fig. 71, so as to avoid any objectionable drag of the wipers on the upper as they are retracted, the shoe being lifted by the wipers off the toe plate 2 by the action of the springs 926 and 934 when the pressure of the shoe holder on the top of the shoe is relieved.

Having described the invention, what I claim as new and desire to secure by Letters Patent of the United States is:

1. In a machine for shaping uppers over lasts, the combination with grippers for pulling an upper over a last positioned bottom downward, and means for working the marginal portion of the upper around the toe into lasted position against a lip of an insole on the last, of a device having an upper face for engaging the bottom face of the forepart of the insole to determine the position of the shoe and last heightwise when the work is initially presented to the machine, said device being constructed to engage the lip of the insole at the opposite sides of the forepart and to determine the position of the work laterally by such engagement with the lip.

2. In a machine for shaping uppers over lasts, the combination with grippers for pulling an upper over a last positioned bottom downward, and wipers for wiping the marginal portion of the upper around the toe into lasted position against a lip of an insole on the last, of a device having an upper face for engaging the bottom face of the forepart of the insole to position the shoe and last heightwise in proper relation to the grippers and wipers when the work is initially presented to the machine, said device being formed substantially to fit the inner face of the lip of the insole around the toe to support the lip against the pressure of the wipers and being arranged to determine the position of the work laterally by its engagement with the lip.

3. In a machine for shaping uppers over lasts, the combination with grippers for pulling an upper over a last positioned bottom downward, and means for working the marginal portion of the upper around the toe into lasted position against a lip of an insole on the last, of a device having an upper face for engaging the bottom face of the forepart of the insole to determine the position of the shoe and last heightwise, said device being constructed and arranged to determine the position of the last laterally by engagement with the inner face of the lip of the insole, and additional means arranged to determine the lengthwise position of the last.

4. In a machine for shaping uppers over lasts, the combination with grippers for pulling an upper over a last positioned bottom downward, and means for working the marginal portion of the upper around the toe into lasted position against a lip of an insole on the last, of a device having an upper face for engaging the bottom face of the forepart of the insole to determine the position of the shoe and last heightwise, said device being constructed and arranged to determine the position of the last laterally by engagement with the inner face of the lip of the insole, and a toe-end gage arranged to act as a stop to determine the lengthwise position of the last.

5. In a machine for shaping uppers over lasts, the combination with grippers for pulling an upper over a last positioned bottom downward, and wipers for wiping the marginal portion of the upper around the toe into lasted position against a lip of an insole on the last, of a device having an upper face for engaging the bottom face of the forepart of the insole to position the shoe and last heightwise in proper relation to the grippers and wipers, said device being formed substantially to fit the inner face of the lip of the insole around the toe to support the lip against the pressure of the wipers and being arranged to determine the position of the last laterally by its engagement with the lip, a toe-end gage arranged to act as a stop to determine the lengthwise position of the last, and means for moving said device toward the toe-end gage after the work has been placed upon the device.

6. In a machine for shaping uppers over lasts, the combination with grippers for pulling an upper over a last at the toe end and the opposite sides of the forepart, and means for working the marginal portion of the upper around the toe into lasted position against a lip of an insole on the last, of a device arranged to position the last heightwise by engagement with the bottom face of the forepart of the insole and in contact with which the insole is placed in presenting the work to the machine, said device being constructed and arranged to determine the position of the last laterally by engagement with the inner face of the lip of the insole.

7. In a machine for shaping uppers over lasts, the combination with grippers for pulling an upper over a last at the toe end and the opposite sides of the forepart, and wipers for wiping the marginal portion of the upper around the toe into lasted position against a lip of an insole on the last, of a device arranged to position the last heightwise by engagement with the bottom face of the forepart of the insole and in contact with which the insole is placed in presenting the work to the machine, said device being formed to engage the inner face of the lip of the insole around the toe to support the lip against pressure of the wipers and being arranged to determine the position of the last laterally by its engagement with the lip, and a toe-end gage arranged to act as a stop to determine the lengthwise position of the last.

8. In a machine for shaping uppers over lasts, the combination with grippers movable heightwise of a last to pull an upper over the last and also movable lengthwise of the last to pull the upper forwardly, and means for wiping the marginal portion of the upper around the toe into lasted position against a lip of an insole on the last, of a device constructed and arranged to determine the position of the last laterally by engagement with the inner face of the lip of the insole, and a toe-end gage arranged to act as a stop to determine the lengthwise position of the last and to hold the last against lengthwise displacement in the upper-pulling operation.

9. In a power-operated machine for shaping uppers over lasts, the combination with grippers for pulling an upper over a last, and means for working the marginal portion of the upper around the toe into lasted position against a lip of an insole on the last, of a toe-end gage arranged to act as a stop to determine the lengthwise position of the last, a device arranged to engage the bottom face of the insole to determine the heightwise position of the last and formed to engage the inner face of the lip of the insole to support the lip against pressure in the upper-shaping operation, and means for moving said device toward the end gage while in contact with the insole prior to the starting of the power operation of the machine.

10. In a machine for shaping uppers over lasts, the combination with means for shaping the toe end of an upper over a last and over an insole having a lip thereon, of a device arranged to position the last heightwise by engagement with the bottom face of the forepart of the insole and in contact with which the insole is placed in presenting the work to the machine, said device being constructed and arranged to determine the position of the last laterally by engagement with the inner face of the lip of the insole, and means for maintaining said device stationary throughout the upper-shaping operation.

11. In a machine for shaping uppers over lasts, the combination with means for shaping the toe end of an upper over a last and over an insole having a lip thereon, of a device arranged to position the last heightwise by engagement with the bottom face of the forepart of the insole and in contact with which the insole is placed in presenting the work to the machine, said device being formed substantially to fit the inner face of the lip of the insole around the toe to support the lip against pressure in the upper-shaping operation and being arranged to determine the position of the last laterally by engagement with the lip, and means for maintaining said device stationary throughout the upper-shaping operation.

12. In a machine for shaping uppers over lasts, the combination with means for shaping the toe end of an upper over a last and over an insole having a lip thereon, of a device arranged to position the last heightwise by engagement with the bottom face of the forepart of the insole and in contact with which the insole is placed in presenting the work to the machine, said device being constructed and arranged to determine the position of the last laterally by engagement with the inner face of the lip of the insole, a toe-end gage arranged to act as a stop to determine the lengthwise position of the last, means for maintaining said device stationary throughout the upper-shaping operation, and means for withdrawing said toe-end gage from operative position prior to the completion of the upper-shaping operation.

13. In a machine for shaping uppers over lasts, the combination with means for shaping the toe end of an upper over a last and over an insole having a lip thereon, of a device arranged to position the last heightwise by engagement with the bottom face of the forepart of the insole and in contact with which the insole is placed in presenting the work to the machine, said device being formed substantially to fit the inner face of the lip of the insole around the toe to support the lip against pressure in the upper-shaping operation and being arranged to determine the position of the last laterally by engagement with the lip, means for maintaining said device stationary throughout the upper-shaping operation, a toe-end gage arranged to act as a stop to determine the lengthwise position of the last, and means for moving said device toward the toe-end gage prior to the upper-shaping operation.

14. In a machine for shaping uppers over lasts, the combination with means for shaping the toe end of an upper over a last and over an insole having a lip thereon, of a toe-end gage arranged to act as a stop to determine the lengthwise position of the last, a device arranged to engage the inner face of the lip of the insole at the toe end, and means for operating said device to move the last lengthwise to the position determined by said end gage.

15. In a machine for shaping uppers over lasts, the combination with means for shaping the toe end of an upper over a last and over an insole having a lip thereon, of a toe-end gage arranged to act as a stop to determine the lengthwise position of the last, a device arranged to engage the inner face of the lip of the insole at the toe end, spring means for operating said device to move the last lengthwise to the position determined by said end gage, and a member arranged to hold the device initially retracted and movable to release it to the action of said spring means.

16. In a machine for shaping uppers over lasts, the combination with means for shaping the toe end of an upper over a last and over an insole having a lip thereon, of a toe-end gage arranged to act as a stop to determine the lengthwise position of the last, a device formed substantially to fit the inner face of the lip of the insole around the toe to support the lip against pressure in the upper-shaping operation and arranged to determine the position of the last laterally by engagement with the lip, and means for operating said device to move the last lengthwise into contact with said end gage.

17. In a machine for shaping uppers over lasts, the combination with means for shaping the toe end of an upper over a last and over an insole having a lip thereon, of a toe end gage arranged to act as a stop to determine the lengthwise position of the last, a device formed to engage the inner face of the lip of the insole around the toe to support the lip against pressure in the upper-shaping operation and arranged to position the last laterally by engagement with the lip, spring means for operating said device to move the last lengthwise into contact with said end gage, and means for locking the device against retractive movement.

18. In a machine for shaping uppers over lasts, the combination with means for shaping the toe end of an upper over a last and over an insole on the last, of a toe-end gage arranged to act as a stop to determine the lengthwise position of the last, a device arranged to position the last and shoe heightwise and in contact with which the insole is placed in presenting the work to the machine, and means for operating said device to move the last lengthwise to the position determined by said end gage.

19. In a machine for shaping uppers over lasts, the combination with means for shaping the toe end of an upper over a last and over an insole having a lip thereon, of a toe end gage arranged to act as a stop to determine the lengthwise position of the last, a device arranged to engage the inner face of the lip of the insole at the toe end and in contact with which the insole is placed in presenting the work initially to the machine, and means for moving said device toward the end gage after the insole has been placed in contact with the device.

20. In a machine for shaping uppers over lasts, the combination with means for shaping the toe end of an upper over a last and over an insole having a lip thereon, of a toe-end gage arranged to act as a stop to determine the lengthwise position of the last, a device arranged to engage the inner face of the lip of the insole at the toe end and in contact with which the insole is placed in presenting the work initially to the machine, spring means arranged to be released to move said device toward the end gage after the insole has been placed in contact with the device, and means for locking the device against retractive movement.

21. In a power-operated machine for shaping uppers over lasts, the combination with means for shaping the toe end of an upper over a last and over an insole having a lip thereon, of a toe-end gage arranged to act as a stop to determine the lengthwise position of the last, a device formed to engage the inner face of the lip of the insole around the toe to support the lip against pressure in the upper-shaping operation and arranged to position the last laterally by engagement with the lip, and means for moving said device toward the toe-end gage while in contact with the insole prior to the starting of the power operation of the machine.

22. In a power-operated machine for shaping uppers over lasts, the combination with means for shaping the toe end of an upper over a last and over an insole having a lip thereon, of a toe-end gage arranged to act as a stop to determine the lengthwise position of the last, a device arranged to position the last heightwise by engagement with the bottom face of the insole when the work is initially presented to the machine, said device being constructed and arranged also to position the last laterally by engagement with the inner face of the insole lip at the opposite sides of the toe and to support the lip around the toe against pressure in the upper-shaping operation, spring means for moving said device in a direction lengthwise of the insole toward the end gage, and mechanism arranged to hold the device initially retracted against the resistance of said spring means and movable to release the device prior to the starting of the power operation of the machine.

23. In a machine for shaping uppers over lasts, the combination with means for shaping the toe end of an upper over a last and over an insole having a lip thereon, of a toe-end gage in position to have the toe-end face of the last placed in contact with it when the work is initially presented to the machine, a device formed to engage the inner face of the lip of the insole at the toe end to support the lip against pressure in the upper-shaping operation and arranged to engage the insole when the work is initially presented, and means for moving said device along the insole toward the end gage into supporting relation to the lip.

24. In a machine for shaping uppers over lasts, the combination with means for shaping the toe end of an upper over a last and over an insole having a lip thereon, of a toe-end gage in position to have the toe-end face of the last placed in contact with it when the work is initially presented to the machine, a device formed to engage the inner face of the lip of the insole at the toe end to support the lip against pressure in the upper-shaping operation and arranged to engage the insole when the work is initially presented, spring means arranged to be released to move said device along the insole toward the end gage into supporting relation to the lip, and means for locking the device against retractive movement.

25. In a machine for shaping uppers over lasts, the combination with means for shaping the toe end of an upper over a last and over an insole having a lip thereon, of a device arranged to position the last heightwise by engagement with the bottom face of the insole when the work is initially presented to the machine, said device being formed to engage the inner face of the lip of the insole to support the lip against pressure in the upper-shaping operation, and means for moving said device along the insole into position to engage the inner face of the lip after its engagement with the bottom face of the insole.

26. In a machine for shaping uppers over lasts, the combination with means for shaping an upper over a last and over an insole having a lip thereon, of a device arranged to position the last heightwise by engagement with the bottom face of the insole when the work is initially presented to the machine, said device being formed to engage the inner face of the lip of the insole to support the lip against pressure in the upper-shaping operation, spring means for moving said device along the insole into position to engage the inner face of the lip after its engagement with the bottom face of the insole, and means for releasing the device to the action of said spring means.

27. In a power-operated machine for shaping uppers over lasts, the combination with means for shaping the toe end of an upper over a last and over an insole having a lip thereon, of a device arranged to engage the inner face of the lip of the insole to support the lip against pressure in the upper-shaping operation, and means for moving said device along the insole into lip-supporting position prior to the starting of the power operation of the machine.

28. In a machine for shaping uppers over lasts, the combination with means for shaping an upper over the forepart of a last positioned bottom downward, of a member arranged to serve as a support for the shoe and last under the forepart, and another member adjustable in directions heightwise of the last relatively to said first-named member and arranged to support the shoe and last under a portion thereof at the rear of the forepart, said other member comprising a shoe-engaging bar arranged to extend lengthwise across the bottom of the shoe.

29. In a machine for shaping uppers over lasts, the combination with means for shaping an upper over a last positioned bottom downward, of a member arranged to serve as a support for the shoe and last under the forepart, another member arranged to support the shoe and last under a portion thereof at the rear of the forepart, a spring tending to move said other member heightwise of the last relatively to said first-named member, and means cooperating with said spring for adjusting said other member heightwise of the last.

30. In a machine for shaping uppers over lasts, the combination with means for shaping an upper over the forepart of a last positioned bottom downward and over an insole having a lip thereon, of a device arranged to serve as a support for the shoe and last under the forepart and formed substantially to fit the inner face of the lip of the insole, and a member arranged to support the shoe and last under a portion thereof at the rear of the forepart.

31. In a machine for shaping uppers over lasts, the combination with means for shaping the toe end of an upper over a last positioned bottom downward and over an insole having a lip thereon, of a toe-end gage arranged to act as a stop to determine the lengthwise position of the last, a device arranged to serve as a support for the shoe and last under the forepart and formed to engage the inner face of the lip of the insole, said device being movable toward the end gage after the shoe has been placed upon it, and a member arranged to support the shoe and last under a portion thereof at the rear of the forepart and relatively to which said device is thus movable toward the end gage.

32. In a machine for shaping uppers over lasts, the combination with means for shaping the toe end of an upper over a last and over an insole having a lip thereon, of a toe-end gage arranged to act as a stop to determine the lengthwise position of the last, a device arranged to determine the position of the last laterally by engagement with the inner face of the lip of the insole, and a heel rest for engaging the heel-end face of the shoe to hold the shoe and last against lengthwise displacement.

33. In a machine for shaping uppers over lasts, the combination with means for shaping the toe end of an upper over a last and over an insole having a lip thereon, of a toe-end gage arranged to act as a stop in engagement with the toe-end face of the last to determine the lengthwise position of the last, a device arranged to determine the position of the shoe and last heightwise by engagement with the bottom face of the insole and formed to engage the inner face of the lip of the insole around the toe to support the lip against pressure in the upper-shaping operation, and a heel rest for engaging the heel-end face of the shoe to hold the shoe and last against lengthwise displacement.

34. In a machine for shaping uppers over lasts, the combination with means for shaping the toe end of an upper over a last and over an insole having a lip thereon, of a toe-end gage arranged to act as a stop to determine the lengthwise position of the last, a device formed to engage the inner face of the lip of the insole around the toe to support the lip against pressure in the upper-shaping operation, a heel rest for engaging the heel end of the shoe to hold the shoe and last against lengthwise displacement, and means for moving said lip-supporting device in a direction lengthwise of the shoe toward the end gage and for also moving said heel rest into engagement with the shoe.

35. In a machine for shaping uppers over lasts, the combination with means for shaping the toe end of an upper over a last and over an insole having a lip thereon, of a toe-end gage arranged to act as a stop to determine the lengthwise position of the last, a device formed to engage the inner face of the lip of the insole around the toe to support the lip against pressure in the upper-shaping operation, spring means for moving said device toward the end gage, a member movable by the operator to release said spring means and render it operative, and a heel rest arranged to engage the heel end of the shoe and movable into shoe-engaging position by said member.

36. In a power-operated machine for shaping uppers over lasts, the combination with means for shaping the toe end of an upper over a last and over an insole having a lip thereon, of a toe-end gage arranged to act as a stop to determine the lengthwise position of the last, a device arranged to position the shoe and last heightwise by engagement with the bottom face of the insole and formed to engage the inner face of the lip of the insole around the toe to support the lip against pressure in the upper-shaping operation, a heel rest for engaging the heel end of the shoe to hold the shoe and last against lengthwise displacement, means controlled by the operator for moving said device in a direction lengthwise of the shoe toward the end gage and for moving the heel rest into engagement with the shoe prior to the starting of the power operation of the machine, and automatic means for forcing the heel rest more firmly against the shoe in the power operation of the machine.

37. In a power-operated machine for shaping uppers over lasts, the combination with means for shaping an upper over the forepart of a last, of a toe-end gage arranged to act as a stop to determine the lengthwise position of the last and to hold the last against lengthwise displacement in one direction in the upper-shaping operation, a heel rest for engaging the heel end of the shoe to hold the shoe and last against lengthwise displacement in the opposite direction, mechanism movable by the operator to force said heel rest against the shoe prior to the starting of the power operation of the machine, and mechanism automatically operative in the power operation of the machine to assume control of said heel rest.

38. In a power-operated machine for shaping uppers over lasts, the combination with means for shaping an upper over the forepart of a last, of means for positioning the forepart of the last and shoe for the upper-shaping operation, a heel rest for engaging the heel end of the shoe to hold the shoe and last against lengthwise displacement, means movable by the operator to force said heel rest yieldingly against the shoe prior to the starting of the power operation of the machine, and mechanism automatically operative in the power operation of the machine to force said heel rest more firmly against the shoe and to hold it positively in shoe-engaging position.

39. In a power-operated machine for shaping uppers over lasts, the combination with means for shaping an upper over the forepart of a last, of means for positioning the forepart of the last for the upper-shaping operation, a heel rest for engaging the heel end of the shoe to hold the shoe and last against lengthwise displacement, mechanism including a member movable by the operator to force said heel rest against the shoe prior to the starting of the power operation of the machine, means for locking said member against reverse movement, and mechanism automatically operative in the power operation of the machine to assume control of said heel rest and to release said member.

40. In a machine for shaping uppers over lasts, the combination with means for shaping the forepart of an upper over a last, of means for positioning each last with its toe-end face in the same location regardless of the style and size of the last, and a heel rest for engaging the heel-end face of the shoe to hold the shoe and last against lengthwise displacement in the upper-shaping operation, said heel rest having a shoe-engaging face formed to extend straight across the shoe from side to side for engaging the heel end of each shoe regardless of the lateral position of the heel end and being movable in a direction lengthwise of the shoe to a position determined by the heel-end face of the shoe.

41. In a machine for shaping uppers over lasts, the combination with means for shaping the forepart of an upper over a last, of a toe-end gage arranged to act as a stop to determine the lengthwise position of the toe end of each last, and a heel rest for engaging the heel-end face of the shoe to hold the shoe and last against lengthwise displacement in the upper-shaping operation, said heel rest having a shoe-engaging face formed to extend straight across the shoe from side to side for engaging the heel end of each shoe regardless of the lateral position of the heel end and being movable toward said end gage into contact with the heel-end face of each shoe.

42. In a machine for shaping uppers over lasts, the combination with means for shaping the forepart of an upper over a last, of means arranged to act at the forepart of the last and shoe to determine the position of the last for the upper-shaping operation, a heel rest for engaging the heel-end face of the shoe to hold the shoe and last against lengthwise displacement in the upper-shaping operation, said heel rest having a shoe-engaging face formed to extend straight across the shoe from side to side for engaging the heel-end of each shoe regardless of the lateral position of the heel end and being movable into shoe-engaging position after the last and shoe have been presented in the position determined by said forepart-positioning means.

43. In a machine for shaping uppers over lasts, a gripper for pulling an upper over a last, said gripper comprising a pair of jaws relatively movable to grip the upper and also comprising a member rectilinearly movable to effect relative closing movement of the jaws and another member rotatable to operate said rectilinearly movable member, one of said members having an end face opposite an end face of the other member and formed as a cam face for effecting the jaw-closing movement of the rectilinearly movable member by the turning of the rotatable member.

44. In a machine for shaping uppers over lasts, a gripper for pulling an upper over a last, said gripper comprising a pair of jaws relatively movable to grip the upper and also comprising a member rectilinearly movable to effect relative closing movement of the jaws and another member rotatable to operate said first-named member, one of said members having an end face opposite an end face of the other member and formed as a cam face for effecting the jaw-closing movement of said first-named member by the turning of the rotatable member, and a connection between said members for effecting jaw-opening movement of said first-named member by reverse turning movement of the rotatable member.

45. In a machine for shaping uppers over lasts, a gripper for pulling an upper over a last, said gripper comprising a casing, a pair of jaws supported by said casing and relatively movable to grip the upper, a member rectilinearly movable in said casing in a direction substantially parallel to the direction of the pull of the gripper on the upper to effect relative closing movement of the jaws, and another member rotatable in said casing about an axis substantially parallel to the direction of movement of said first-named member to operate the latter, said members having opposed end faces formed as cam faces for effecting the jaw-closing movement of said first-named member by the turning of the rotatable member.

46. In a machine for shaping uppers over lasts, a gripper for pulling an upper over a last, said gripper comprising a casing, a pair of jaws supported by said casing and relatively movable to grip the upper, a member rectilinearly movable in said casing in a direction substantially parallel to the direction of the pull of the gripper on the upper to effect relative closing movement of the jaws, and another member rotatable in said casing about an axis substantially parallel to the direction of movement of said first-named member to operate the latter, one of said members having an end face opposite an end face of the other member and formed as a cam face for effecting the jaw-closing movement of said first-named member by the turning of the rotatable member, and a pin and cam slot connection between said members for effecting jaw opening movement of said first-named member by reverse turning movement of the rotatable member.

47. In a machine for shaping uppers over lasts, a gripper for pulling an upper over a last, said gripper comprising a pair of jaws relatively movable to grip the upper and also comprising a member rectilinearly movable in a direction substantially parallel to the direction of the pull of the gripper on the upper to effect relative closing movement of the jaws and another member rotatable about an axis substantially parallel to the direction of movement of said first-named member to operate the latter, said members having opposed end faces formed as cam faces for effecting the jaw-closing movement of said first-named member by the turning of the rotatable member, and a stem extending from one of said members into a recess in the other member and having a pin and cam slot connection with said other member for returning said first-named member by reverse turning movement of the rotatable member.

48. In a machine for shaping uppers over lasts, a gripper for pulling an upper over a last, said gripper comprising a pair of upper-gripping jaws, and means for imparting closing movements to both said jaws and for thereafter imparting further closing movement to one of them while the other is substantially at rest.

49. In a machine for shaping uppers over lasts, a gripper for pulling an upper over a last, said gripper comprising a pair of upper-gripping jaws, and means for imparting closing movements to both said jaws until they are nearly in upper-gripping relation and for thereafter imparting further closing movement to one of the jaws alone to grip the upper, said last-named jaw being reversely movable far enough to release the upper while the other jaw is stationary.

50. In a machine for shaping uppers over lasts, a gripper for pulling an upper over a last, said gripper comprising a pair of upper-gripping jaws one movable rectilinearly and the other mounted to swing in the closing and opening of the jaws, and means for imparting closing movements to both said jaws and for thereafter imparting further closing movement to the rectilinearly movable jaw while the other jaw is substantially at rest.

51. In a machine for shaping uppers over lasts, a gripper for pulling an upper over a last, said gripper comprising a pair of upper-gripping jaws one movable rectilinearly and the other mounted to swing to a position in line with the path of movement of said rectilinearly movable jaw in the closing of the jaws, and means for swinging said other jaw to that position and for thereafter holding it stationary during further closing movement of the rectilinearly movable jaw, said last-named jaw being reversely movable far enough to release the upper while the other jaw is stationary.

52. In a machine for shaping uppers over lasts, a gripper for pulling an upper over a last, said gripper comprising a pair of upper-gripping jaws both mounted for closing and opening movements, and cam means movable with one of said jaws for imparting closing movement to the other jaw.

53. In a machine for shaping uppers over lasts, a gripper for pulling an upper over a last, said gripper comprising a pair of upper-gripping jaws one movable rectilinearly and the other mounted to swing in the closing and opening of the jaws, and cam means movable with the rectilinearly movable jaw for imparting closing movement to the other jaw.

54. In a machine for shaping uppers over lasts, a gripper for pulling an upper over a last, said gripper comprising a pair of upper-gripping jaws one mounted to swing and the other movable rectilinearly in a direction substantially opposite to the direction of the pull of the gripper on the upper in the closing of the jaws, a portion of said last-named jaw having a cam face thereon for imparting closing movement to the swinging jaw.

55. In a machine for shaping uppers over lasts, a gripper for pulling an upper over a last, said gripper comprising a casing, a gripper jaw pivotally supported on said casing, another gripper jaw, a slide in said casing carrying said other gripper jaw and movable in a direction substantially opposite to the direction of the pull of the gripper on the upper to impart closing movement to the jaw carried thereby, cam means operated by said slide for imparting closing movement to said first-named jaw, and means including a spring in said casing for yieldingly operating said slide.

56. In a machine for shaping uppers over lasts, a gripper for pulling an upper over a last, said gripper comprising a pair of upper-gripping jaws one mounted to swing and the other movable rectilinearly in a direction substantially opposite to the direction of the pull of the gripper on the upper in the closing of the jaws, cam means movable with the rectilinearly movable jaw for imparting closing movement to the other jaw, and a spring for imparting opening movement to said other jaw when permitted by said cam means.

57. In a machine for shaping uppers over lasts, a gripper for pulling an upper over a last, said gripper comprising a pair of upper-gripping jaws both mounted for opening and closing movements, and means movable with one of said jaws for controlling the other jaw, said controlling means being constructed to impart closing movement to said other jaw during a portion only of the closing movement of the jaw with which said means is movable.

58. In a machine for shaping uppers over lasts, a gripper for pulling an upper over a last, said gripper comprising a pair of upper-gripping jaws one movable rectilinearly and the other mounted to swing in the closing and opening of the jaws, and means movable with said rectilinearly movable jaw for controlling the other jaw, said controlling means being constructed to impart closing movement to said other jaw during a portion of the closing movement of the rectilinearly movable jaw and thereafter to maintain said other jaw substantially stationary while the rectilinearly movable jaw receives further closing movement.

59. In a machine for shaping uppers over lasts, a gripper for pulling an upper over a last, said gripper comprising a pair of upper-gripping jaws one movable rectilinearly and the other mounted to swing in the closing and opening of the jaws, and means movable with said rectilinearly movable jaw for controlling the other jaw, said controlling means having a cam face for imparting closing movement to said other jaw during a portion of the closing movement of the rectilinearly movable jaw and having another face arranged to maintain said other jaw substantially at rest while the rectilinearly movable jaw receives further closing movement.

60. In a machine for shaping uppers over lasts, a gripper for pulling an upper over a last, said gripper comprising a pair of jaws both mounted for closing movements and also comprising means rotatable about an axis extending in substantially parallel relation to the direction of the pull of the gripper on the upper for imparting to said jaws their closing movements.

61. In a machine for shaping uppers over lasts, a gripper for pulling an upper over a last, said gripper comprising a pair of jaws both mounted for closing movements and also comprising a member rectilinearly movable to impart to the jaws their closing movements and another member rotatable to operate said rectilinearly movable member.

62. In a machine for shaping uppers over lasts, a gripper for pulling an upper over a last, said gripper comprising a casing, a jaw supported on said casing for swinging movement, a cooperating jaw mounted for rectilinear movement, and means rotatable in said casing for imparting said movements to the jaws to close them.

63. In a machine for shaping uppers over lasts, a gripper for pulling an upper over a last, said gripper comprising a pair of upper-gripping jaws one movable rectilinearly and the other mounted to swing in the closing and opening of the jaws, means movable with the rectilinearly movable jaw for imparting closing movement to the other jaw, and cam means rotatable about an axis substantially parallel to the direction of movement of the rectilinearly movable jaw for operating the latter.

64. In a machine for shaping uppers over lasts, a plurality of grippers for pulling an upper over a last in different locations about the forepart of the last, said grippers comprising upper-gripping jaws mounted to swing inwardly toward the last to close them and other cooperating jaws mounted for rectilinear closing movements in directions substantially opposite to the directions of the pull of the grippers on the upper.

65. In a machine for shaping uppers over lasts, a plurality of grippers for pulling an upper over a last in different locations about the forepart of the last, said grippers comprising upper-gripping jaws mounted for inward swinging movements toward the last to close them and other cooperating jaws mounted for closing movements heightwise of the last, and means for swinging said first-named jaws inwardly as the other jaws receive their closing movements and for thereafter maintaining them substantially stationary while the other jaws receive further closing movements to grip the upper.

66. In a machine for shaping uppers over lasts, a plurality of grippers for pulling an upper over a last positioned bottom downward, said grippers comprising upwardly and downwardly movable jaws and other cooperating jaws mounted to swing inwardly toward the last and outwardly therefrom, and means for imparting to said first-named jaws upward closing movements and for imparting to said other jaws inward swinging movements to close them.

67. In a machine for shaping uppers over lasts, a plurality of grippers for pulling an upper over a last positioned bottom downward, said grippers comprising jaws mounted for upward closing movements and other cooperating jaws mounted for swinging movements inwardly toward the last to close them, and controlling means movable upwardly with said first-named jaws for swinging said other jaws inwardly and for thereafter maintaining them substantially stationary as the first-named jaws are moved farther upwardly to grip the upper.

68. In a machine for shaping uppers over lasts, a plurality of grippers for pulling an upper over a last positioned bottom downward, said grippers comprising jaws mounted for upward closing movements and other jaws mounted for inward swinging movements toward the last to close them, said first-named jaws being movable downwardly to release the upper while said other jaws are substantially stationary.

69. In a power-operated machine for shaping uppers over lasts, grippers having jaws for gripping an upper and pulling it over a last, power-operated means for effecting relative closing movement of said jaws, and automatic means for bringing the machine to a stop with said jaws partially closed to permit the upper to be adjusted relatively to the jaws before they finally grip the upper.

70. In a power-operated machine for shaping uppers over lasts, grippers having jaws arranged to grip and pull an upper over a last at the opposite sides of the forepart and to locate the ends of the tip seam at the proper distances from the toe-end face of the last in the upper-pulling operation, automatic means for bringing the machine to a stop after the beginning of its power operation, and power-operated means for effecting a partial relative closing movement of said gripper jaws before the machine is thus brought to a stop to facilitate adjustment of the tip seam in proper relation to the jaws while the machine is at rest and for effecting further relative closing movement of the jaws after the machine is again started.

71. In a power-operated machine for shaping uppers over lasts, grippers having jaws for gripping an upper to pull it over a last, said grippers being movable heightwise of the last to pull the upper, power-operated means for effecting relative closing movement of said jaws independently of the movement of the grippers heightwise of the last, and automatic means for bringing the machine to a stop prior to the completion of the closing of the jaws to permit the upper to be adjusted relatively to the partially closed jaws while the machine is at rest.

72. In a power-operated machine for shaping uppers over lasts, grippers for gripping an upper and pulling it over a last at the opposite sides of the forepart, said grippers comprising jaws mounted for closing movements heightwise of the last and other jaws mounted to swing inwardly toward the sides of the last in closing, and automatic means for bringing the machine to a stop after the swinging jaws have been swung to positions close to the upper but before the upper is gripped by the jaws to permit adjustment of the upper relatively to the jaws before it is gripped.

73. In a power-operated machine for shaping uppers over lasts, grippers for gripping an upper and pulling it over a last, said grippers having jaws mounted for closing movements heightwise of the last and other cooperating jaws mounted to swing inwardly toward the last in closing, automatic means for bringing the machine to a stop after the beginning of its power operation, and power-operated means for partially closing said gripper jaws until the swinging jaws are substantially at the ends of their closing movements and in positions close to the upper before the machine is thus brought to a stop and for further moving said first-named jaws heightwise of the last to grip the upper after the machine is again started.

74. In a machine for shaping uppers over lasts, grippers for pulling an upper over a last at the toe end and the opposite sides of the forepart respectively, automatic means for effecting a positively limited relative movement of the side grippers and the last lengthwise of the last to pull the upper, and additional automatic means for effecting a positively limited relative upper-pulling movement of the toe gripper and the last heightwise of the last.

75. In a machine for shaping uppers over lasts, grippers for pulling an upper over a last at the opposite sides of the forepart, other grippers arranged to grip and pull the upper at the end and the corners of the toe respectively, automatic means for effecting a positively limited relative movement of all said grippers and the last lengthwise of the last to pull the upper, and additional automatic means for effecting a positively limited relative upper-pulling movement of said end and corner grippers and the last heightwise of the last.

76. In a machine for shaping uppers over lasts, grippers for pulling an upper over a last at the toe end and the opposite sides of the forepart respectively, and automatic means for imparting to the side grippers foredrawing movements to definitely determined positions lengthwise of the last and for imparting to the toe gripper pulling movement heightwise of the last to a definitely determined position.

77. In a machine for shaping uppers over lasts, grippers for pulling an upper over a last at the toe end and the opposite sides of the forepart respectively, means for imparting to the side grippers foredrawing movements to definitely determined positions lengthwise of the last, and means for imparting to the toe gripper a positive pulling movement of predetermined extent heightwise of the last.

78. In a machine for shaping uppers over lasts, grippers for pulling an upper over a last at the toe end and the opposite sides of the forepart respectively, means for imparting to the side grippers foredrawing movements to definitely determined positions lengthwise of the last, and mechanism for imparting to the toe gripper pulling movement to a definitely determined position heightwise of the last, said mechanism comprising parts arranged to permit an adjustably variable amount of lost motion in the upper-pulling operation to vary the amount of the pulling movement of the toe gripper.

79. In a machine for shaping uppers over lasts, grippers for pulling an upper over a last at the toe end and the opposite sides of the forepart respectively, means for imparting to the side grippers foredrawing movements to definitely determined positions lengthwise of the last to locate the ends of the tip seam at predetermined distances from the toe-end face of the last, and means for imparting to the toe gripper pulling movement both lengthwise and heightwise of the last to a definitely determined position to locate the tip seam across the top of the forepart at a predetermined distance from the toe-end face of the last.

80. In a machine for shaping uppers over lasts, grippers for pulling an upper over a last at the toe end and the opposite sides of the forepart respectively, the side grippers being arranged to grip the upper substantially at the ends of the tip seam, means for imparting to the side grippers foredrawing movements lengthwise of the last, automatic means for stopping such foredrawing movements when the side grippers are in positions to locate the ends of the tip seam at the proper distance from the toe-end face of the last, and automatic means for imparting to the toe gripper movement to a definitely determined position to pull the upper and locate the tip seam across the top of the forepart at the proper distance from the toe-end face of the last.

81. In a machine for shaping uppers over lasts, grippers for pulling an upper over a last at the toe end and the opposite sides of the forepart respectively, means constructed to act positively to impart to all said grippers foredrawing movements to definitely determined positions lengthwise of the last, and additional means constructed to act positively to impart to the toe gripper pulling movement to a definitely determined position heightwise of the last.

82. In a machine for shaping uppers over lasts, grippers for pulling an upper over a last at the toe end and the opposite sides of the forepart respectively, means for operating the side grippers yieldingly and the toe gripper positively to pull the upper heightwise of the last, and additional means for imparting to said toe and side grippers foredrawing movements to definitely determined positions lengthwise of the last.

83. In a machine for shaping uppers over lasts, grippers for pulling an upper over a last at the toe end and the opposite sides of the forepart respectively, means for operating the side grippers yieldingly to pull the upper heightwise of the last, and mechanism constructed to act positively to impart to the toe gripper pulling movement heightwise of the last as the side grippers are thus operated, said mechanism comprising parts arranged to permit an adjustably variable amount of lost motion in the upper-pulling operation to vary the amount of the pulling movement of the toe gripper.

84. In a machine for shaping uppers over lasts, grippers for pulling an upper over a last at the opposite sides of the forepart in locations substantially at the ends of the tip seam, other grippers arranged to grip and pull the upper at the end and the corners of the toe respectively, means for imparting to all said grippers foredrawing movements to definitely determined positions lengthwise of the last, and means for imparting to said end and corner grippers also pulling movements heightwise of the last to definitely determined positions.

85. In a machine for shaping uppers over lasts, grippers for pulling an upper over a last at the opposite sides of the forepart in locations substantially at the ends of the tip seam, other grippers arranged to grip and pull the upper at the end and the corners of the toe respectively, means for imparting to all said grippers foredrawing movements to definitely determined positions lenghwise of the last, and means for imparting to said end and corner grippers positive pulling movements of predetermined extent heightwise of the last.

86. In a machine for shaping uppers over lasts, grippers for pulling an upper over a last at the toe end and the opposite sides of the forepart respectively, the side grippers being arranged to grip the upper in predetermined relation to the ends of the tip seam, a member arranged to position the last lengthwise with its toe end face in a location positively predetermined for each last, and means for imparting to the side grippers foredrawing movements to definitely determined positions relatively to said member to locate the ends of the tip seam at predetermined distances from the toe-end face of the last.

87. In a machine for shaping uppers over lasts, grippers for pulling an upper over a last at the toe end and the opposite sides of the forepart respectively, the side grippers being arranged to grip the upper in predetermined relation to the ends of the tip seam, a member arranged to act as a stop at the toe-end face of the last to determine the lengthwise position of the last, and automatic means for imparting to the side grippers foredrawing movements lengthwise of the last to definitely determined positions relatively to said member to locate the ends of the tip seam at predetermined distances from the toe-end face of the last.

88. In a machine for shaping uppers over lasts, grippers for pulling an upper over a last at the toe end and the opposite sides of the forepart respectively, automatic means for operating said grippers to pull the upper and to position the tip seam at the proper distance from the toe-end face of the last, and a device for clamping the upper at the top of the forepart to prevent shifting of the tip seam after the upper has thus been pulled, said operating means being movable automatically after the clamping of the upper to increase the force of the pull of the toe gripper on the upper.

89. In a power-operated machine for shaping uppers over lasts, grippers for pulling an upper over a last at the toe end and the opposite sides of the forepart respectively, means for operating said grippers to pull the upper and to position the tip seam at the proper distance from the toe-end face of the last, automatic means for bringing the machine to a stop after the upper has thus been pulled and while it is held under tension by the grippers, and a device for clamping the upper at the top of the forepart to prevent shifting of the tip seam, said gripper-operating means being constructed to increase automatically the force of the pull of the toe gripper on the upper after the upper has thus been clamped and after the machine has again been started in operation.

90. In a machine for shaping uppers over lasts, grippers for pulling an upper over a last at the toe end and the opposite sides of the forepart respectively, means for imparting to the side grippers foredrawing movements to definitely determined positions lengthwise of the last to locate the ends of the tip seam at predetermined distances from the toe-end face of the last, toe-gripper-operating means constructed to move the toe gripper unyieldingly to a definitely determined position to pull the upper and to locate the tip seam across the top of the forepart at the proper distance from the toe-end face of the last, and a device for clamping the upper at the top of the forepart after the upper has thus been pulled, said toe-gripper-operating means being constructed further to operate the toe gripper yieldingly to increase the force of its pull on the upper after the clamping of the upper.

91. In a power-operated machine for shaping uppers over lasts, grippers for pulling an upper over a last at the toe end and the opposite sides of the forepart respectively, means for operating said grippers to pull the upper, automatic means for bringing the machine to a stop after the upper has thus been pulled and while it is held under tension by the grippers, and a device for clamping the upper at the top of the forepart, said gripper-operating means being constructed to operate the toe gripper unyieldingly before the machine is thus brought to a stop and further to operate it yieldingly to increase the force of its pull on the upper after the clamping of the upper and after the machine has again been started in operation.

92. In a machine for shaping uppers over lasts, grippers for pulling an upper over a last at the opposite sides of the forepart, other grippers arranged to grip and pull the upper at the end and the corners of the toe respectively, automatic means for operating all said grippers to pull the upper, and a device for clamping the upper at the top of the forepart after the upper has thus been pulled, said operating means being movable automatically after the clamping of the upper to increase the force of the pull on the upper of said end and corner toe grippers only.

93. In a machine for shaping uppers over lasts, grippers for pulling an upper over a last at the toe end and the opposite sides of the forepart respectively, automatic means for operating said grippers to pull the upper, a device for clamping the upper at the top of the forepart after the upper has thus been pulled, and wipers arranged to wipe the upper heightwise of the toe and to wipe its marginal portion inwardly over a sole on the last after the clamping of the upper, said operating means being movable automatically to increase the force of the pull of the toe gripper on the upper in time relation to the operation of the wipers.

94. In a power-operated machine for shaping uppers over lasts, grippers for pulling an upper over a last at the opposite sides of the forepart, other grippers arranged to grip and pull the upper at the end and the corners of the toe respectively, means for operating all said grippers to pull the upper, automatic means for bringing the machine to a stop after the upper has thus been pulled and while it is held under tension by the grippers, and wipers for wiping the upper heightwise of the toe and for wiping its marginal portion inwardly over a sole on the last after the machine has again been started in operation, said gripper-operating means being constructed further to operate said end and corner toe grippers only to increase the force of their pull on the upper in time relation to the operation of the wipers.

95. In a power-operated machine for shaping uppers over lasts, grippers for pulling an upper over a last at the toe end and the opposite sides of the forepart repectively, means for operating the side grippers yieldingly to pull the upper, automatic means for bringing the machine to a stop after the upper has thus been pulled, and means for operating the toe gripper to pull the upper before the machine is thus brought to a stop and for further operating it to increase the force of its pull on the upper after the machine has again been started in operation, said toe-gripper-operating means comprising a spring of sufficient force to prevent it from yielding in the pulling of the upper before the machine is thus brought to a stop but yieldable in the further pull on the upper after the machine is again started.

96. In a machine for shaping uppers over lasts, grippers movable to pull an upper heightwise of a last at the toe end and the opposite sides of the last respectively, and automatic means comprising lever arms mounted independently of one another and associated respectively with the different grippers for imparting to said toe and side grippers foredrawing movements lengthwise of the last independently of their movements heightwise of the last.

97. In a machine for shaping uppers over lasts, grippers for pulling an upper over a last at the toe end and the opposite sides of the last respectively, different levers connected respectively to said toe and side grippers for moving them heightwise of the last to pull the upper, and automatic means comprising relatively adjustable swinging arms associated respectively with the different grippers for moving the toe and side grippers relatively to said levers to pull the upper lengthwise of the last independently of the movements of the grippers heightwise of the last.

98. In a machine for shaping uppers over lasts, grippers for pulling an upper over a last at the toe end and the opposite sides of the last respectively, different levers connected respectively to said toe and side grippers for moving them heightwise of the last to pull the upper, and a member connected to said toe and side grippers for imparting to them foredrawing movements lengthwise of the last relatively to said levers, the connections between said member and the toe and side grippers including different rock shafts associated respectively with the different grippers.

99. In a machine for shaping uppers over lasts, grippers movable to pull an upper heightwise of a last at the toe end and the opposite sides of the last respectively, and mechanism comprising a member common to said toe and side grippers and automatically operative independently of the movements of said grippers heightwise of the last to impart to them foredrawing movements lengthwise of the last, said mechanism including connections for adjusting the opposite side grippers in the same direction lengthwise of the last relatively to the toe gripper.

100. In a machine for shaping uppers over lasts, grippers movable to pull an upper heightwise of a last at the toe end and the opposite sides of the last respectively, a lever arm, and mechanism comprising members movable respectively about different axes and arranged to be operated by said lever arm to impart respectively to said toe and side grippers foredrawing movements lengthwise of the last independently of their movements heightwise of the last.

101. In a machine for shaping uppers over lasts, grippers arranged to pull an upper heightwise of a last at the toe end and the opposite sides of the last respectively, lever arms mounted for movements relatively to one another and connected respectively to said toe and side grippers for swinging said grippers lengthwise of the last, and a member common to said lever arms for operating them to impart foredrawing movements to the grippers.

102. In a machine for shaping uppers over lasts, grippers arranged to pull an upper heightwise of a last at the toe end and the opposite sides of the last respectively, and means for imparting to said toe and side grippers foredrawing movements lengthwise of the last comprising mechanism constructed to determine positively the relative positions lengthwise of the last of the toe and side grippers in their foredrawing movements.

103. In a machine for shaping uppers over lasts, grippers arranged to pull an upper heightwise of a last at the toe end and the opposite sides of the last respectively, and means for imparting to said toe and side grippers foredrawing movements lengthwise of the last including connections between said grippers adjustable to vary relatively the positions of the toe and side grippers lengthwise of the last.

104. In a machine for shaping uppers over lasts, grippers arranged to pull an upper heightwise of a last respectively at the toe end and at the opposite sides thereof in locations substantially at the ends of the tip line, and mechanism comprising a member positively connected to said toe and side grippers for imparting to them foredrawing movements lengthwise of the last in the upper-pulling operation, the side grippers being preliminarily adjustable in the same direction lengthwise of the last relatively to the toe gripper.

105. In a machine for shaping uppers over lasts, grippers movable to pull an upper heightwise of a last at the end and the corners of the toe respectively, other grippers movable to pull the upper heightwise of the last at the sides of the forepart, and means for imparting to all said grippers foredrawing movements lengthwise of the last independently of their movements heightwise of the last.

106. In a machine for shaping uppers over lasts, grippers arranged to pull an upper heightwise of a last at the end and the corners of the toe respectively, other grippers arranged to pull the upper heightwise of the last in different locations respectively at each of the opposite sides of the last, and means for imparting to all said grippers foredrawing movements lengthwise of the last.

107. In a machine for shaping uppers over lasts, grippers arranged to pull an upper heightwise of a last at the end and the corners of the toe respectively, other grippers arranged to pull the upper heightwise of the last in different locations respectively at each of the opposite sides of the last, a cam, and mechanism operated by said cam for imparting to all said grippers foredrawing movements lengthwise of the last.

108. In a machine for shaping uppers over lasts, toe grippers arranged to pull an upper heightwise of a last at the end and the corners of the toe respectively, other grippers arranged to pull the upper heightwise of the last at the sides of the forepart rearwardly of said toe grippers, and means for imparting to all said grippers foredrawing movements lengthwise of the last comprising mechanism for determining positively the relative positions of said toe and side grippers lengthwise of the last in their foredrawing movements.

109. In a machine for shaping uppers over lasts, toe grippers arranged to pull an upper heightwise of a last at the end and the corners of the toe respectively, other grippers arranged to pull the upper heightwise of the last at the sides of the forepart rearwardly of said toe grippers, and means for imparting to said toe and side grippers foredrawing movements lengthwise of the last including connections between said grippers adjustable to vary the positions of the side grippers lengthwise of the last relatively to the toe grippers.

110. In a machine for shaping uppers over lasts, grippers arranged to pull an upper heightwise of a last in locations substantially at the corners of the toe, other grippers arranged to pull the upper heightwise of the last in the vicinity of the tip line, means for imparting to said other grippers foredrawing movements lengthwise of the last of the same extent at the opposite sides of the last, and means for imparting also to said corner toe grippers foredrawing movements while determining positively their positions lengthwise of the last relatively to said other grippers.

111. In a machine for shaping uppers over lasts, grippers arranged to pull an upper heightwise of a last in locations substantially at the corners of the toe, other grippers arranged to pull the upper heightwise of the last in the vicinity of the tip line, and mechanism comprising positive connections between said corner toe grippers and said other grippers for imparting to all said grippers foredrawing movements lengthwise of the last.

112. In a machine for shaping uppers over lasts, grippers arranged to pull an upper heightwise of a last in locations substantially at the corners of the toe, other grippers arranged to pull the upper heightwise of the last in the vicinity of the tip line, and mechanism for imparting to all said grippers foredrawing movements lengthwise of the last comprising connections adjustable to vary the positions of said other grippers lengthwise of the last relatively to the corner toe grippers.

113. In a machine for shaping uppers over lasts, grippers arranged to pull an upper heightwise of a last in locations substantially at the corners of the toe, other grippers arranged to pull the upper heightwise of the last at the sides of the forepart rearwardly of said corner toe grippers, and mechanism for imparting to all said grippers foredrawing movements lengthwise of the last including a member movable to adjust both the opposite side grippers lengthwise of the last relatively to the corner toe grippers.

114. In a machine for shaping uppers over lasts, grippers arranged to pull an upper heightwise of a last in locations substantially at the corners of the toe, other grippers arranged to pull the upper heightwise of the last in different locations respectively lengthwise of the last at each of the opposite sides of the last, and means for imparting to all said grippers foredrawing movements lengthwise of the last including connections for adjusting both side grippers at each side of the last lengthwise of the last relatively to the corner toe grippers.

115. In a machine for shaping uppers over lasts, grippers arranged to pull an upper heightwise of a last in locations substantially at the corners of the toe, other grippers arranged to pull the upper heightwise of the last at the sides of the forepart rearwardly of said corner toe grippers, lever arms connected respectively to said different grippers for swinging the grippers lengthwise of the last, and mechanism arranged to operate through said lever arms to impart foredrawing movements to said corner toe grippers and side grippers.

116. In a machine for shaping uppers over lasts, grippers arranged to pull an upper heightwise of a last in locations substantially at the corners of the toe, other grippers arranged to pull the upper heightwise of the last at the sides of the forepart rearwardly of said corner toe grippers, lever arms connected respectively to said different grippers for swinging the grippers lengthwise of the last, and means for imparting foredrawing movements to said corner toe grippers and side grippers through said lever arms including connections movable to adjust the side grippers lengthwise of the last relatively to the corner toe grippers.

117. In a machine for shaping uppers over lasts, grippers arranged to pull an upper heightwise of a last in locations substantially at the corners of the toe, lever arms connected respectively to said different grippers for swinging them lengthwise of the last, connections between said lever arms for swinging one arm by movement of the other, and mechanism arranged to act on said other arm to impart to both said corner toe grippers foredrawing movements.

118. In a machine for shaping uppers over lasts, grippers arranged to pull an upper heightwise of a last at the end and the corners of the toe respectively, lever arms connected respectively to said corner toe grippers for swinging them lengthwise of the last, means for thus swinging said lever arms to impart foredrawing movements to the corner toe grippers, and mechanism connecting said arms to the end gripper for imparting foredrawing movement also to that gripper.

119. In a machine for shaping uppers over lasts, grippers arranged to pull an upper heightwise of a last at the end and the corners of the toe respectively, lever arms connected respectively to said corner toe grippers for swinging them lengthwise of the last, connections between said lever arms including a rock shaft connected also to said end gripper for swinging it lengthwise of the last, and means for operating said arms and rock shaft to impart foredrawing movements to the end and corner toe grippers.

120. In a machine for shaping uppers over lasts, front and rear side grippers for pulling an upper heightwise of a last at each of the opposite sides of the last, and means for imparting to said grippers foredrawing movements lengthwise of the last including connections between the front and rear grippers yieldable to permit the rear grippers to be moved by the operator lengthwise of the last relatively to the front grippers while holding the upper under tension.

121. In a machine for shaping uppers over lasts, grippers arranged to pull an upper heightwise of a last in locations substantially at the ends of the tip line, other grippers for pulling the upper heightwise of the last in locations substantially at the ball of the shoe, mechanism for imparting to all said grippers foredrawing movements lengthwise of the last including yielding connections between the different grippers at each side of the last, and means connected to the grippers at the ball of the shoe for moving them lengthwise of the last relatively to the tip line grippers while holding the upper under tension.

122. In a machine for shaping uppers over lasts, front and rear side grippers for pulling an upper over a last at each of the opposite sides of the last, lever arms connected respectively to said different grippers for swinging the grippers lengthwise of the last in the upper-pulling operation, and yielding connections between the lever arms for the front side grippers and those for the rear side grippers.

123. In a machine for shaping uppers over lasts, grippers for pulling an upper over a last at the toe end and the opposite sides of the last respectively, means for imparting to said toe and side grippers foredrawing movements lengthwise of the last, and other means constructed and arranged to limit the foredrawing movements of said grippers.

124. In a machine for shaping uppers over lasts, grippers for pulling an upper over a last at the toe end and the opposite sides of the last respectively, means for imparting to said toe and side grippers foredrawing movements lengthwise of the last, and other means constructed and arranged to act as a stop to limit variably the foredrawing movements of said grippers.

125. In a machine for shaping uppers over lasts, grippers for pulling an upper over a last at the toe end and the opposite sides of the last respectively, operating mechanism for imparting to said toe and side grippers foredrawing movements lengthwise of the last, and a device arranged to act as a stop to limit the foredrawing movements of said grippers, said operating mechanism comprising parts relatively movable against yielding resistance when the foredrawing movements of the grippers are stopped by said device.

126. In a machine for shaping uppers over lasts, upper-gripping means for pulling an upper over a last, and mechanism for imparting automatically to said upper-gripping means foredrawing movements lengthwise of the last at different times in the operation of the machine.

127. In a power-operated machine for shaping uppers over lasts, upper-gripping means for pulling an upper over a last, automatic means for bringing the machine to a stop with the upper held under tension by said upper-gripping means, and automatic means for imparting to said upper-gripping means foredrawing movement lengthwise of the last before the machine is thus brought to a stop and also after the machine has again been started in operation.

128. In a machine for shaping uppers over lasts, grippers for pulling an upper over a last at the opposite sides of the forepart, wipers arranged to extend around the toe and movable lengthwise and laterally of the shoe to wipe the marginal portion of the toe end of the upper inwardly over a sole on the last, and automatic means for imparting to said grippers foredrawing movements lengthwise of the last substantially at the time of the operation of said wipers on the marginal portion of the upper.

129. In a machine for shaping uppers over lasts, grippers for pulling an upper over a last at the opposite sides of the forepart, said grippers being arranged to position the ends of the tip seam at predetermined distances from the toe-end face of the last, wipers arranged to extend around the toe and movable lengthwise and laterally of the shoe to wipe the marginal portion of the toe end of the upper inwardly over a sole on the last, and means for imparting to said grippers foredrawing movements in automatically determined time relation to the operation of said wipers to counteract any tendency of the wipers to displace the ends of the tip seam lengthwise of the last in their operation on the upper.

130. In a machine for shaping uppers over lasts, grippers arranged to pull an upper over a last at the toe end and at the opposite sides of the forepart, wipers for wiping the marginal portion of the upper inwardly into lasted position about the toe, and mechanism automatically operative to impart to said toe and side grippers foredrawing movements lengthwise of the last substantially at the time when said wipers begin to wipe the marginal portion of the upper inwardly.

131. In a power-operated machine for shaping uppers over lasts, grippers for pulling an upper over a last, automatic means for bringing the machine to a stop with the upper held under tension by said grippers, wipers for wiping the marginal portion of the upper about the toe into lasted position after the machine has again been started in operation, and automatic means for imparting to said grippers foredrawing movements lengthwise of the last in that stage of the cycle of operations of the machine in which the wipers are operated.

132. In a power-operated machine for shaping uppers over lasts, grippers for pulling an upper over a last, automatic means for bringing the machine to a stop with the upper held under tension by said grippers, wipers for wiping the marginal portion of the upper about the toe into lasted position after the machine has again been started in operation, and automatic means for imparting to said grippers foredrawing movements lengthwise of the last before the machine is thus brought to a stop and also after the machine has again been started.

133. In a machine for shaping uppers over lasts, grippers for pulling an upper over a last, wipers for wiping the marginal portion of the upper about the toe into lasted position, and automatic means for imparting to said grippers foredrawing movements lengthwise of the last prior to the operation of said wipers on the upper and again substantially at the time of their operation.

134. In a machine for shaping uppers over lasts, grippers for pulling an upper over a last at the opposite sides of the forepart, said grippers being arranged to grip the upper in locations substantially at the ends of the tip seam, foredrawing mechanism for imparting to said grippers foredrawing movements lengthwise of the last to position the ends of the tip seam at predetermined distances from the toe-end face of the last, and wipers arranged to extend around the toe and movable lengthwise and laterally of the shoe to wipe the marginal portion of the toe end of the upper inwardly over a sole on the last after the ends of the tip seam have thus been positioned by the grippers, said foredrawing mechanism being movable automatically to impart to said grippers further foredrawing movements substantially at the time of the operation of said wipers on the upper to counteract any tendency of the wipers to displace the ends of the tip seam lengthwise of the last.

135. In a machine for shaping uppers over lasts, upper-gripping means for pulling an upper over a last, operating mechanism for imparting to said upper-gripping means foredrawing movement lengthwise of the last, a device arranged to act as a stop to limit the foredrawing movement of said upper-gripping means, said operating mechanism comprising a spring arranged to be subjected to stress by relative movement of parts of the mechanism when the foredrawing movement is thus stopped, and automatic means for rendering said spring effective to impart further foredrawing movement thereafter to said upper-gripping means.

136. In a machine for shaping uppers over lasts, upper-gripping means for pulling an upper over a last, operating mechanism for imparting to said upper-gripping means foredrawing movement lengthwise of the last, members relatively movable into contact with each other to stop the foredrawing movement of said upper-gripping means, said operating mechanism including a spring arranged to be subjected to stress by relative movement of parts of the mechanism after contact of said members with each other, and automatic means for effecting relative movement of said members thereafter to permit the spring to impart further foredrawing movement to the upper-gripping means.

137. In a machine for shaping uppers over lasts, upper-gripping means for pulling an upper over a last, operating mechanism for imparting to said upper-gripping means foredrawing movement lengthwise of the last, members relatively movable into contact with each other to stop the foredrawing movement of said upper-gripping means, said operating mechanism including a spring arranged to be subjected to stress by relative movement of parts of the mechanism when the foredrawing movement is thus stopped, and a cam arranged to control one of said members and to act thereon to cause further foredrawing movement to be imparted thereafter by said spring to said upper-gripping means.

138. In a machine for shaping uppers over lasts, upper-gripping means for pulling an upper over a last, operating mechanism for imparting to said upper-gripping means foredrawing movement lengthwise of the last, a stop arranged to limit variably the foredrawing movement of the upper-gripping means, a member carried by said operating mechanism for engaging said stop to limit the foredrawing movement, said operating mechanism including a spring arranged to be subjected to stress by relative movement of parts of the mechanism after the foredrawing movement is stopped, and automatic means arranged to control said member and to act thereon to cause said spring to impart further foredrawing movement thereafter to the upper-gripping means.

139. In a machine for shaping uppers over lasts, grippers for pulling an upper over a last, automatic means for bringing the machine to a stop with the upper held under tension by said grippers, wipers for wiping the marginal portion of the upper about the toe into lasted position after the machine has again been started in operation, operating mechanism for imparting to said grippers foredrawing movements lengthwise of the last before the machine is thus brought to a stop, members relatively movable into contact with each other to limit such foredrawing movement of the grippers, said operating mechanism including a spring arranged to be subjected to stress by relative movement of parts of the mechanism after said members contact with each other, and automatic means for effecting displacement of one of said members to cause said spring to impart further foredrawing movement to the grippers substantially at the time of the operation of the wipers on the upper.

140. In a machine for shaping uppers over lasts, a gripper for pulling an upper over a last, and means arranged to be operated by movement of said gripper heightwise of the last to move it inwardly to a position substantially opposite the bottom of the last.

141. In a machine for shaping uppers over lasts, a gripper for pulling an upper over a last, a member movable to force said gripper inwardly to a position substantially opposite the bottom of the last, and means for imparting to said member its operative movement by movement of the gripper heightwise of the last.

142. In a machine for shaping uppers over lasts, a gripper for pulling an upper over a last, said gripper being mounted for inward and outward swinging movements in directions transverse to the edge of the last bottom, and means arranged to be operated by movement of the gripper heightwise of the last to swing it inwardly after its release of the upper.

143. In a machine for shaping uppers over lasts, a gripper for pulling an upper over a last, said gripper being mounted for inward and outward swinging movements in directions transverse to the edge of the last bottom, means for moving the gripper heightwise of the last, a member movable to swing said gripper inwardly, and means on the gripper for engaging and operating said member at a predetermined time in the movement of the gripper heightwise of the last.

144. In a machine for shaping uppers over lasts, a gripper for pulling an upper over a last, said gripper being mounted for inward and outward swinging movements in directions transverse to the edge of the last bottom, means for moving the gripper heightwise of the last, a bell-crank lever arranged with one arm in position to swing the gripper inwardly, and means carried by the gripper for engaging the other arm of said bell-crank lever to operate it at a predetermined time in the movement of the gripper heightwise of the last.

145. In a machine for shaping uppers over lasts, a gripper for pulling an upper over a last, said gripper being mounted for inward and outward movements in directions transverse to the edge of the last bottom, a spring tending to move said gripper outwardly, and means for moving said gripper inwardly against the resistance of said spring after its release of the upper.

146. In a machine for shaping uppers over lasts, a gripper for pulling an upper over a last, said gripper being mounted for inward and outward movements in directions transverse to the edge of the last bottom, a spring tending to move said gripper outwardly, and means arranged to be operated by movement of the gripper heightwise of the last to move it inwardly against the resistance of said spring.

147. In a machine for shaping uppers over lasts, a gripper for pulling an upper over a last, means for moving said gripper heightwise of the last, a lever arranged to extend heightwise of the last for controlling said gripper and mounted for inward and outward swinging movements with the gripper in directions transverse to the edge of the last bottom, a spring tending to swing said lever outwardly, a bell-crank lever arranged with one arm in position to act on said lever to swing it inwardly against the resistance of said spring, and means carried by the gripper for engaging the other arm of said bell-crank lever to operate it at a predetermined time in the movement of the gripper heightwise of the last.

148. In a machine for shaping uppers over lasts, grippers for pulling an upper respectively at the opposite sides of a last, means for moving said grippers heightwise of the last, and devices arranged to be operated by such movements of the grippers to move them inwardly toward each other widthwise of the last.

149. In a machine for shaping uppers over lasts, grippers for pulling an upper respectively at the opposite sides of a last, means for moving said grippers heightwise of the last, the grippers being mounted for swinging movements toward and from each other widthwise of the last, springs tending to swing the grippers outwardly, devices for swinging the grippers inwardly against the resistance of said springs, and means carried by the grippers for operating said devices after the grippers release the upper.

150. In a machine for shaping uppers over lasts, the combination with power-operated means for shaping the forepart of an upper over a last, of a tip gage mounted for movement from an idle position into gaging position opposite the top of the forepart of the shoe, and means for moving said gage into gaging position in automatically determined time relation to the operation of said upper-shaping means, 151. In a machine for shaping uppers over lasts, the combination with grippers movable to pull the forepart of an upper over a last, of a tip gage mounted for movement from an idle position into gaging position opposite the top of the forepart of the shoe, and automatic means for moving said gage into gaging position in the course of the upper-pulling movements of said grippers.

152. In a machine for shaping uppers over lasts, the combination with means for shaping the forepart of an upper over a last, of a tip gage mounted for movement into and out of gaging position, a spring for moving said gage into gaging position, and means arranged to hold the gage initially retracted against the resistance of said spring and movable to release it to the action of the spring.

153. In a machine for shaping uppers over lasts, the combination with means for pulling the forepart of an upper over a last, of a tip gage mounted for movement from an idle position into gaging position opposite the top of the forepart of the shoe, a spring for moving said gage into gaging position, a latch arranged to hold the gage initially retracted against the resistance of said spring, and automatic means to cause said latch to release the gage in the course of the upper-pulling operation.

154. In a power-operated machine for shaping uppers over lasts, the combination with means for pulling the forepart of an upper over a last, of automatic means for bringing the machine to a stop with the upper held under tension, a tip gage movable into and out of gaging position opposite the top of the forepart of the shoe, and automatic means for moving said gage into gaging position before the machine is thus brought to a stop.

155. In a power-operated machine for shaping uppers over lasts, the combination with means for pulling the forepart of an upper over a last, of automatic means for bringing the machine to a stop with the upper held under tension, a tip gage mounted for movement into and out of gaging position, automatic means for moving said gage into gaging position before the machine is thus brought to a stop, and means for withdrawing said gage from gaging position before the machine is again started.

156. In a machine for shaping uppers over lasts, the combination with means for shaping the forepart of an upper over a last, of a tip gage arranged to occupy an operative position adjacent to the top of the forepart of the shoe, a shoe holder movable toward operative position at the top of the forepart, and means for withdrawing said gage from operative position in response to such movement of the shoe holder.

157. In a machine for shaping uppers over lasts, the combination with means for pulling the forepart of an upper over a last, of a tip gage mounted for movement from an idle position into gaging position at the top of the forepart of the shoe, a spring for moving said gage into gaging position, means for holding the gage initially retracted against the resistance of said spring and for releasing it to the action of the spring, a shoe holder movable toward operative position at the top of the forepart of the shoe, and means for withdrawing said gage from gaging position in response to such movement of the shoe holder.

158. In a power-operated machine for shaping uppers over lasts, the combination with means for pulling the forepart of an upper over a last, of automatic means for bringing the machine to a stop with the upper held under tension, a tip gage arranged to indicate the proper location of the tip line after the machine has thus been brought to a stop, a shoe holder for engaging the shoe at the top of the forepart, an arm carrying said shoe holder and movable by the operator to swing the holder toward the shoe while the machine is thus at rest, and mechanism arranged to be operated by the swinging of said arm to withdraw said gage from operative position.

159. In a machine for shaping uppers over lasts, the combination with means for shaping an upper over the forepart of a last, of a shoe holder arranged to engage the shoe at the top of the forepart to support it against pressure applied on its bottom face, said holder being movable by the operator heightwise of the shoe substantially into operative position, a spring-controlled latch for retaining the holder in the position to which it is moved by the operator, means for holding said latch retracted against the resistance of its spring as the holder is thus moved toward the shoe, and means for releasing the latch to the action of its spring in response to the movement of the holder.

160. In a machine for shaping uppers over lasts, the combination with wipers movable to wipe the marginal portion of the toe end of an upper inwardly over a sole on a last, of a device located opposite the bottom of the forepart of the shoe for positioning the shoe heightwise relatively to said wipers, said device being fixed against movement in directions heightwise of the shoe throughout the operation of the machine on the shoe, a shoe holder for engaging the shoe at the top of the forepart to support the shoe against pressure of the wipers on the shoe bottom, and automatic means for relieving the pressure of the shoe holder on the shoe to permit relief of the pressure of the wipers on the shoe bottom before the wipers are retracted from wiping position.

161. In a machine for shaping uppers over lasts, the combination with wipers movable to wipe the marginal portion of the toe end of an upper inwardly over a sole on a last, of a device located opposite the bottom of the forepart of the shoe for positioning the shoe heightwise relatively to said wipers, a shoe holder for engaging the shoe at the top of the forepart to support the shoe against pressure of the wipers on the shoe bottom, and automatic means for retracting the shoe holder away from said positioning device to relieve the pressure of the wipers on the shoe bottom before they are retracted from wiping position.

162. In a machine for shaping uppers over lasts, the combination with wipers for wiping the marginal portion of the toe end of an upper inwardly over a sole on a last, of a device arranged to engage the bottom of the forepart of the shoe to position the shoe heightwise relatively to said wipers, spring means for applying to the wipers force directed heightwise of the shoes to press them on the shoe bottom, a shoe holder for engaging the shoe at the top of the forepart to support the shoe against such pressure of the wipers, and automatic means for relieving the pressure of the shoe holder on the shoe sufficiently to permit the shoe to be forced away from said positioning device by the spring means acting on the wipers before the wipers are retracted from wiping position.

163. In a machine for shaping uppers over lasts, wipers formed to extend around an end of a shoe for wiping the marginal portion of the upper inwardly into lasted position, a support for said wipers, parallel link mechanism on which said support is mounted for movement to carry the wipers bodily lengthwise of the shoe in the lasting operation, the wipers being mounted for closing movements also laterally of the shoe, links connected respectively to the different wipers for thus closing them, and means for operating said links independently of the movement of said wiper support.

164. In a machine for shaping uppers over lasts, wipers formed to extend around an end of a shoe for wiping the marginal portion of the upper inwardly into lasted position, a support for said wipers, parallel link mechanism on which said support is mounted for movement to carry the wipers bodily lengthwise of the shoe in the lasting operation, the wipers being mounted for closing movements also laterally of the shoe, links connected respectively to the different wipers for thus closing them, a cross-bar for operating said links, springs for transmitting movement yieldingly from the cross-bar to the links, and means for operating the cross-bar independently of the movement of said wiper support.

165. In a machine for shaping uppers over lasts, wipers formed to extend around an end of a shoe for wiping the marginal portion of the upper inwardly into lasted position, said wipers being mounted for closing movements laterally of the shoe, mechanism for advancing said wipers bodily lengthwise of the shoe in the lasting operation, and means arranged to act as a stop into contact with which said mechanism is movable for limiting positively the advancing movement of the wipers.

166. In a machine for shaping uppers over lasts, wipers formed to extend around an end of a shoe for wiping the marginal portion of the upper inwardly against a lip or shoulder on a sole, said wipers being mounted for closing movements laterally of the shoe, yieldable means for thus closing said wipers, mechanism for also advancing the wipers bodily lengthwise of the shoe independently of their closing movements, and means arranged to act as a stop into contact with which a portion of said mechanism is movable for limiting positively the advancing movement of the wipers toward the lip or shoulder of the sole.

167. In a machine for shaping shoe uppers, wipers formed to extend around an end of an upper for wiping the marginal portion of the upper into lasted relation to a sole, said wipers having a binder-positioning groove therein, and means for feeding binder material along said groove around the end of the upper while the wipers are in engagement with the upper.

168. In a machine for shaping shoe uppers, wipers movable inwardly to wipe the marginal portion of an upper against a lip or shoulder on a sole around an end of a shoe, said wipers having a binder-positioning groove at their wiping edges, and means for feeding binder material along said groove around the end of the shoe in the course of the inward movements of the wipers.

169. In a machine for shaping uppers over lasts, wipers for wiping the marginal portion of an upper into lasted position around the toe end of a last, said wipers having a binder-positioning groove therein, means for effecting relative movement of said wipers and the last heightwise of the last to cause the wipers to wipe the upper to the edge of the shoe bottom, and means for feeding binder material along said groove around the end of the upper after the completion of said relative wiping movement.

170. In a machine for shaping uppers over lasts, toe-lasting mechanism movable to work the marginal portion of an upper into lasted position around the toe end of a last, said toe-lasting mechanism having means for guiding binder wire around the toe for holding the upper in lasted position, and automatic means located at one side of the shoe for feeding binder wire around the toe to the other side of the shoe in the course of the operative movement of said toe-lasting mechanism.

171. In a machine for shaping shoe uppers, wipers formed to extend around an end of a shoe and relatively movable laterally of the shoe to wipe the marginal portion of the upper into lasted relation to a sole, and means for feeding binder material to said wipers to be fastened to the shoe for holding the upper in lasted position, said feeding means being movable laterally of the shoe with one of the wipers.

172. In a machine for shaping shoe uppers, wipers formed to extend around an end of a shoe and relatively movable laterally of the shoe to wipe the marginal portion of the upper into lasted relation to a sole, said wipers having a binder-positioning groove at their wiping edges, and means for feeding binder material along said groove to be fastened to the shoe for holding the upper in lasted position, said feeding means being movable laterally of the shoe with one of the wipers.

173. In a machine for shaping shoe uppers, wipers formed to extend around an end of a shoe for wiping the marginal portion of the upper inwardly against a lip or shoulder on a sole, said wipers being movable laterally of the shoe in the wiping operation, wiper carriers supporting said wipers and movable with them laterally of the shoe, and means supported on one of said wiper carriers for feeding binder material to said wipers to be fastened to the shoe for holding the upper.

174. In a machine for shaping shoe uppers, wipers formed to extend around an end of a shoe and relatively movable laterally of the shoe to wipe the marginal portion of the upper inwardly against a lip or shoulder on a sole, mechanism for feeding binder material to said wipers to be fastened to the shoe for holding the upper, said mechanism being movable laterally of the shoe with one of the wipers, flexible shafting for operating said feeding mechanism, and an automatically controlled clutch for operating said shafting.

175. In a machine for shaping uppers over lasts, wipers formed to extend around the toe end of a last and mounted for swinging movements widthwise of the last to wipe the marginal portion of the toe end of an upper into lasted position, wiper carriers supporting said wipers and movable with them widthwise of the last, the wipers having a binder-positioning groove at their wiping edges, mechanisms supported by one of said wiper carriers for feeding binder wire along said groove, and automatic means including flexible shafting connected to said feeding mechanism for operating it.

176. In a machine for shaping uppers over lasts, wipers formed to extend around the toe end of a last and movable widthwise of the last to wipe the marginal portion of an upper into lasted position, said wipers having a binder-positioning groove therein, wiper carriers supporting said wipers and movable with them widthwise of the last, mechanism supported on one of said wiper carriers for feeding binder material along said groove around the end of the upper for holding it in lasted position, and automatic means for operating said feeding mechanism while the wipers are in engagement with the shoe.

177. In a machine for shaping shoe uppers, wipers formed to extend around an end of a shoe and mounted for swinging movements each about an axis extending heightwise of the shoe to wipe the marginal portion of the upper inwardly against a lip or shoulder on a sole, mechanism for feeding binder material to the wipers for holding the upper, said mechanism being mounted to swing with one of the wipers, and means supported independently of said wipers for operating said feeding mechanism.

178. In a machine for shaping shoe uppers, wipers mounted for inward swinging movements about an end of an upper for wiping the marginal portion of the upper into lasted relation to a sole, said wipers having a binder-positioning groove therein, mechanism for feeding binder wire along said groove for holding the upper, said mechanism being mounted to swing with one of the wipers, means including a clutch supported independently of the wipers for operating said wire-feeding mechanism, and means for actuating said clutch to feed the wire in automatically determined time relation to the movements of the wipers.

179. In a machine for shaping shoe uppers, wipers formed to extend around an end of a shoe and relatively movable laterally of the shoe to wipe the marginal portion of the upper inwardly against a lip or shoulder on a sole, said wipers having a binder-positioning groove therein, mechanism for feeding binder material along said groove for holding the upper, said mechanism being movable laterally of the shoe with one of the wipers, means including a clutch for operating said feeding mechanism, and a cam for actuating said clutch, said cam being adjustable to vary the time of actuation of the clutch.

180. In a machine for shaping shoe uppers, wipers formed to extend around an end of a shoe and relatively movable laterally of the shoe to wipe the marginal portion of the upper inwardly against a lip or shoulder on a sole, said wipers having a binder-positioning groove therein, mechanism for feeding binder material along said groove for holding the upper, said mechanism being movable laterally of the shoe with one of the wipers, means including a clutch for operating said feeding mechanism, and automatic means for controlling said clutch, said automatic controlling means being adjustable to vary the amount of binder material fed to the wipers.

181. In a machine for shaping uppers over lasts, toe-lasting mechanism movable to work the marginal portion of an upper into lasted position around the toe end of a last, said toe-lasting mechanism having means for guiding binder wire around the toe for holding the upper in lasted position, means located at one side of the shoe for feeding binder wire around the toe to the other side of the shoe in the course of the operative movement of said toe-lasting mechanism, and automatic means for severing from the wire a portion to serve as a binder and for fastening the binder to the shoe at the opposite sides of the shoe bottom.

182. In a machine for shaping shoe uppers, wipers formed to extend around an end of an upper for wiping the marginal portion of the upper into lasted relation to a sole, said wipers having a binder-positioning groove therein, means for feeding binder material along said groove around the end of the upper while the wipers are in engagement with the upper, and automatic means for severing from the binder material a portion to serve as a binder and for fastening the binder to the shoe.

183. In a machine for shaping shoe uppers, wipers formed to extend around an end of an upper for wiping the marginal portion of the upper into lasted relation to a sole, said wipers having a binder-positioning groove therein, means for feeding binder material along said groove around the end of the upper while the wipers are in engagement with the upper, means for severing from the binder material a portion to serve as a binder after the feeding of the material, and devices for driving fastenings at the opposite sides of the shoe bottom into clamping relation to the binder to fasten it to the shoe.

184. In a machine for shaping shoe uppers, wipers formed to extend around an end of a shoe and movable laterally of the shoe to wipe the marginal portion of the upper into lasted relation to a sole, means for feeding binder material to said wipers to be fastened to the shoe for holding the upper in lasted position, said feeding means being movable laterally of the shoe with one of the wipers, means for severing from the binder material a portion to serve as a binder, and means for driving fastenings to fasten the binder to the shoe.

185. In a machine for shaping shoe uppers, wipers formed to extend around an end of a shoe and movable laterally of the shoe to wipe the marginal portion of the upper into lasted relation to a sole, means for feeding binder material to said wipers to be fastened to the shoe for holding the upper in lasted position, said feeding means being movable laterally of the shoe with one of the wipers, means for severing from the binder material a portion to serve as a binder, and devices arranged to drive fastenings at the opposite sides of the shoe bottom to fasten the binder to the shoe, said devices being movable laterally of the shoe with the wipers.

186. In a machine for shaping shoe uppers, wipers formed to extend around an end of a shoe and movable laterally of the shoe to wipe the marginal portion of the upper into lasted relation to a sole, said wipers having a binder-positioning groove therein, means for feeding binder material along said groove, said feeding means being movable laterally of the shoe with one of the wipers, means movable laterally of the shoe also with that wiper for severing from the binder material a portion to serve as a binder, and devices movable laterally of the shoe with the wipers for driving fastenings to fasten the binder to the shoe.

187. In a machine for shaping shoe uppers, wipers formed to extend around an end of an upper for wiping the marginal portion of the upper into lasted relation to a sole, said wipers having a binder-positioning groove therein, means for feeding binder material along said groove and for severing from the material a portion to serve as a binder, and means for driving headed fastenings at the opposite sides of the shoe bottom into positions for the heads of the fastenings to clamp the binder upon the shoe.

188. In a machine for shaping shoe uppers, wipers formed to extend around an end of a shoe and movable laterally of the shoe to wipe the marginal portion of the upper into lasted relation to a sole, said wipers having a binder-positioning groove therein, means for feeding binder material along said groove and for severing from the material a portion to serve as a binder, and fastening-inserting devices movable laterally of the shoe with the wipers and constructed to drive headed fastenings into positions for the heads of the fastenings to clamp the binder upon the shoe.

189. In a machine for shaping shoe uppers, wipers formed to extend around an end of a shoe and movable laterally of the shoe to wipe the marginal portion of the upper into lasted relation to a sole, said wipers having a binder-positioning groove therein, wiper carriers supporting said wipers and movable with them laterally of the shoe, means supported on one of said wiper carriers for feeding binder material along said groove in the wipers and for severing from the material a portion to serve as a binder, and devices supported on said wiper carriers for driving fastenings to fasten the binder to the shoe at the opposite sides of the shoe bottom.

190. In a machine for shaping shoe uppers, wipers formed to extend around an end of a shoe and movable laterally of the shoe to wipe the marginal portion of the upper into lasted relation to a sole, said wipers having a binder-positioning groove therein, means for feeding binder material along said groove, said feeding means being movable laterally of the shoe with one of the wipers, means for severing from the binder material a portion to serve as a binder, fastening-inserting devices movable laterally of the shoe with the wipers for driving fastenings to fasten the binder to the shoe, and members movable laterally of the shoe relatively to the wipers to operate said fastening-inserting devices.

191. In a machine for shaping shoe uppers, wipers formed to extend around an end of a shoe and movable laterally of the shoe to wipe the marginal portion of the upper into lasted relation to a sole, said wipers having a binder-positioning groove therein, means for feeding binder material along said groove, said feeding means being movable laterally of the shoe with one of the wipers, means for severing from the binder material a portion to serve as a binder, fastening-inserting devices movable laterally of the shoe with the wipers for driving fastenings to fasten the binder to the shoe, said devices being mounted for positioning movements laterally of the shoe relatively to the wipers, and members movable laterally of the shoe to impart to said devices their positioning movements and to operate them to drive the fastenings.

192. In a machine for shaping shoe uppers, wipers formed to extend around an end of a shoe and movable laterally of the shoe to wipe the marginal portion of the upper into lasted relation to a sole, said wipers having a binder-positioning groove therein, wiper carriers supporting said wipers and movable with them laterally of the shoe, means for feeding binder wire along said groove in the wipers, a device supported on one of said wiper carriers for severing from the wire a portion to serve as a binder, and fastening-inserting devices supported on the different wiper carriers for driving fastenings to fasten the binder to the shoe.

193. In a machine for shaping shoe uppers, wipers formed to extend around an end of a shoe and movable laterally of the shoe to wipe the marginal portion of the upper into lasted relation to a sole, said wipers having a binder-positioning groove therein, wiper carriers supporting said wipers and movable with them laterally of the shoe, means for feeding binder wire along said groove in the wipers, a device supported on one of said wiper carriers for severing from the wire a portion to serve as a binder, fastening-inserting devices supported on the different wiper carriers for driving fastenings to fasten the binder to the shoe at the opposite sides of the shoe bottom, and members supported independently of said wiper carriers and movable laterally of the shoe to operate the wire-severing device and the fastening-inserting devices.

194. In a machine for shaping shoe uppers, means for working the marginal portion of the toe end of an upper into lasted relation to a sole and for applying binder wire around the toe for holding the upper in lasted position, means for severing from the wire a portion to serve as a binder, and devices for driving fastenings at the opposite sides of the shoe bottom to fasten the binder to the shoe, said wire-severing means being timed to operate automatically to sever the wire after said fastenings have been at least partially driven.

195. In a machine for shaping shoe uppers, means for working the marginal portion of the toe end of an upper into lasted position against a lip or shoulder on a sole and for applying binder wire around the toe for holding the upper, means for severing from the wire a portion to serve as a binder, and means for inserting binder-holding fastenings at the opposite sides of the shoe bottom alongside of the binder in such relation to it as to press it inwardly toward the lip or shoulder of the sole, said wire-severing means being timed to operate automatically to sever the wire after said fastenings have been at least partially inserted.

196. In a machine for shaping shoe uppers, wipers formed to extend around the toe end of an upper for wiping the marginal portion of the upper inwardly against a lip or shoulder on a sole, said wipers having at their wiping edges a groove to receive and position binder wire about the toe for holding the upper, means for severing from said wire a portion to serve as a binder, devices arranged to drive fastenings at the opposite sides of the shoe bottom alongside of the binder at the outer side thereof to fasten the binder to the shoe, and means for deflecting said fastenings laterally inward against the binder to cause them to press the binder toward the lip or shoulder of the sole as they are driven, said wire-severing means being timed to operate automatically to sever the wire after the fastenings have been at least partially driven.

197. In a machine for shaping shoe uppers, means for fastening to a shoe a binder applied around an end of the shoe to hold the upper against a lip or shoulder on a sole, said fastening means being constructed to drive tacks alongside of the binder at the outer side thereof into positions to clamp the binder upon the shoe by their heads.

198. In a machine for shaping shoe uppers, means for fastening to a shoe a binder applied around an end of the shoe to hold the upper against a lip or shoulder on a sole, said fastening means comprising devices constructed and arranged to drive tacks alongside of the binder at the outer side thereof into positions to clamp the binder upon the shoe by their heads and also to drive other tacks only partially into the shoe to permit the end portions of the binder to be bent around them.

199. In a machine for shaping shoe uppers, means for fastening to a shoe a binder applied around an end of the shoe to hold the upper against a lip or shoulder on a sole, said fastening means comprising devices for driving fastenings alongside of the binder at the outer side thereof, and means for deflecting said fastenings laterally as they are driven to cause them to press the binder inwardly toward said lip or shoulder.

200. In a machine for shaping shoe uppers, means for fastening to a shoe a binder applied around an end of the shoe to hold the upper against a lip or shoulder on a sole, said fastening means comprising devices for driving tacks alongside of the binder at the outer side thereof into positions to clamp the binder upon the shoe by their heads, and means for deflecting the shanks of the tacks laterally as they are driven to cause them to press the binder inwardly toward said lip or shoulder.

201. In a machine for shaping shoe uppers, means for fastening to a shoe a binder applied around an end of the shoe to hold the upper against a lip or shoulder on a sole, said fastening means comprising devices constructed and arranged to drive fastenings alongside of the binder at the outer side thereof, and means for forcing said fastenings laterally inward toward said lip or shoulder to cause them to bend abruptly inward the portions of the binder which they engage.

202. In a machine for shaping shoe uppers, wipers formed to extend around an end of an upper for wiping the marginal portion of the upper inwardly against a lip or shoulder on a sole, said wipers having at their wiping edges a groove arranged to receive and position a binder about the end of the shoe for holding the upper, and means associated with said wipers for driving tacks alongside of the binder at the outer side thereof into positions to clamp the binder upon the shoe by their heads.

203. In a machine for shaping shoe uppers, wipers formed to extend around an end of an upper for wiping the marginal portion of the upper inwardly against a lip or shoulder on a sole, said wipers having at their wiping edges a groove arranged to receive and position a binder about the end of the shoe for holding the upper, and means associated with said wipers for driving fastenings alongside of the binder at the outer side thereof to fasten the binder to the shoe, said wipers having thereon deflecting faces arranged to engage the fastenings and deflect them laterally inward toward said lip or shoulder as they are driven.

204. In a machine for shaping shoe uppers, wipers formed to extend around an end of an upper for wiping the marginal portion of the upper inwardly against a lip or shoulder on a sole, said wipers having at their wiping edges a groove arranged to receive and position a binder about the end of the shoe for holding the upper, and devices associated with said wipers for driving tacks alongside of the binder at the outer side thereof into positions to clamp the binder upon the shoe by their heads, the wipers having notches therein where the tacks are driven and having adjacent to said notches deflecting faces arranged to engage the tacks and deflect them laterally inward against the binder toward said lip or shoulder.

205. In a machine for shaping shoe uppers, wipers formed to extend around an end of a shoe and movable laterally of the shoe to wipe the marginal portion of the upper into lasted relation to a sole, said wipers having therein a groove to receive and position a binder around the end of a shoe for holding the upper, and fastening-inserting devices movable laterally of the shoe with the wipers and constructed to drive tacks alongside of the binder at the outer side thereof into positions to clamp the binder upon the shoe by their heads.

206. In a machine for shaping shoe uppers, wipers formed to extend around an end of a shoe and movable laterally of the shoe to wipe the marginal portion of the upper inwardly against a lip or shoulder on a sole, said wipers having therein a groove to receive and position a binder around the end of the shoe for holding the upper, fastening-inserting devices movable laterally of the shoe with the wipers and constructed to drive fastenings alongside of the binder at the outer side thereof to fasten the binder to the shoe, and means for deflecting said fastenings laterally as they are driven to cause them to press the binder inwardly toward said lip or shoulder.

207. In a machine for shaping shoe uppers, wipers formed to extend around an end of a shoe and movable laterally of the shoe to wipe the marginal portion of the upper inwardly against a lip or shoulder on a sole, said wipers having therein a groove to receive and position a binder about the end of the shoe for holding the upper, wiper carriers supporting said wipers and movable with them laterally of the shoe, and fastening-inserting devices supported on said wiper carriers and arranged to drive tacks alongside of the binder at the outer side thereof into positions to clamp the binder upon the shoe by their heads, said wipers having thereon deflecting faces arranged to deflect the tacks laterally inward toward said lip or shoulder as they are driven.

208. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, and fastening-inserting devices supported on said wiper carriers for driving fastenings to fasten to the shoe a binder applied around the end of the shoe for holding the upper, said fastening-inserting devices being mounted for positioning movements laterally of the shoe relatively to the wipers and the wiper carriers prior to their operation to drive the fastenings.

209. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, fastening-inserting devices supported on said wiper carriers for driving fastenings to fasten to the shoe a binder applied around the end of the shoe for holding the upper, said fastening-inserting devices being mounted for positioning movements laterally of the shoe relatively to the wipers and the wiper carriers prior to their operation to drive the fastenings, means for imparting to said devices their positioning movements, and additional means for stopping such movements when the devices are in proper positions for driving the fastenings.

210. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, fastening-inserting devices supported on said wiper carriers for driving fastenings to fasten to the shoe a binder applied around the end of the shoe for holding the upper, said fastening-inserting devices being mounted for positioning movements laterally of the shoe relatively to the wipers and the wiper carriers prior to their operation to drive the fastenings, and means supported independently of said wiper carriers and movable to impart to said devices their positioning movements, the wipers having thereon stop faces arranged to limit such movements of the devices.

211. In a machine for shaping shoe uppers, wipers formed to extend around an end of a shoe and mounted for swinging movements each about an axis extending heightwise of the shoe to wipe the marginal portion of the upper inwardly into lasted relation to a sole, and fastening-inserting devices mounted to swing inwardly with the wipers in fixed relation to the wipers and constructed to drive upper-holding fastenings into the shoe bottom, said devices being further movable laterally of the shoe relatively to the wipers into positions for the driving of the fastenings prior to their operation to drive the fastenings.

212. In a machine for shaping shoe uppers, wipers formed to extend around an end of a shoe and mounted for swinging movements each about an axis extending heightwise of the shoe to wipe the marginal portion of the upper inwardly into lasted relation to a sole, and fastening-inserting devices mounted to swing inwardly with the wipers in fixed relation to the wipers and constructed to drive upper-holding fastenings into the shoe bottom, said devices comprising slides further movable laterally of the shoe relatively to the wipers into positions for the driving of the fastenings, and means for thus moving said slides and for then operating the devices to drive the fastenings.

213. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, fastening-inserting devices supported on said wiper carriers for driving upper-holding fastenings into the shoe bottom and comprising slides mounted on the carriers for positioning movements laterally of the shoe, and yieldable means for moving the slides inwardly toward the shoe, the wipers having thereon stop faces arranged to limit such inward movements of the slides.

214. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, fastening-inserting devices supported on said wiper carriers for driving upper-holding fastenings into the shoe bottom and mounted for positioning movements laterally of the shoe relatively to the carriers, and means supported independently of said wiper carriers and movable laterally of the shoe to impart to said devices their positioning movements and to operate them to drive the fastenings.

215. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, fastening-inserting devices supported on said wiper carriers for driving upper-holding fastenings into the shoe bottom, said devices comprising slides movable relatively to the wiper carriers into positions for the driving of the fastenings and drivers on the slides for driving the fastenings, and members supported independently of the wiper carriers and movable first to operate said slides and then further movable to operate the drivers.

216. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, each of said wiper carriers having thereon a plurality of fastening-inserting devices movable relatively to the carrier and to one another laterally of the shoe into positions to drive upper-holding fastenings into the shoe bottom, means for imparting to one of said devices on each wiper carrier its positioning movement, and means operated by that device on each wiper carrier for imparting to another of the devices on the same wiper carrier its positioning movement.

217. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, each of said wiper carriers having thereon a plurality of fastening-inserting devices movable relatively to the carrier and to one another laterally of the shoe into positions to drive upper-holding fastenings into the shoe bottom, means supported independently of the wiper carriers and movable laterally of the shoe into engagement with one of the fastening-inserting devices on each carrier for imparting yieldingly to that device its positioning movement, means operated by that device on each wiper carrier for imparting yieldingly to another of the devices on the same wiper carrier its positioning movement, and means for positively limiting the positioning movements of the different devices.

218. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, devices supported on said wiper carriers for driving upper-holding fastenings into the shoe bottom, said devices comprising drivers and swinging arms for operating the drivers, and means supported independently of said wiper carriers and movable into contact with said arms to operate them.

219. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, devices supported on said wiper carriers for driving upper-holding fastenings into the shoe bottom, said devices comprising drivers and swinging arms for operating the drivers, and members supported independently of said wiper carriers and movable laterally of the shoe to operate said arms.

220. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, each of said wiper carriers having thereon a plurality of fastening-inserting devices comprising drivers and swinging arms for operating the drivers to drive upper-holding fastenings into the shoe bottom, means for imparting operative movement to one of said arms on each wiper carrier, and means carried by that arm on each wiper carrier for imparting operative movement to another of the arms.

221. In a machine for shaping shoe uppers, wipers formed to extend around an end of a shoe and movable laterally of the shoe to wipe the marginal portion of the upper into lasted relation to a sole, wiper carriers supporting said wipers and movable with them laterally of the shoe, each of said wiper carriers having thereon a plurality of fastening-inserting devices comprising drivers and swinging arms for operating the drivers to drive upper-holding fastenings into the shoe bottom, means for imparting operative movement to one of said arms on each wiper carrier, and an equalizing lever carried by that arm on each wiper carrier for imparting operative movements to other arms.

222. In a machine for shaping shoe uppers, toe-embracing wipers movable inwardly about the toe of a shoe positioned bottom downward to wipe the marginal portion of the upper into lasted position substantially all around the toe, and fastening-inserting devices movable inwardly with said wipers and constructed to drive upper-holding fastenings upwardly into the shoe bottom from beneath the wipers.

223. In a machine for shaping shoe uppers, toe-embracing wipers movable inwardly about the toe of a shoe positioned bottom downward to wipe the marginal portion of the upper into lasted position substantially all around the toe, and fastening-inserting devices movable inwardly with said wipers and constructed to drive upper-holding fastenings upwardly into the shoe bottom from beneath the wipers, said fastening-inserting devices being movable relatively to the wipers into fastening-inserting positions.

224. In a machine for shaping shoe uppers, toe-embracing wipers movable inwardly about the toe of a shoe positioned bottom downward to wipe the marginal portion of the upper into lasted position substantially all around the toe, wiper carriers supporting said wipers and movable inwardly with them, fastening-inserting devices supported on said wiper carriers beneath the latter and constructed to drive upper-holding fastenings upwardly into the shoe bottom, and means for supplying fastenings to said devices through the wiper carriers.

225. In a machine for shaping shoe uppers, toe-embracing wipers movable inwardly about the toe of a shoe positioned bottom downward to wipe the marginal portion of the upper into lasted position substantially all around the toe, wiper carriers supporting said wipers and movable inwardly with them, fastening-inserting devices supported on said wiper carriers beneath the latter and constructed to drive upper-holding fastenings upwardly into the shoe bottom, said devices being movable relatively to the wiper carriers from fastening-receiving positions into fastening-inserting positions, and means for supplying fastenings to said devices through the wiper carriers when the devices are in fastening-receiving positions.

226. In a machine for shaping shoe uppers, toe-embracing wipers movable inwardly about the toe of a shoe positioned bottom downward to wipe the marginal portion of the upper into lasted position substantially all around the toe, wiper carriers supporting said wipers and movable inwardly with them, fastening-inserting devices supported on said wiper carriers beneath the latter and constructed to drive upper-holding fastenings upwardly into the shoe bottom, said devices being movable relatively to the wiper carriers from fastening-receiving positions into fastening-inserting positions and having movable fingers thereon for guiding the fastenings as they are driven, means for supplying fastenings to said devices through the wiper carriers when the devices are in fastening-receiving positions, and means on the wiper carriers arranged to act on said fingers to hold them in positions to receive the fastenings when the devices are in receiving positions.

ARTHUR F. PYM.